(12) United States Patent
Kim et al.

(10) Patent No.: US 10,810,449 B2
(45) Date of Patent: Oct. 20, 2020

(54) ELECTRONIC DEVICE AND METHOD OF OPERATING SAME

(71) Applicant: SAMSUNG ELECTRONICS CO., LTD., Suwon-si, Gyeonggi-do (KR)

(72) Inventors: Hakjoo Kim, Yongin-si (KR); Sangho Park, Anyang-si (KR); Yong-Jun Park, Suwon-si (KR); Gwiho Lee, Uiwang-si (KR); Ho-Dong Jwa, Suwon-si (KR); Wooyoung Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 448 days.

(21) Appl. No.: 15/397,074

(22) Filed: Jan. 3, 2017

(65) Prior Publication Data

US 2017/0193314 A1    Jul. 6, 2017

(30) Foreign Application Priority Data

Jan. 4, 2016    (KR) ........................ 10-2016-0000630

(51) Int. Cl.
    *G06K 9/00*        (2006.01)
    *G06F 9/54*        (2006.01)
    (Continued)

(52) U.S. Cl.
    CPC .......... *G06K 9/00885* (2013.01); *G06F 3/03* (2013.01); *G06F 3/147* (2013.01); *G06F 9/547* (2013.01);
    (Continued)

(58) Field of Classification Search
    None
    See application file for complete search history.

(56) References Cited

U.S. PATENT DOCUMENTS

| 5,420,936 A * | 5/1995 | Fitzpatrick .............. G06F 21/32 340/5.53 |
| 2004/0004968 A1 * | 1/2004 | Nassar .............. H04L 29/12481 370/401 |

(Continued)

FOREIGN PATENT DOCUMENTS

JP    2014-119830    6/2014
KR    10-2007-0119922    12/2007
(Continued)

OTHER PUBLICATIONS

Extended Search Report dated Nov. 19, 2018 in counterpart European Patent Application No. EP17736067.4.

(Continued)

*Primary Examiner* — Mark Roz
(74) *Attorney, Agent, or Firm* — Nixon & Vanderhye P.C.

(57) ABSTRACT

Disclosed are an electronic device and a method of operating the same. The electronic device may include a touch screen; a communication interface comprising communication circuitry; and a processor functionally connected to the communication circuitry of the communication interface, wherein the processor may be configured to receive execution information usable for authenticating at least one resource of a second external device from a first external device through the communication circuitry of the communication interface, to display a user interface configured to acquire biometric information of a user through the touch screen in response to receiving the execution information, to generate virtual biometric information based on the acquired biometric information, and to transmit the virtual biometric information to the second external device through the communication circuitry of the communication interface wherein the virtual biometric information is usable for authenticating the at least one resource.

17 Claims, 62 Drawing Sheets

(51) Int. Cl.
- *H04L 29/06* (2006.01)
- *G06F 3/147* (2006.01)
- *G06F 21/32* (2013.01)
- *G06F 3/03* (2006.01)
- *G06F 21/35* (2013.01)
- *H04L 29/08* (2006.01)
- *G09G 5/00* (2006.01)

(52) U.S. Cl.
CPC ............. *G06F 21/32* (2013.01); *G06F 21/35* (2013.01); *G06K 9/00979* (2013.01); *G09G 5/003* (2013.01); *H04L 63/0861* (2013.01); *H04L 67/10* (2013.01); *H04L 67/40* (2013.01); *G06F 2221/2115* (2013.01); *G09G 2358/00* (2013.01); *G09G 2370/16* (2013.01); *G09G 2380/08* (2013.01)

(56) References Cited

U.S. PATENT DOCUMENTS

| | | | |
|---|---|---|---|
| 2006/0110011 A1* | 5/2006 | Cohen | G06F 21/121 382/115 |
| 2007/0047771 A1* | 3/2007 | Watanabe | G06K 9/00288 382/115 |
| 2012/0290832 A1 | 11/2012 | Antequera Rodriguez et al. | |
| 2014/0281565 A1 | 9/2014 | Narendra et al. | |
| 2015/0271175 A1* | 9/2015 | Je | H04L 63/0861 726/4 |
| 2015/0304321 A1 | 10/2015 | Wong et al. | |
| 2016/0012273 A1 | 1/2016 | Westerman et al. | |

FOREIGN PATENT DOCUMENTS

| | | |
|---|---|---|
| KR | 10-2010-0029918 | 3/2010 |
| KR | 10-2014-0037071 | 3/2014 |
| KR | 10-2015-0059473 | 6/2015 |
| WO | 2014/143950 | 9/2014 |

OTHER PUBLICATIONS

Search Report and Written Opinion dated Mar. 30, 2017 in counterpart International Patent Application No. PCT/KR2017/000043.

* cited by examiner

ELECTRONIC DEVICE AND METHOD OF OPERATING SAME

CROSS-REFERENCE TO RELATED APPLICATION

This application is based on and claims priority under 35 U.S.C. § 119 to Korean Application Serial No. 10-2016-0000630, which was filed in the Korean Intellectual Property Office on Jan. 4, 2016, the content of which is incorporated by reference herein in its entirety.

TECHNICAL FIELD

The present disclosure relates generally to an electronic device and a method of operating the same.

BACKGROUND

Recently, as importance for protection of personal information increases, high level services increase through user biometric recognition such as iris recognition or fingerprint recognition. Currently, an electronic device converts a user's biometric information into digital information, encrypts the digital information, and uses the encrypted digital information as user authentication information. The electronic device receives biometric information recognized by a biometric sensor included in the electronic device to perform user authentication or biometric information recognized by an external biometric sensor outside the electronic device through a wire to perform user authentication.

When the biometric sensor is not included in or is not connected to the electronic device to perform the user authentication, the electronic device cannot perform the user authentication.

SUMMARY

In order to address the above problem, various example embodiments of the present disclosure provide an electronic device and a method of operating the same capable of providing an authentication function through biometric recognition in different types of electronic devices.

An electronic device according to various example embodiments includes a touch screen; a communication interface comprising communication circuitry; and a processor functionally connected to the communication interface, wherein the processor is configured to receive execution information for authenticating at least one resource of a second external device from a first external device through the communication circuitry of the communication interface, to display a user interface configured to acquire biometric information of a user through the touch screen in response to receiving the execution information, to generate virtual biometric information based on the acquired biometric information, and to transmit the virtual biometric information to the second external device through the communication circuitry of the communication interface wherein the virtual biometric information is usable for authenticating the at least one resource.

A method of operating an electronic device according to various example embodiments includes: receiving execution information usable to authenticate at least one resource of a second external device from a first external device through a communication interface of the electronic device; displaying a user interface configured to acquire biometric information of a user in response to the receiving; generating virtual biometric information based on the acquired biometric information; and transmitting the virtual biometric information to the second external device through the communication interface wherein the virtual biometric information is usable for authenticating the at least one resource.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
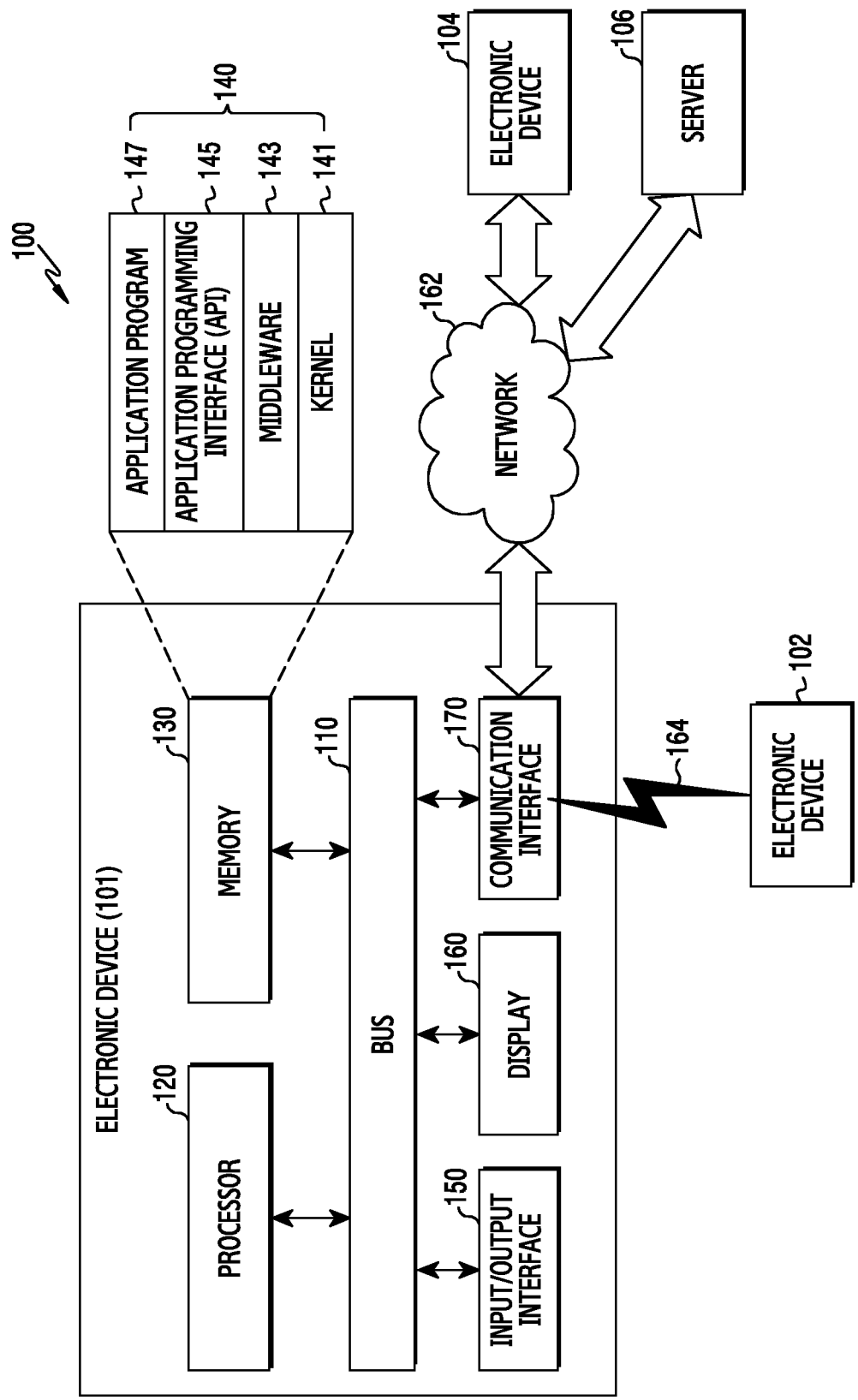
FIG. 1 is a block diagram illustrating an example electronic device in a network environment system according to various example embodiments.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may refer to a situation in which the apparatus "can" operate together with another apparatus or component. For example, a phrase "a processor configured (or set) to perform A, B, and C" may refer to a dedicated processor, a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to example embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame, or the like, but is not limited thereto.

In another example embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler), or the like, but is not limited thereto. According to an example embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an example embodiment, can be a flexible electronic device or a combination of two or more of the foregoing various devices. An electronic device, according to an example embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

FIG. 1 is a block diagram illustrating an example electronic device (101) in a network environment system (100) according to various example embodiments.

Referring initially to FIG. 1, electronic devices 101, 102, 104 and/or a server 106 may be connected to each other via a network 162 and/or a wireless communication 164. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. The electronic device 101 may be provided without at least one of the components, or may include at least one additional component. The bus 110 can include a circuit for connecting the components 120 through 170 and delivering communication signals (e.g., control messages or data) therebetween. The processor 120 may include various processing circuitry, such as, for example, and without limitation, one or more of a dedicated processor, a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an example embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170 may include various communication circuitry and, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
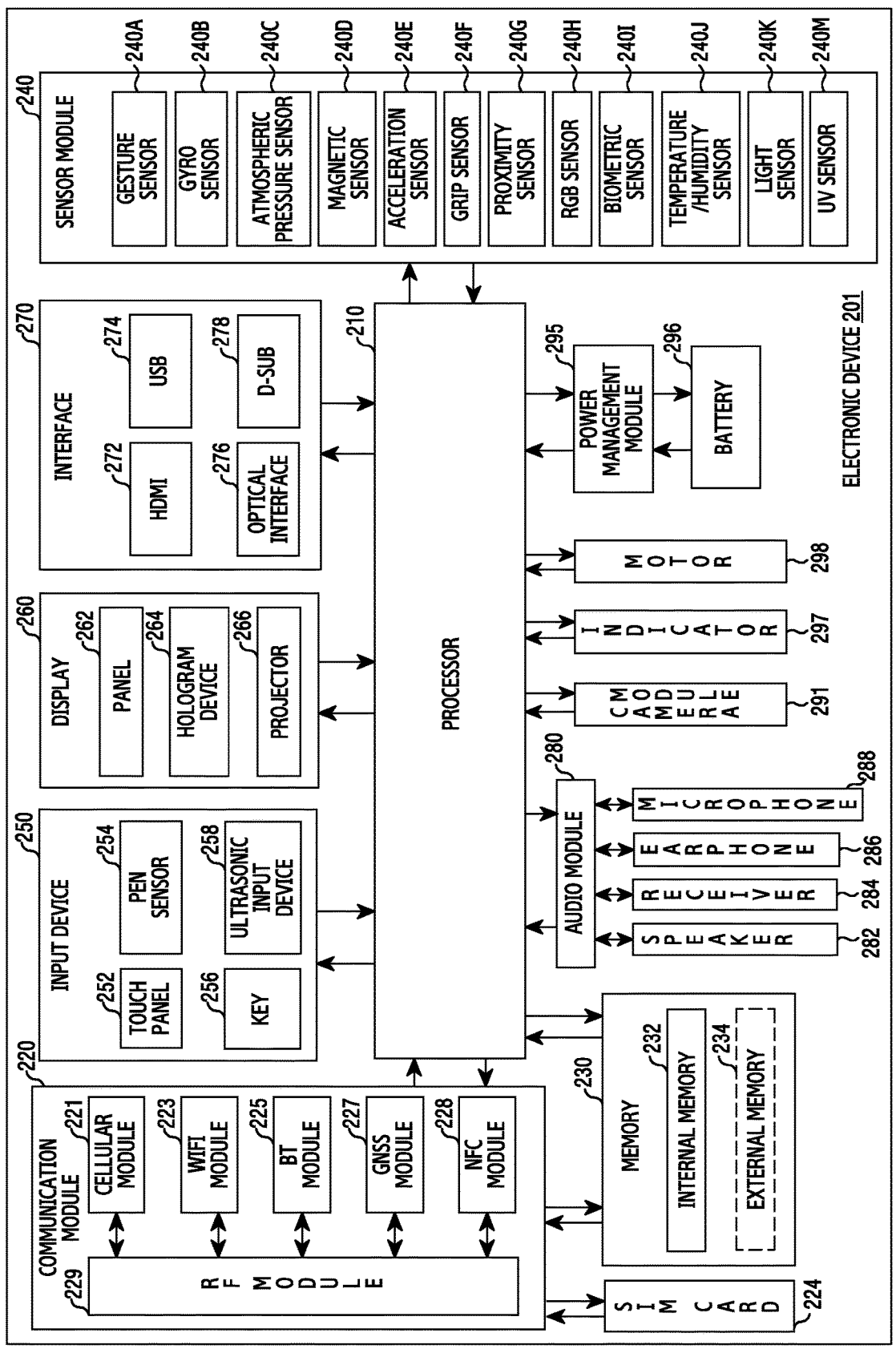
FIG. 2 is a block diagram illustrating an example electronic device according to various example embodiments.

FIG. 2 is a block diagram illustrating an example electronic device 201 according to an example embodiment of the present disclosure. The electronic device 201, for example, can include all or part of the above-described electronic device 101 of FIG. 1. The electronic device 201 includes one or more processors (e.g., an AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210, for example, may include various processing circuitry and can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components illustrated in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 may include various communication circuitry, such as, for example, and without limitation, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module.

The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and/or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240E a color sensor 240H (e.g., a Red, Green, Blue (RGB) sensor), a biometric sensor 240I, a temperature/humidity sensor 240J, an illumination (e.g., light) sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 may include various input circuitry, such as, for example, and without limitation, at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201.

The interface 270 may include various interface circuitry, such as, for example, and without limitation, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLO™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
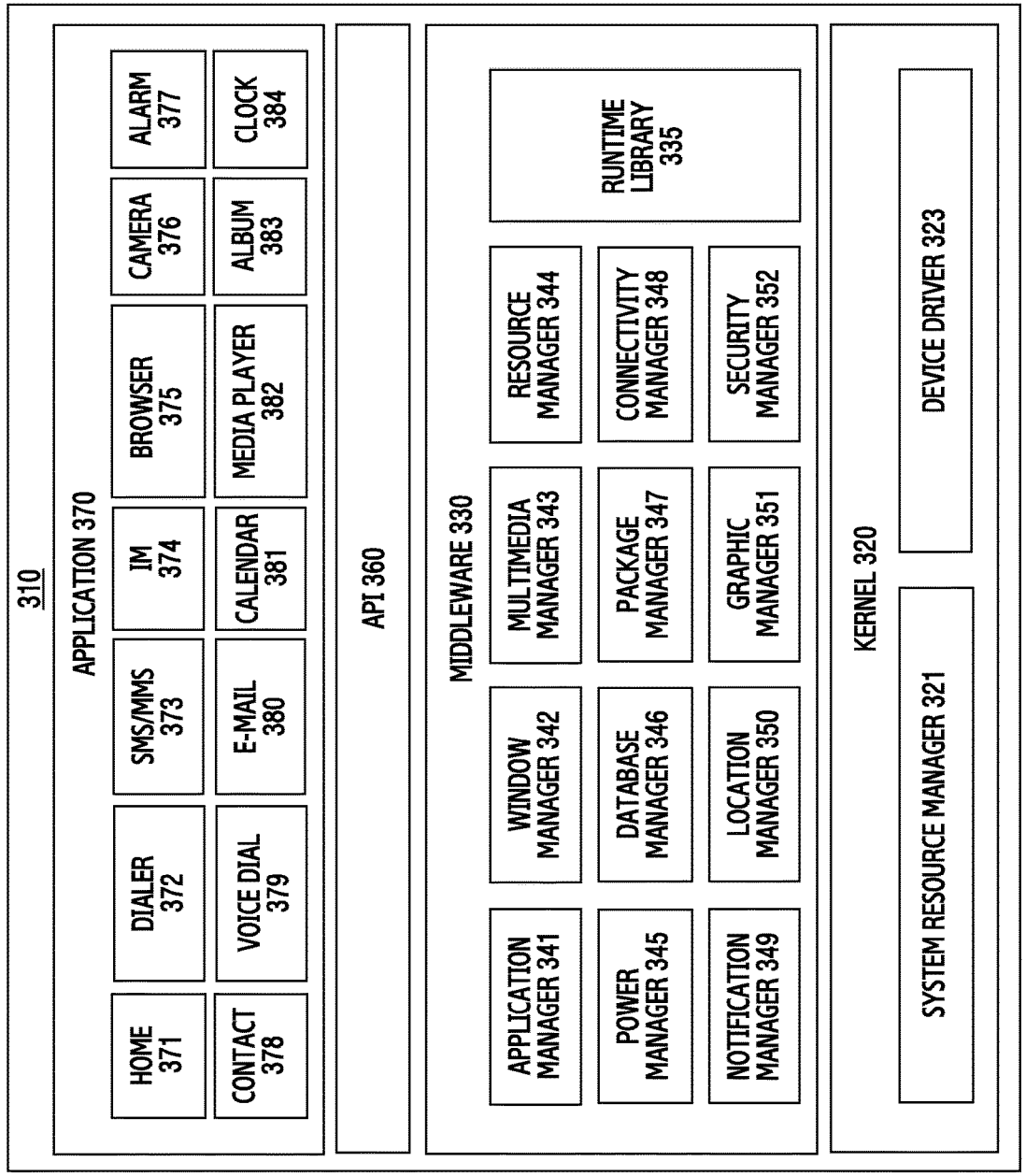
FIG. 3 is a block diagram illustrating an example program module according to various example embodiments.

FIG. 3 is a block diagram illustrating an example program module according to an example embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a WiFi driver, an audio driver, or an Inter-Process Communication (IPC) driver.

The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

The term "module", as used herein, may refer, for example, to a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an example embodiment of the present disclosure, may include at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on example embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

According to various example embodiments, a recording medium may include a program for executing an operation of generating a first authentication value using a first application executed in a first execution environment by an electronic device that may operate a plurality of execution environments including the first execution environment and a second environment, an operation of transmitting the first authentication value from the first application to a second application executed in the first execution environment through the second execution environment, an operation of transmitting a second authentication value and an authentication result for a user from the second application to the first application through the second environment based on the reception of the first authentication value, and an operation of performing payment based on the authentication result by using the first application when the second authentication value corresponds to the first authentication value.

According to various example embodiments, the first execution environment may include a trusted execution environment, and the second execution environment may include a rich execution environment.

The module or program module can further include at least one or more components among the aforementioned components, or can omit some of them, or can further include additional other components. Operations performed by a module, program module, or other components of the various example embodiments of the present disclosure can be executed in a sequential, parallel, repetitive, or heuristic manner. In addition, some of the operations can be executed in a different order or may be omitted, or other operations may be added.

The example embodiments of the present disclosure disclosed herein and illustrated in the drawings are merely examples presented in order to easily describe technical details of the present disclosure and to aid in the understanding of the present disclosure, and are not intended to limit the scope of the present disclosure. Therefore, it should be understood that, in addition to the example embodiments disclosed herein, all modifications and changes or modified and changed forms derived from the technical idea of the present disclosure fall within the scope of the present disclosure.

Figure 4:
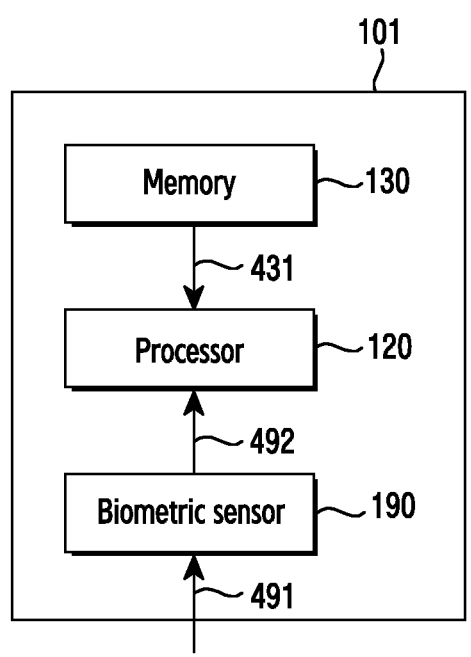
FIG. 4 is a block diagram illustrating an example electronic device according to various example embodiments.

FIG. 4 is a block diagram illustrating an example electronic device according to various example embodiments of the present disclosure.

As illustrated in FIG. 4, the electronic device 101 may include, for example, the processor 120, the memory 130, and the biometric sensor 190. The biometric sensor 190 may sense biometric information 491 by which the user can be recognized. The biometric information 491 may be information corresponding to different characteristics that every person has. For example, the biometric feature 491 may include body characteristics that everyone has different fingerprint shapes, different iris shapes, different retina shapes, different vein shapes near the wrist, different ear shapes, different face shapes, different hand shapes, and the like. As described above, recognition based on the shape uniqueness may be named visual recognition and there is no limitation on body characteristics as the biometric information 491 if the body characteristics can be used for visual recognition. The biometric information 491 may be physical information of various signals output from the user's body such as a voice, a brainwave, or a heartbeat waveform, and there is no limitation on the type of the signal if the signal is output from a body having an individually specific characteristic. The biometric information 491 may include a user's behavior such as a gait habit or a typing habit. The above described recognition may be named behavior recognition, and there is no limitation if behavior information is individually distinctive. The biometric information 491 may include information used for chemical recognition such as DNA matching or smell. As described above, there is no limitation on the biometric information 491 if the information can be used for recognizing the user, and there is no limitation on the biometric sensor 190 if the sensor can sense various piece of biometric information 491. For example, when biometric information for visual recognition is acquired, the biometric information 491 may include a device for acquiring an image and a device for radiating a light. The biometric sensor 190 may include a microphone for sensing a voice and an electrode for measuring a brainwave or a heartbeat. The biometric sensor 490 may include a reagent control device or a chemical analysis device for acquiring biometric information used for chemical recognition.

The biometric sensor 190 may sense the biometric information 491 and transfer sensing data 492 generated by converting the biometric information 491 into an electric signal to the processor 120. The sensing data 492 may be raw data sensed by the biometric sensor 190 or data converted according to a specific format.

According to an example embedment, the memory 130 may store, in advance, data on user-specific biometric information. For example, the memory 130 may store, in advance, data on user-specific biometric information as shown in [Table 1].

TABLE 1

| User | Data on biometric information (Fingerprint) |
|---|---|
| First user | First fingerprint shape |
| Second user | Second fingerprint shape |
| Third user | Third fingerprint shape |
| Fourth user | Fourth fingerprint shape |
| Fifth user | Fifth fingerprint shape |

At a time point when the user is registered in an authentication system, the electronic device 101 may acquire biometric information of the fingerprint shape, map the biometric information and the user, and store the mapped biometric information and user. Although the fingerprint shape is shown as the data on the biometric information in [Table 1], it is only an example and the fingerprint shape may be replaced with data on various pieces of biometric information. In addition, the electronic device 101 according to various example embodiments of the present disclosure may manage together a plurality of pieces of biometric information according to the user. For example, as the data on the biometric information, the electronic device 101 may store various pieces of biometric information such as a first fingerprint shape, a first voice characteristic, and a first smell with respect to a first user, and store a second fingerprint shape, a second iris shape, and a second ear shape with respect to a second user.

The processor 120 may read data 431 on the user-specific biometric information from the memory 130 and compare the read data 431 with data 492 on the acquired biometric information. The processor 120 may authenticate the user based on a result of the comparison. For example, when the data 492 on the acquired biometric information is the second fingerprint shape, it may be determined that an authentication target is the second user. According to another example embodiment, when the electronic device 101 manages various pieces of biometric information together, the processor 120 may authenticate the user by combining comparison results of data of a plurality of pieces of biometric information.

According to various example embodiments of the present disclosure, the processor 120 may perform pre-processing such as removing noise from the data 492 on the acquired biometric information. The processor 120 may extract a feature from the data 492 on the acquired biometric information and compare the extracted feature with the data 431 on the user-specific biometric information which has been already stored based on features.

Meanwhile, according to various example embodiments of the present disclosure, the memory 130 may store data on user-specific virtual biometric information, and the processor 120 may perform a user authentication based on the virtual biometric information. This will be described below in greater detail with reference to FIG. 6.

According to the above description, the electronic device 101 may perform the user authentication based on the data on the pre-stored biometric information or the data on the virtual biometric information.

Figure 5A:
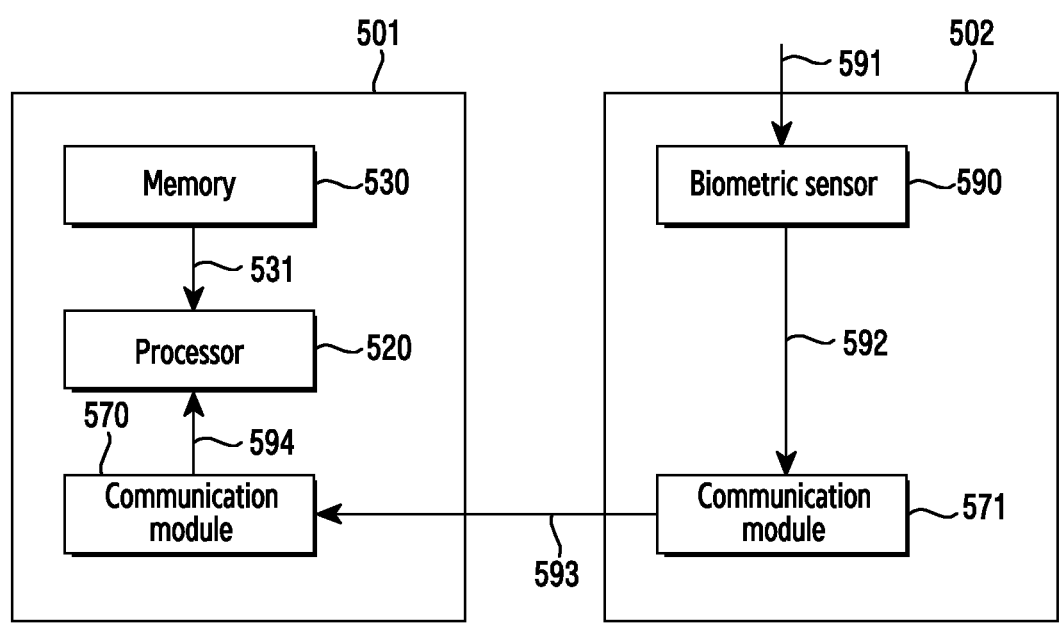
FIGS. 5A and 5B are block diagrams illustrating an example comparative operation of an electronic device for comparison with the present disclosure.
Figure 5B:
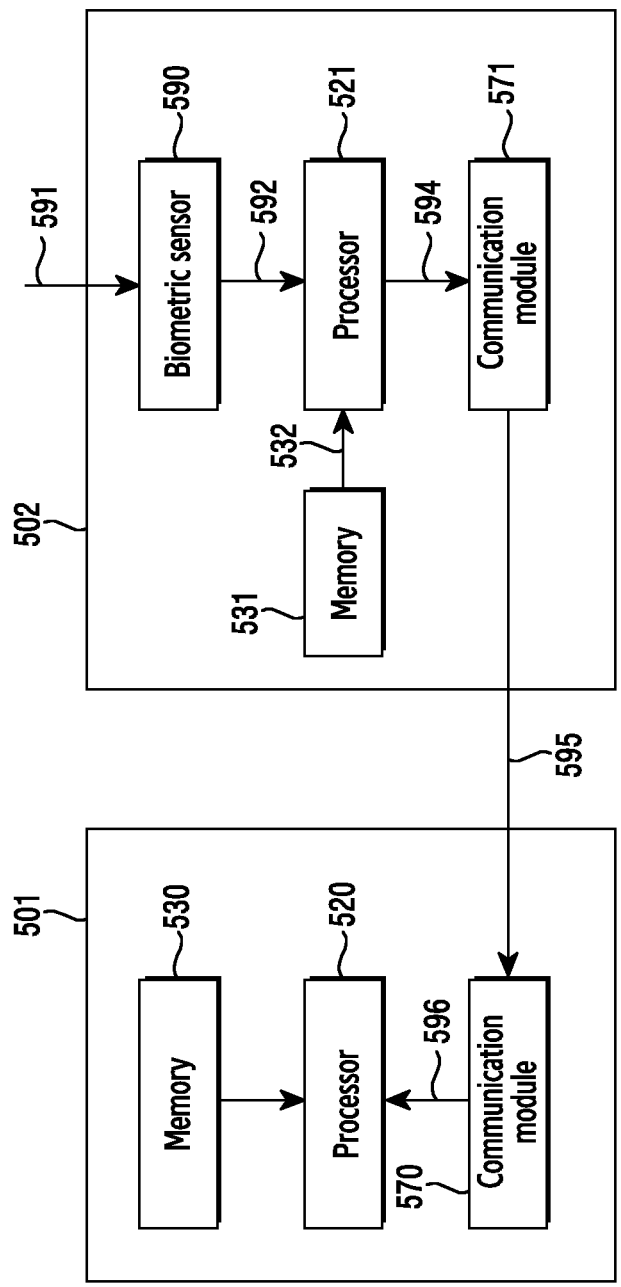

FIGS. 5A and 5B are block diagrams illustrating an example operation of an electronic device for comparison with the present disclosure.

A first electronic device 501 may include, for example, a processor 520, a memory 530, and a communication module 570. A second electronic device 502 may include, for example, a biometric sensor 590 and a communication module 571. For example, the first electronic device 501 may be an electronic device which does not include the biometric sensor. The communication modules 570 and 571 may include various communication circuitry and transmit/receive data to/from each other.

The biometric sensor 590 of the second electronic device 502 may sense the biometric information 591 and transfer data 592 on the biometric information to the communication module 571. The communication module 571 may transmit a signal 593 including the received data 592 on the biometric information to the communication module 570 of the first electronic device 501.

The communication module 570 may process data 594 on the biometric information from the received signal 593 and transfer the data to the processor 520. The processor 520 may compare the data 531 on the user-specific biometric information read from the memory 530 and the received data 594 on the biometric information, and perform an authentication according to a result of the comparison.

However, when the communication module 571 of the second electronic device 502 transmits the signal 593 including the biometric information to the communication module 570 of the first electronic device 501, the biometric information may be leaked during a signal transmission/reception process.

Referring to FIG. 5B, the second electronic device 502 according to another comparative example may include a memory 530. The second electronic device 502 may pre-store data on user-specific biometric information in a memory 530, and the processor 521 may compare the read data 532 on the user-specific biometric information with acquired data 592 on the biometric information. The processor 521 may authenticate the user according to a result of the comparison and transfer an authentication result 594 to the communication module 571. The communication module 571 may transmit a signal 595 including the authentication result, for example, information indicating that the second user has been authenticated to the communication module 570 of the first electronic device 501. The communication module 570 of the first electronic device 501 may process an authentication result 596 from the received signal 595 and transfer the authentication result 596 to the processor 520. The processor 520 may perform the authentication based on the acquired authentication result 596. According to another comparative example, there is no significant possibility of leakage of the biometric information during a process of transmitting and receiving the signal 595, but it is difficult to implement an integrated authentication program since different operations should be performed when an algorithm by which the first electronic device 501 authenticates the biometric information and an algorithm for processing the authentication result are stored.

Figure 6:
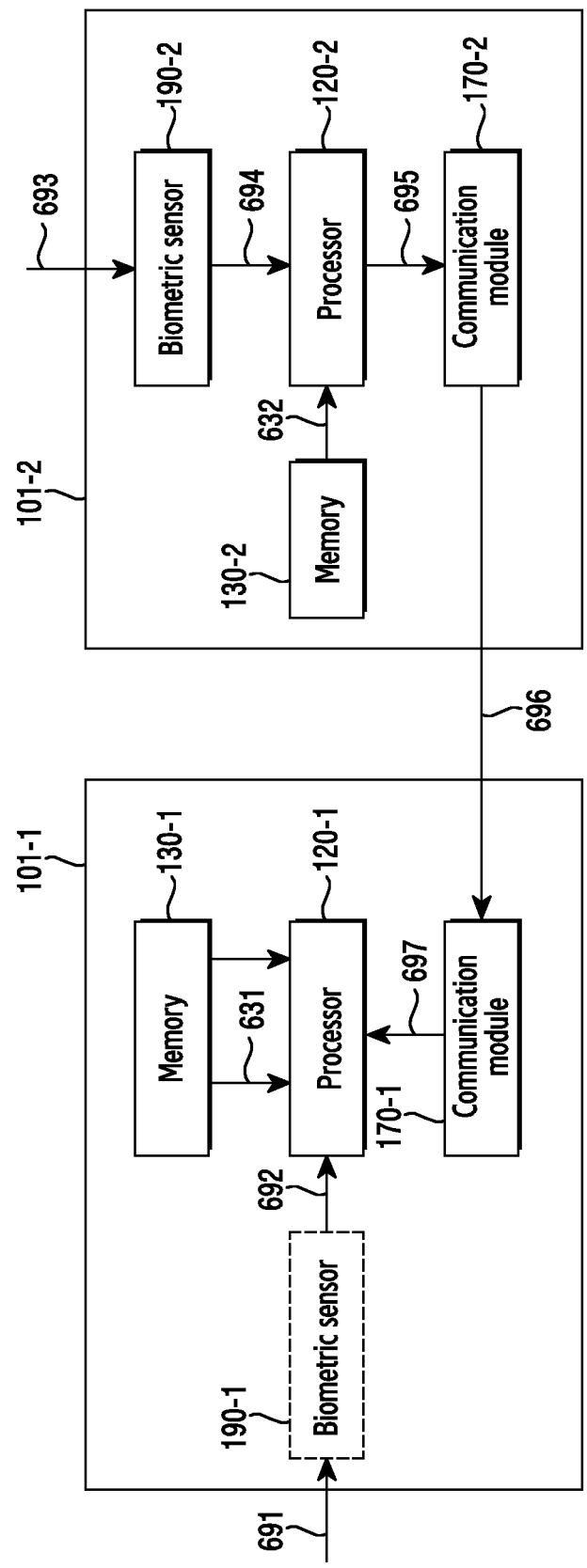
FIG. 6 is a block diagram illustrating an example operation of the electronic device according to various example embodiments of the present disclosure.

FIG. 6 is a block diagram illustrating an example operation of the electronic device according to various example embodiments of the present disclosure.

A first electronic device 101-1 may include, for example, a first processor 120-1, a first memory 130-1, a first communication module (e.g., including communication circuitry) 170-1, and a first biometric sensor 190-1. According to various example embodiments of the present disclosure, the first electronic device 101-1 may include the biometric sensor 190-1 or not include the biometric sensor 190-1. A second electronic device 101-2 may include, for example, a second processor 120-2, a second memory 130-2, a second communication module (e.g., including communication circuitry) 170-2, and a second biometric sensor 190-2.

The second biometric sensor 190-2 may sense biometric information 693. The second biometric sensor 190-2 may transfer data 694 on biometric information processed from the sensed biometric information 693 to the second processor 120-2. The second memory 130-2 may store relevant information between the data on the user-specific biometric information and virtual biometric information, which is as shown in [Table 2].

TABLE 2

| User | Data on biometric information (fingerprint) | Virtual biometric information |
| --- | --- | --- |
| First user | First fingerprint shape | 0100011011 |
| Second user | Second fingerprint shape | 0100011100 |
| Third user | Third fingerprint shape | 0100011101 |
| Fourth user | Fourth fingerprint shape | 0100011110 |
| Fifth user | Fifth fingerprint shape | 0100011111 |

The second processor 120-2 may acquire the data on the biometric information at a time point when the user is registered in an authentication system. The second processor 120-2 may generate virtual biometric information corresponding to the data on the biometric information. For example, the second processor 120-2 may generate virtual biometric information "0100011011" based on the first fingerprint shape. The second processor 120-2 may generate virtual biometric information corresponding to the first fingerprint shape through a preset virtual biometric information generation algorithm. Meanwhile, the virtual biometric information may be required to be unique within the authentication system, and the second processor 120-2 according to various example embodiments of the present disclosure may generate virtual biometric information through a unique code generation algorithm. According to another example embodiment, the second processor 120-2 may generate virtual biometric information based on user identification information. For example, the second processor 120-2 may generate virtual biometric information based on user identification information such as a phone number corresponding to the second user, an ID, a MAC address, and an IEMI address. As the user identification information is used, uniqueness of the virtual biometric information may be guaranteed. According to various example embodiments of the present disclosure, the second electronic device 101-2 may display a user interface for selecting user identification information used as the virtual biometric information. The second electronic device 101-2 may set the user identification information selected through the user interface as the virtual biometric information. For example, the virtual biometric information may be set as a value that may replace the biometric information, which varies depending on the user, and there is no limitation on virtual biometric information if the virtual biometric information is different form the data on the biometric information.

Meanwhile, although [Table 2] shows that a field of the data on the biometric information is separated from a field of the virtual biometric information only for convenience of the description, the electronic device 101-1 or 101-2 according to various example embodiments of the present disclosure may manage the data on the biometric information and the virtual biometric information as one category without difference therebetween. For example, the electronic device 101-1 or 101-2 may mange the data on the biometric information and the virtual biometric information as shown in [Table 3].

TABLE 3

| User | Data on biometric information (fingerprint) |
| --- | --- |
| First user | First fingerprint shape, 0100011011 |
| Second user | Second fingerprint shape, 0100011100 |
| Third user | Third fingerprint shape, 0100011101 |
| Fourth user | Fourth fingerprint shape, 0100011110 |
| Fifth user | Fifth fingerprint shape, 0100011111 |

As the data on the biometric information and the virtual biometric information are managed as one category, the electronic device 101-1 or 101-2 may perform a user authentication based on the virtual biometric information with a little change in the existing user authentication algorithm.

The second electronic device 101-2 may store relevant information between the data on the biometric information and the virtual biometric information shown in [Table 2] or [Table 3] at a time point when the user is registered, and share the relevant information with other electronic devices including the first electronic device 101-1. Accordingly, the first memory 130-1 of the first electronic device 101-1 may also store the relevant information between the user-specific biometric information and the virtual biometric information shown in [Table 2].

Meanwhile, according to various example embodiments of the present disclosure, the second electronic device 101-2 may share only the user-specific virtual biometric information with the first electronic device 101-1. For example, the second electronic device 101-2 may share user-specific virtual biometric information as shown in [Table 4] below with the first electronic device 101-1.

TABLE 4

| User | Data on biometric information (fingerprint) |
| --- | --- |
| First user | 0100011011 |
| Second user | 0100011100 |
| Third user | 0100011101 |
| Fourth user | 0100011110 |
| Fifth user | 0100011111 |

Accordingly, the first electronic device 101-1 may store only the user-specific virtual biometric information and, in this case, security of the user's biometric information may further increase.

Meanwhile, the processor 120-2 may perform the user authentication by comparing the acquired data 694 on the biometric information with the relevant information 632 between the read data on the user-specific biometric information and the virtual biometric information. For example, the second biometric information 190-2 may sense the second fingerprint shape and transfer the data 694 on the biometric information processed from the second fingerprint shape to the second processor 120-2. The second processor 120-2 may determine that the user authenticated by comparing the acquired data 694 on the biometric information with the relevant information 632 between the data on the user-specific biometric information and the virtual biometric information is the second user and the corresponding virtual biometric information is "0100011100".

The second processor 120-2 may transfer virtual biometric information 695 corresponding to the acquired biometric information to the communication module 170-2. The communication module 170-2 may transmit a signal 696 including the received virtual biometric information 695 to the first communication module 170-1 of the first electronic device 101-1. The communication modules 170-1 and 170-2 may communicate based on various communication schemes. Particularly, even though the signal 696 is exposed, security for the user's biometric information may increase since the virtual biometric information is exposed instead of the user's biometric information.

The first communication module 170-1 may process virtual biometric information 697 from the received signal 696 and transfer the virtual biometric information 697 to the first processor 120-1. The first processor 120-1 may perform the user authentication by comparing the relevant information 631 between the data on the user-specific biometric information and the virtual biometric information read from the first memory 130, for example, shown in [Table 2] or [Table 3]. For example, when the acquired virtual biometric information 697 is "0100011100", the first processor 120-1 may determine that a target to be authenticated is the second user. Accordingly, the first electronic device 101-1 and the second electronic device 101-2 may authenticate the user of which biometric information is not exposed.

Further, when the first electronic device 101-1 includes the first biometric sensor 190-1, the first biometric sensor 190-1 may directly sense the biometric information 691. For example, the first biometric sensor 190-1 may transfer data 692 on biometric information processed from the biometric information 691 to the first processor 120-1. The first processor 120-1 may perform the user authentication by comparing the relevant information 631 between the data on user-specific biometric information and the virtual biometric information, for example, as shown in [Table 2] or [Table 3] generated by reading the data 692 on the acquired biometric information. For example, when the acquired data 692 on the biometric information is the "second fingerprint shape", the first processor 120-1 may determine that the authentication target is the second user. Accordingly, the first electronic device 101-1 and the second electronic device 101-2 may authenticate the user based on at least one piece of the virtual biometric information and the biometric information.

According to the above description, when it is required to transmit biometric information from one electronic device to another electronic device, virtual biometric information is transmitted instead of the biometric information, so that the biometric information can be protected.

Figure 7:
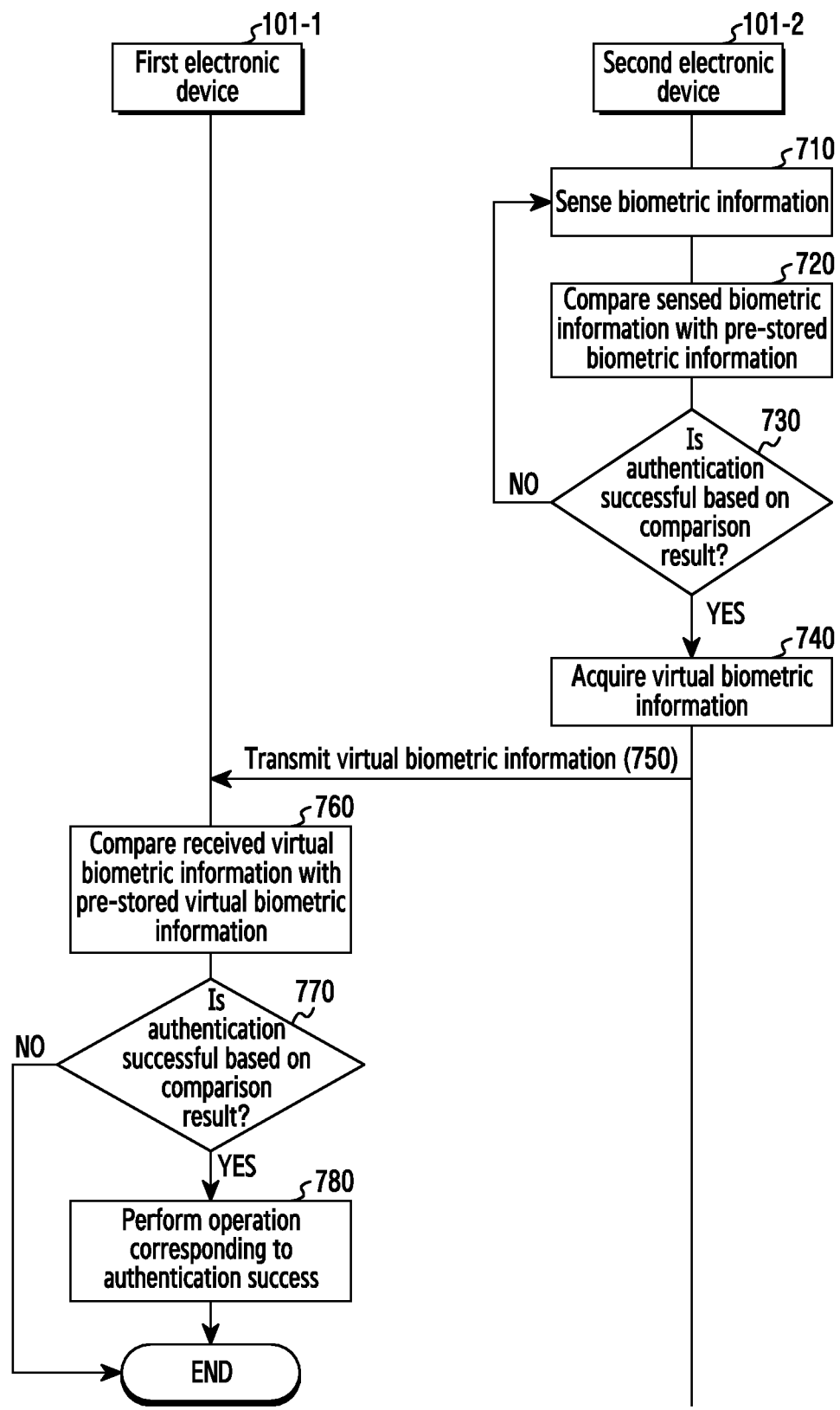
FIG. 7 is a flowchart illustrating an example method of controlling the electronic device according to various example embodiments of the present disclosure.

FIG. 7 is a flowchart illustrating an example method of controlling the electronic device according to various example embodiments of the present disclosure. According to the example embodiment of FIG. 7, the first electronic device 101-1 may be a host device that authenticates the user, and the second electronic device 101-2 may be a client device that senses biometric information. The host device may refer to an electronic device that authenticates the user based on data from the client device. The client device may refer to a device that transfers the data to the host device.

In operation 710, the second electronic device 101-2 may sense biometric information. In operation 720, the second electronic device 101-2 may compare the sensed biometric information with pre-stored biometric information. For example, the second electronic device 101-2 may store in advance relevant information between the data on the user-specific biometric information and the virtual biometric information as shown in [Table 2] or [Table 3]. The second electronic device 101-2 may compare whether there is stored data on biometric information that is mapped to the sensed data on the biometric information.

In operation 730, the second electronic device 101-2 may determine whether the user is successfully authenticated based on a result of the identification. When data on biometric information that is the same as the sensed data on the biometric information is included in the pre-stored information, the second electronic device 101-2 may determine that the authentication is successful. For example, the second electronic device 101-2 may sense the "second fingerprint shape". When it is identified that the sensed "second fingerprint shape" is included in the relevant information as shown in [Table 2] or [Table 3], the second electronic device 101-2 may determine that the user is successfully authenticated.

When the user authentication is successful, the second electronic device 101-2 may acquire virtual biometric information in operation 740. As described above, the relevant information pre-stored by the second electronic device 101-2 may include the data on the biometric information and the virtual biometric information that are mapped to each other. The second electronic device 101-2 may acquire virtual biometric information corresponding to the sensed data on the biometric information based on the pre-stored relevant information. For example, the second electronic device 101-2 may acquire virtual biometric information of "0100011100" corresponding to the sensed "second fingerprint shape". As described above, the virtual biometric information "0100011100" has no limitation if the virtual biometric information has a value having uniqueness within the user authentication system, and may be variously implemented as, for example, a MAC address of the second electronic device 101-2, a user ID, a phone number allocated to the user, or a simply generated dummy value.

In operation 750, the second electronic device 101-2 may transmit the virtual biometric information to the first electronic device 101-1. According to various example embodiments of the present disclosure, the second electronic device 101-2 may transmit the virtual biometric information to the first electronic device 101-1 in the form of raw data. According to another example embodiment of the present disclosure, the second electronic device 101-2 may encrypt the virtual biometric information to generate a cryptogram and transmit the generated cryptogram to the first electronic device 101-1. In this case, the second electronic device 101-2 may share a key for an encryption and a decryption with the first electronic device 101-1 in advance and encrypt the virtual biometric information by using the shared key. It may be easily understood by those skilled in the art that there is no limitation on an encryption method for encrypting the virtual biometric information and a decryption method of decrypting the cryptogram.

In operation 760, the first electronic device 101-1 may compare the received virtual biometric information with the pre-stored virtual biometric information. In operation 770, the first electronic device 101-1 may determine whether the user is successfully authenticated based on a result of the comparison. According to various example embodiments of the present disclosure, the first electronic device 101-1 may pre-share and store, for example, the relevant information between the data on the user-specific information and the virtual biometric information with the second electronic device 101-2 as shown in [Table 2] or [Table 3]. According to another example embodiment, the first electronic device 101-1 may share and store, in advance, for example, the user-specific virtual biometric information as shown in [Table 4] with the second electronic device 101-2.

The first electronic device 101-1 may determine whether the user is successfully authenticated by determining whether virtual biometric information, which is the same as the received virtual biometric information, is included in the pre-stored relevant information. For example, the first electronic device 101-1 may determine that the user is successfully authenticated by identifying that virtual biometric information "0100011100" is included in the relevant information as shown in [Table 2] or [Table 3] or the user-specific virtual biometric information as shown in [Table 4]. Further, the first electronic device 101-1 may determine that a target to be authenticated is the second user.

In operation 780, the first electronic device 101-1 may perform an operation corresponding to the authentication success. For example, the first electronic device 101-1 may authenticate the user during an electronic commerce application process, and may continue or stop the electronic commerce according to a result of the user authentication. According to various example embodiments of the present disclosure, the first electronic device 101-1 may use the user authentication in various processes and there is no limitation on the operation corresponding to the user authentication.

As described above, the first electronic device 101-1 may authenticate the user based on the virtual biometric information received from the second electronic device 101-2. For example, as the virtual biometric information is transmitted and received between the electronic devices 101-1 and 101-2, the user's biometric information may be protected even though the virtual biometric information is exposed in the transmission/reception process.

Figure 8A:
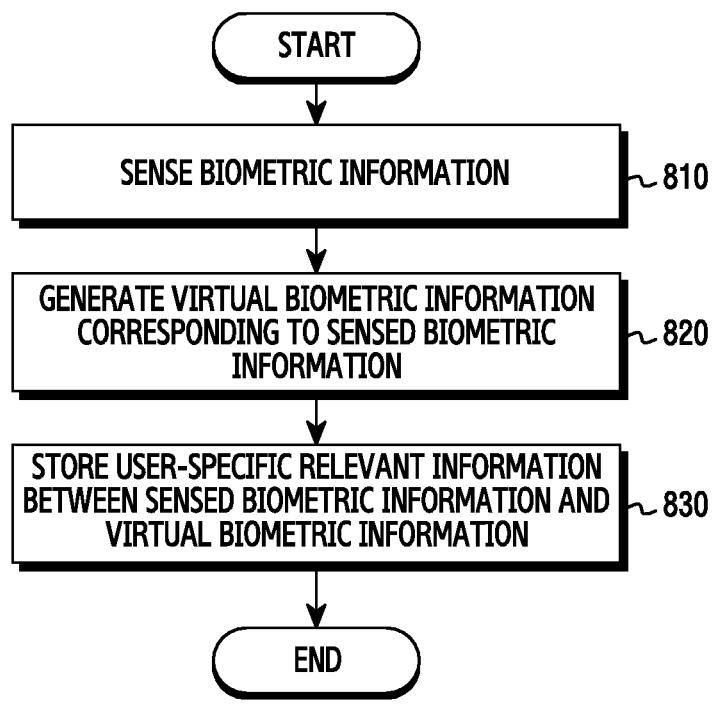
FIGS. 8A, 8B and 8C are flowcharts illustrating an example operation of the electronic device while biometric information is registered according to various example embodiments of the present disclosure.
Figure 8B:
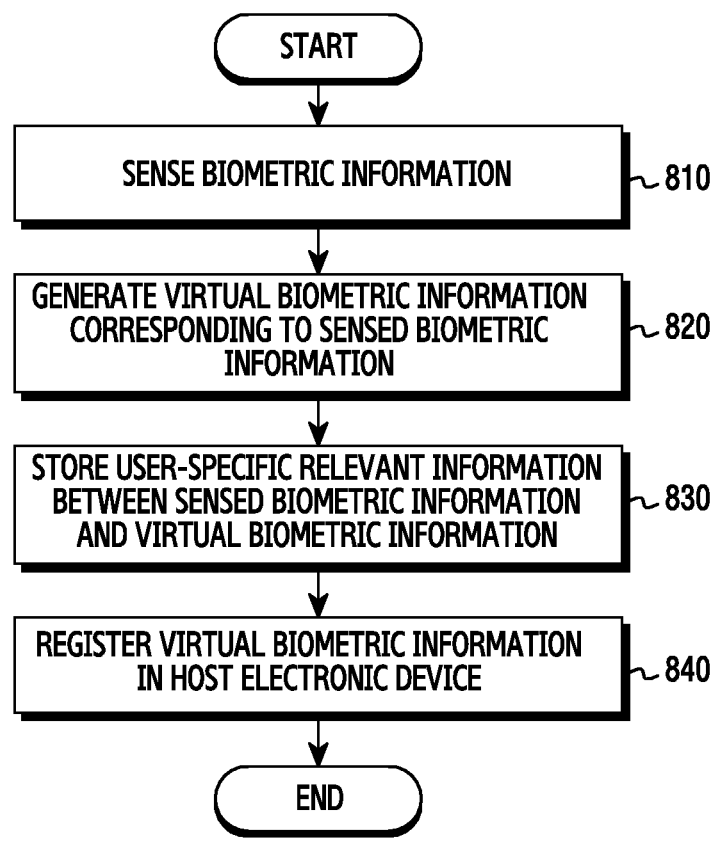
Figure 8C:
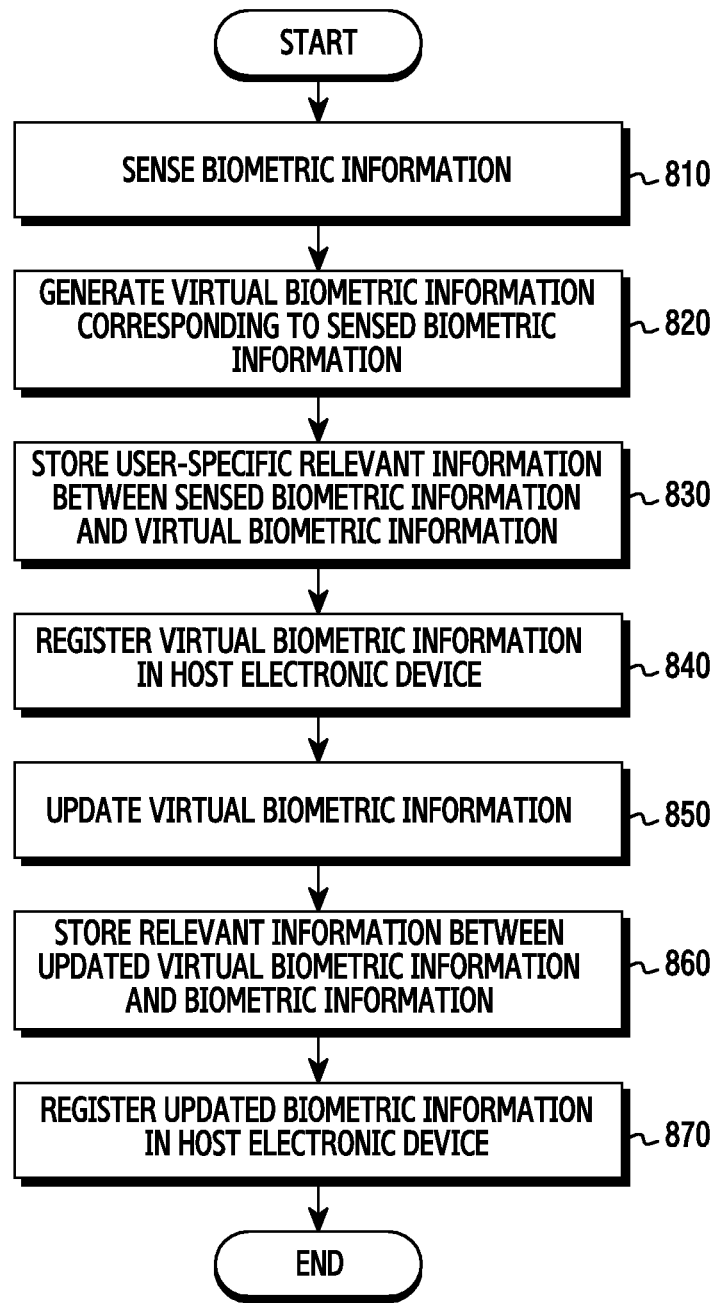

FIGS. 8A, 8B and 8C are flowcharts illustrating an example operation of the electronic device while biometric information is registered according to various example embodiments of the present disclosure.

Referring to FIG. 8A, the electronic device 101 may sense biometric information to register the biometric information in operation 810. According to various example embodiments of the present disclosure, at a time point when the user subscribes to the user authentication system, the electronic device 101 may display a user interface that asks the user to register biometric information. The user may input the biometric information into the electronic device 101 according to a user interface, and the electronic device 101 may sense the biometric information.

In operation 820, the electronic device 101 may generate virtual biometric information corresponding to the sensed biometric information. According to various example embodiments of the present disclosure, the electronic device 101 may generate virtual biometric information having a value of which uniqueness is guaranteed in the user authentication system. For example, the electronic device 101 may generate the virtual biometric information through an algorithm for calculating the value of which uniqueness is guaranteed. Alternatively, the electronic device 101 may use user relevant information such as a user ID of which uniqueness is guaranteed or a phone number allocated to the user may be used as the virtual biometric information. Alternatively, the electronic device 101 may use electronic device relevant information such as a MAC address as the virtual biometric information.

In operation 830, the electronic device 101 may store user-specific relevant information between the sensed biometric information and virtual biometric information.

According to the above description, the electronic device 101 may generate user-specific virtual biometric information and generate relevant information between the biometric information and the virtual biometric information. When another user additionally subscribes, the electronic device 101 may repeat the above described process for the subscribed user, and add and manage relevant information.

Referring to FIG. 8B, in operation 840, the electronic device 101 may register the generated virtual biometric information in a host electronic device. More specifically, the electronic device 101 may share relevant information between user-specific biometric information and virtual biometric information with another electronic device, for example, the host electronic device.

Referring to FIG. 8C, in operation 850, the electronic device 101 may update the virtual biometric information. As described above in connection with FIG. 7, the electronic device 101 may transmit and receive the virtual biometric information to and from another electronic device in the user authentication process. The virtual biometric information may be used instead of the biometric information, and thus periodic replacement thereof may be needed. Accordingly, when a periodic or user command is input, the electronic device 101 may update the user-specific biometric information to be another value. The electronic device 101 may determine updated virtual biometric information according to a user's selection or determine the updated virtual biometric information through a preset selection algorithm.

In operation 860, the electronic device 101 may store relevant information between the updated virtual biometric information and the biometric information according to the user. In operation 870, the electronic device 101 may register the updated virtual biometric information in the host electronic device. For example, the electronic device 101 may share the relevant information between the user-specific biometric information and the updated virtual biometric information with another electronic device, for example, the host electronic device.

According to the above description, the security may be further improved compared to the conventional user authentication system using biometric information which cannot be updated to be another value.

Figure 9:
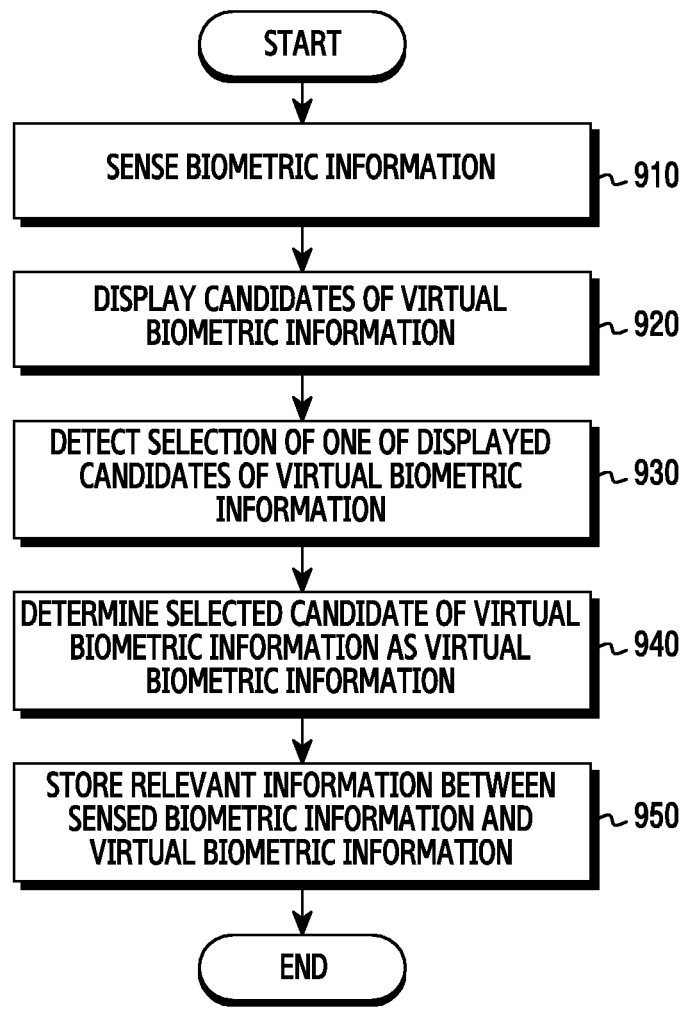
FIG. 9 is a flowchart illustrating an example process of selecting virtual biometric information according to various example embodiments of the present disclosure.
Figure 10A:
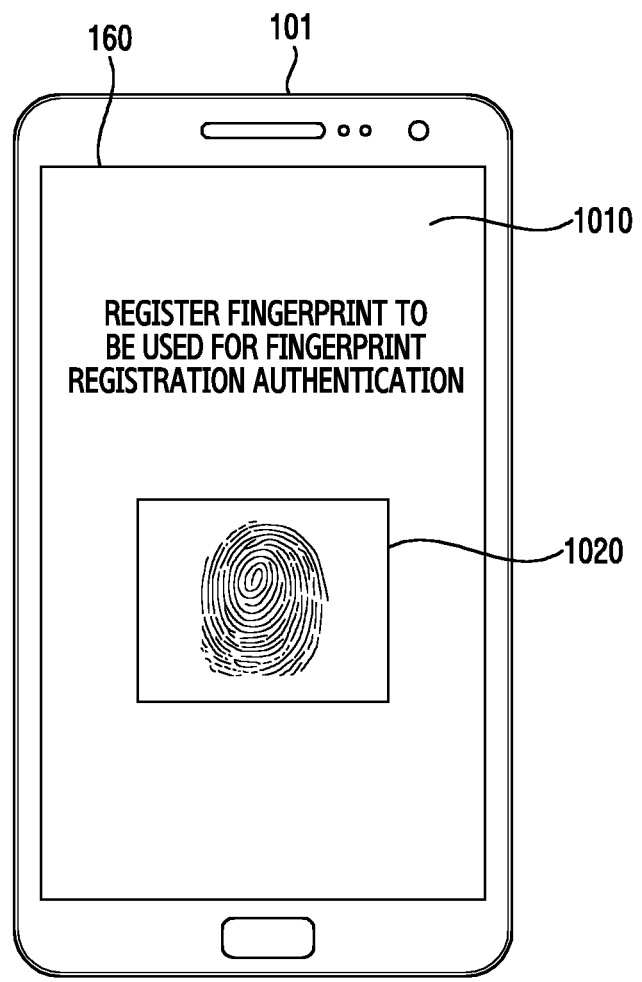
FIGS. 10A and 10B are diagrams illustrating an example operation of the electronic device according to various example embodiments of the present disclosure.
Figure 10B:
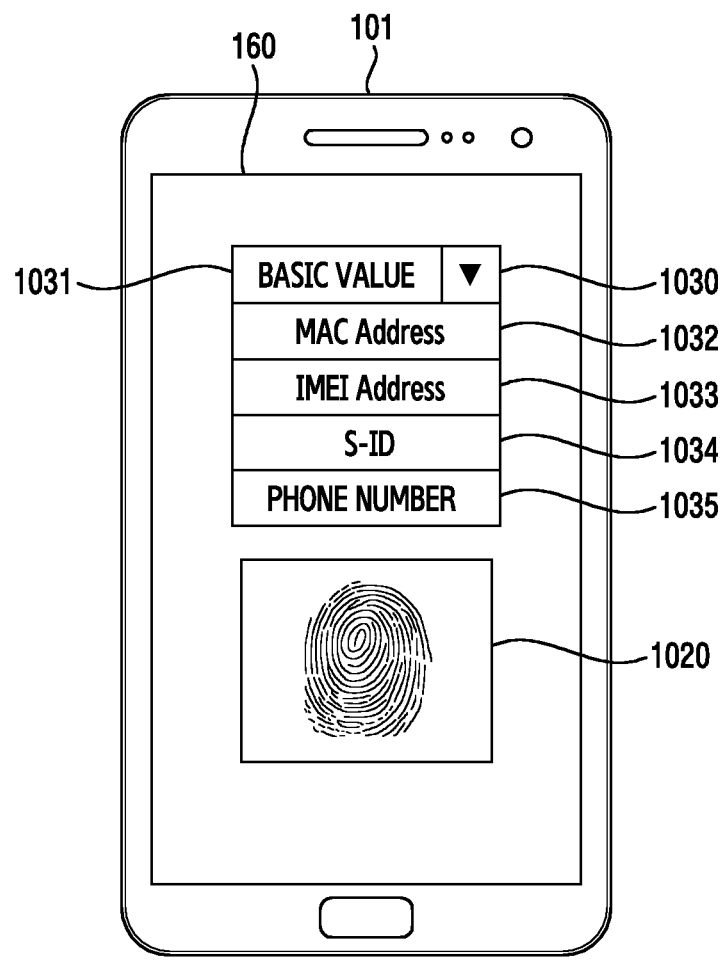

FIG. 9 is a flowchart illustrating an example process of selecting virtual biometric information according to various example embodiments of the present disclosure. The example embodiment of FIG. 9 will be described in greater detail with reference to FIGS. 10A and 10B. FIGS. 10A and 10B are diagrams illustrating an example operation of the electronic device according to various example embodiments of the present disclosure.

Referring to FIG. 9, the electronic device 101 may sense biometric information to register the biometric information in operation 910. According to various example embodiments of the present disclosure, at a time point when the user subscribes to the user authentication system, the electronic device 101 may display a user interface that asks the user to register biometric information. The user may input the biometric information into the electronic device 101 according to a user interface, and the electronic device 101 may sense the biometric information. For example, as illustrated in FIG. 10A, the electronic device 101 may display a user interface 1010 that makes a request for inputting biometric information, for example, a fingerprint on the display 160. The user may input the fingerprint according to the user interface 1010, and the electronic device 101 may display a shape 1020 of the input fingerprint in order to help user recognition.

In operation 920, the electronic device 101 may display candidates of virtual biometric information. For example, as illustrated in FIG. 10B, the electronic device 101 may display a selection box 1030 for selecting one of candidates 1031 to 1035 of the virtual biometric information on the display 160. In the example embodiment of FIG. 10B, the candidates 1031 to 1035 of the virtual biometric information may include various pieces of information such as a basic value of which uniqueness is guaranteed, a Media Access Control (MAC) address, an International Mobile Equipment Identity (IMEI) address, a user ID, and a phone number.

In operation 930, the electronic device 101 may detect the selection of one of the displayed candidates of the virtual biometric information. For example, the user may select the candidate 1035 of the phone number in the selection box 1030, and the user 101 may detect the selected candidate based on a position of the touch by the user.

In operation 940, the electronic device 101 may determine the selected candidate of the virtual biometric information as the virtual biometric information. For example, when the candidate 1035 of the phone number is selected, the electronic device 101 may determine the phone number as the virtual biometric information in FIG. 10B. In operation 950, the electronic device 101 may store relevant information between the sensed biometric information and the virtual biometric information. For example, the electronic device 101 may store the relevant information as shown in [Table 2] or [Table 3] such that the user is linked with input fingerprint information and a phone number. The electronic device 101 may share the relevant information with another electronic device such as a host device.

Thereafter, when the user is authenticated, the electronic device 101 may ask the user to input the fingerprint and, when the input fingerprint information matches pre-stored fingerprint information, may transmit the phone number to the host device as the virtual biometric information. The host device may compare the received phone number with the pre-stored relevant information and authenticate the user according to a result of the comparison.

FIGS. 11A, 11B, 11C and 11D are diagrams illustrating an example process of registering a vein shape.

Figure 11A:
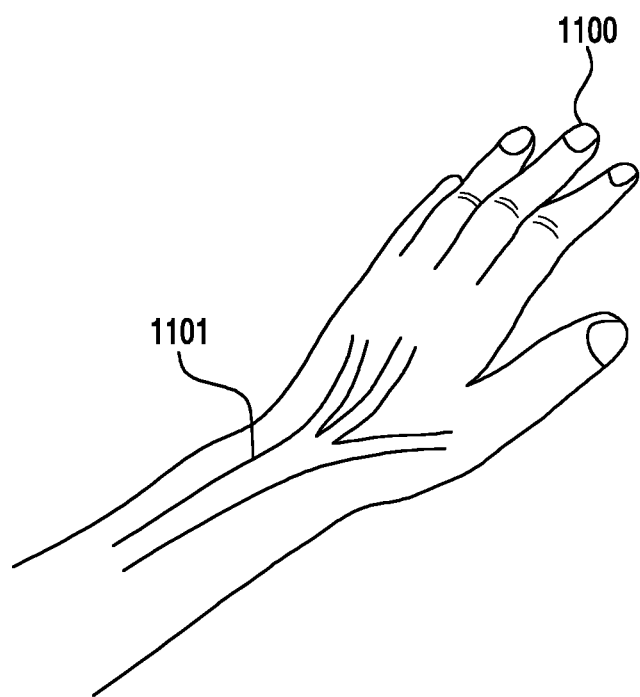
FIGS. 11A, 11B, 11C and 11D are diagrams illustrating an example process of registering a vein shape.

Referring to FIG. 11A, a vein 1101 may be located at the inner side of a wrist of a user's hand 1100. The vein 1101 corresponds to a blood vessel through which blood circulating in an arterial system flows toward the heart, and the shape of the vein 1101 located at the inner side of the wrist may vary depending on each person. Since the shape varies depending on each person, the vein 1101 may be used for authenticating the user and many conventional technologies for an authentication by the shape of the vein 1101 have been developed.

Figure 11B:
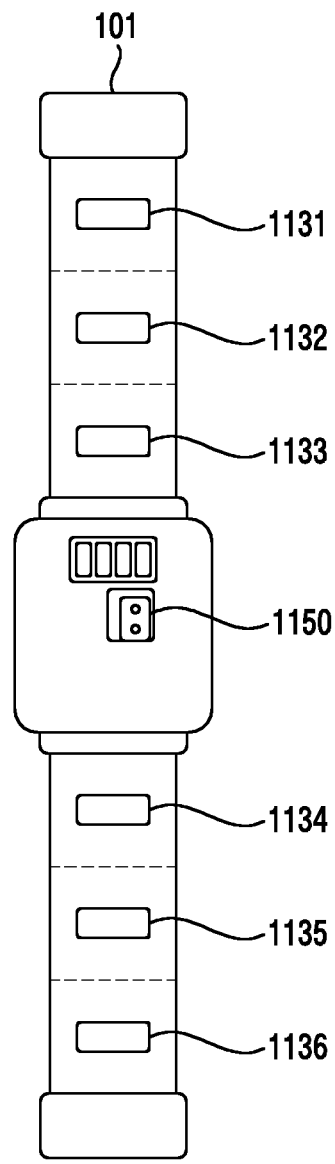

Referring to FIG. 11B, the electronic device 101 according to various example embodiments of the present disclosure may be implemented as a wrist watch type wearable electronic device. Inward sensors 1131 to 1136 and 1150 may be included on the rear surface of the electronic device 101. The inward sensors 1131 to 1136 may be implemented as, for example, a pressure sensor, an optical sensor, and an electrode, and may recognize a user's touch, an ECG signal, and a fingerprint. According to an example embodiment, the inward sensor 1150 may be implemented as an optical sensor and may include a Heart Rate Monitor (HRM) sensor, a Blood Pressure (BP) sensor, a glucose sensor, a body temperature sensor, a vein sensor, and a bio-marker sensor.

Figure 11C:
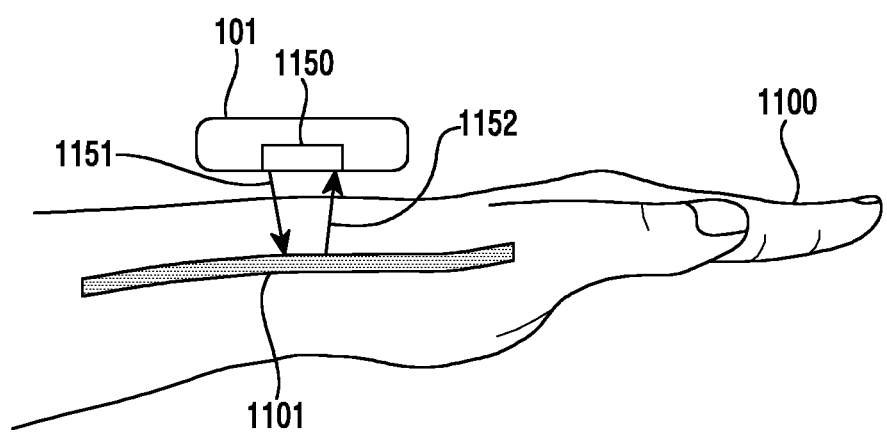
Figure 11D:
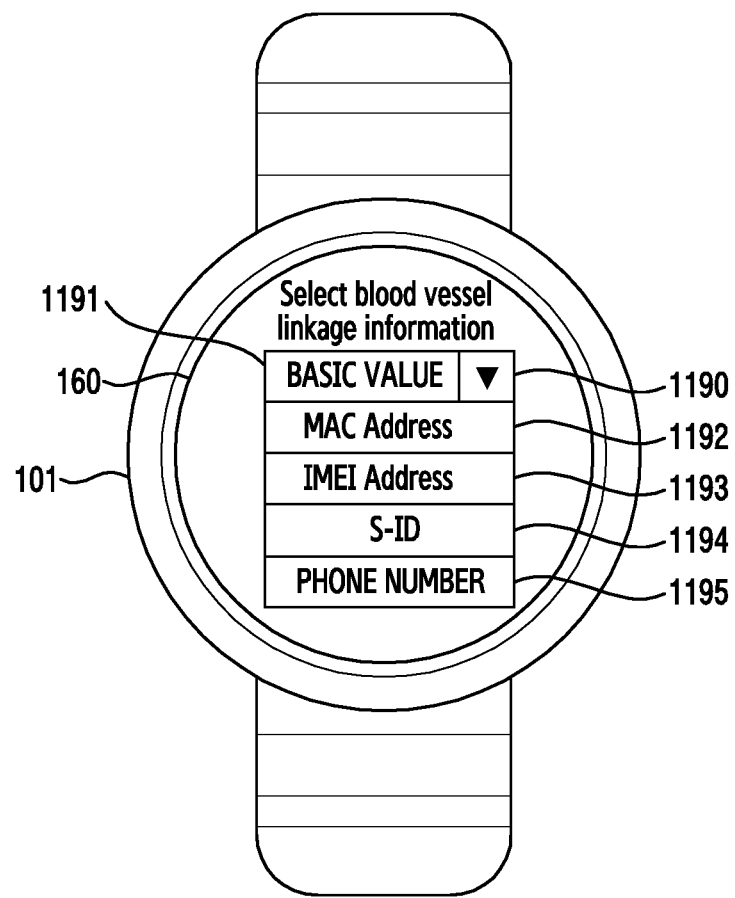

For example, as illustrated in FIG. 11C, the inward sensor 1150 may radiate a light 1151 toward the user's hand 1100. The light 1151 may be reflected by the vein 1101, and the reflected light 1152 may be input into the inward sensor 1150. The inward sensor 1150 may recognize the shape of the vein 1101 using the received reflected light 1152.

The electronic device 101 may display a selection box 1190 for selecting one of candidates 1191 to 1195 of virtual biometric information on the display 160. In the example embodiment of FIG. 11D, the candidates 1191 to 1195 of the virtual biometric information may include various pieces of information such as a basic value of which uniqueness is guaranteed, a MAC address, an IMEI address, a user ID, and a phone number. The electronic device 101 may detect the selection of one of the displayed candidates of the virtual biometric information. For example, the user may select the candidate 1195 of the phone number in the selection box 1190, and the user 101 may detect the selected candidate based on a position of the touch by the user. The electronic device 101 may determine the selected candidate 1195 as virtual biometric information and store the virtual biometric information to be linked with a shape of the vein 1101. Meanwhile, according to various embodiments of the present disclosure, the electronic device 101 may acquire virtual biometric information corresponding to the shape of the vein 1101 based on a preset virtual biometric information determination method without the user's selection.

Figure 12A:
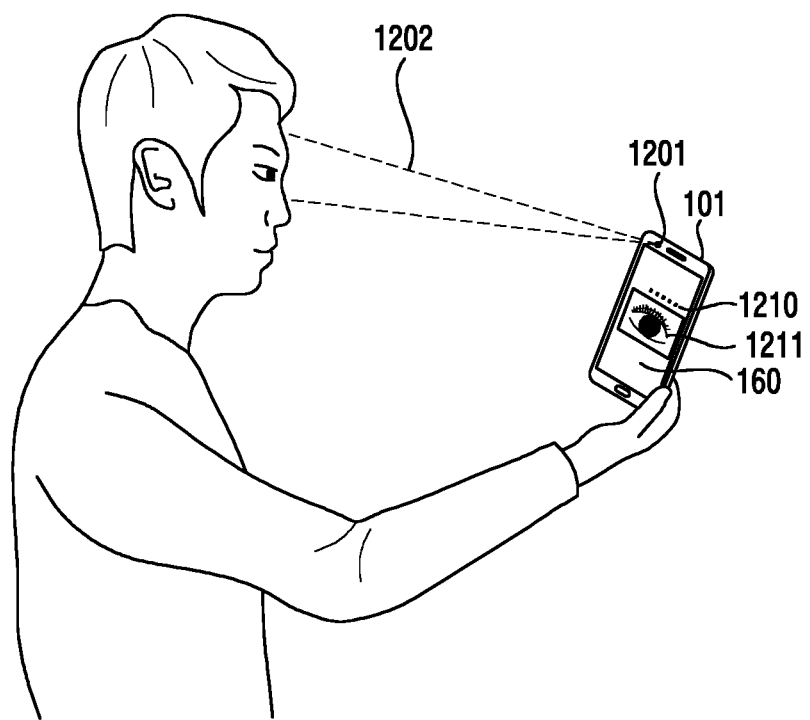
FIGS. 12A and 12B are diagrams illustrating an example iris shape registration according to various example embodiments of the present disclosure.
Figure 12B:
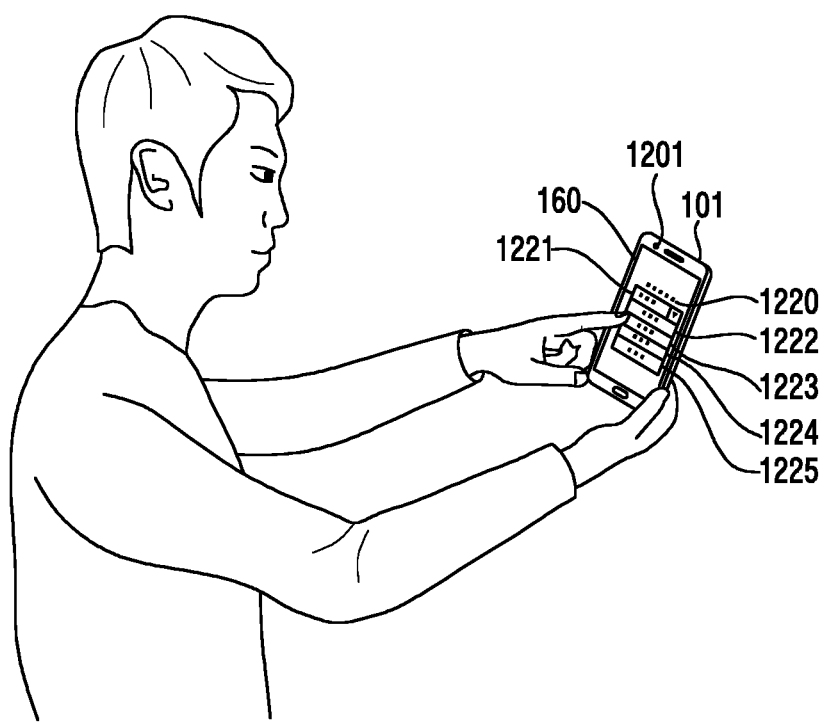

FIGS. 12A and 12B are diagrams illustrating an example iris shape registration according to various example embodiments of the present disclosure.

Referring to FIG. 12A, the electronic device 101 may display a user interface 1210 for iris recognition. The electronic device 101 may photograph a user's face portion using a camera 1201 as indicated by reference numeral 1202. The user interface 1210 for iris recognition according to various embodiments of the present disclosure may include a shape of an iris 1211 photographed to help user recognition. The electronic device 101 may determine virtual biometric information corresponding to the shape of the iris.

For example, as illustrated in FIG. 12B, the electronic device 101 may display a selection box 1220 for selecting one of candidates 1221 to 1225 of the virtual biometric information on the display 160. In the example embodiment of FIG. 12B, the candidates 1221 to 1225 of the virtual biometric information may include various pieces of information such as a basic value of which uniqueness is guaranteed, a MAC address, an IMEI address, a user ID, and a phone number. The electronic device 101 may detect the selection of one of the displayed candidates of the virtual biometric information. For example, the user may select the candidate 1223 of the IMEI in the selection box 1220, and the electronic device 101 may detect the selected candidate based on a position of the touch by the user. The electronic device 101 may determine the selected candidate 1223 as virtual biometric information and store the virtual biometric information to be linked with a shape of the iris 1211. Meanwhile, according to various example embodiments of the present disclosure, the electronic device 101 may acquire virtual biometric information corresponding to the shape of the iris 1221 based on a preset virtual biometric information determination method without user's selection.

Figure 13:
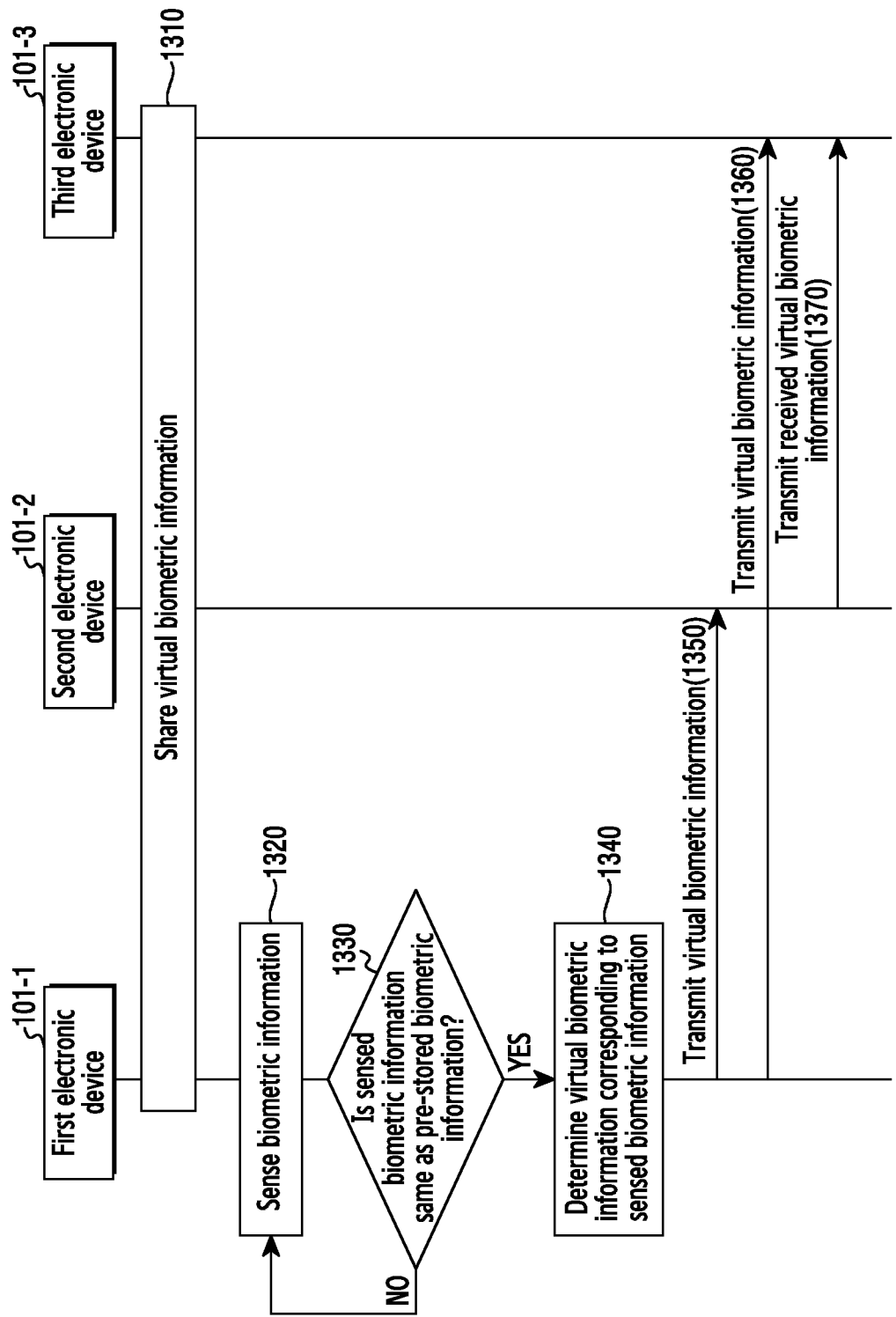
FIG. 13 is a flowchart illustrating an example method of controlling the electronic device in an Internet of Things (IoT) environment according to various example embodiments of the present disclosure.
Figure 14A:
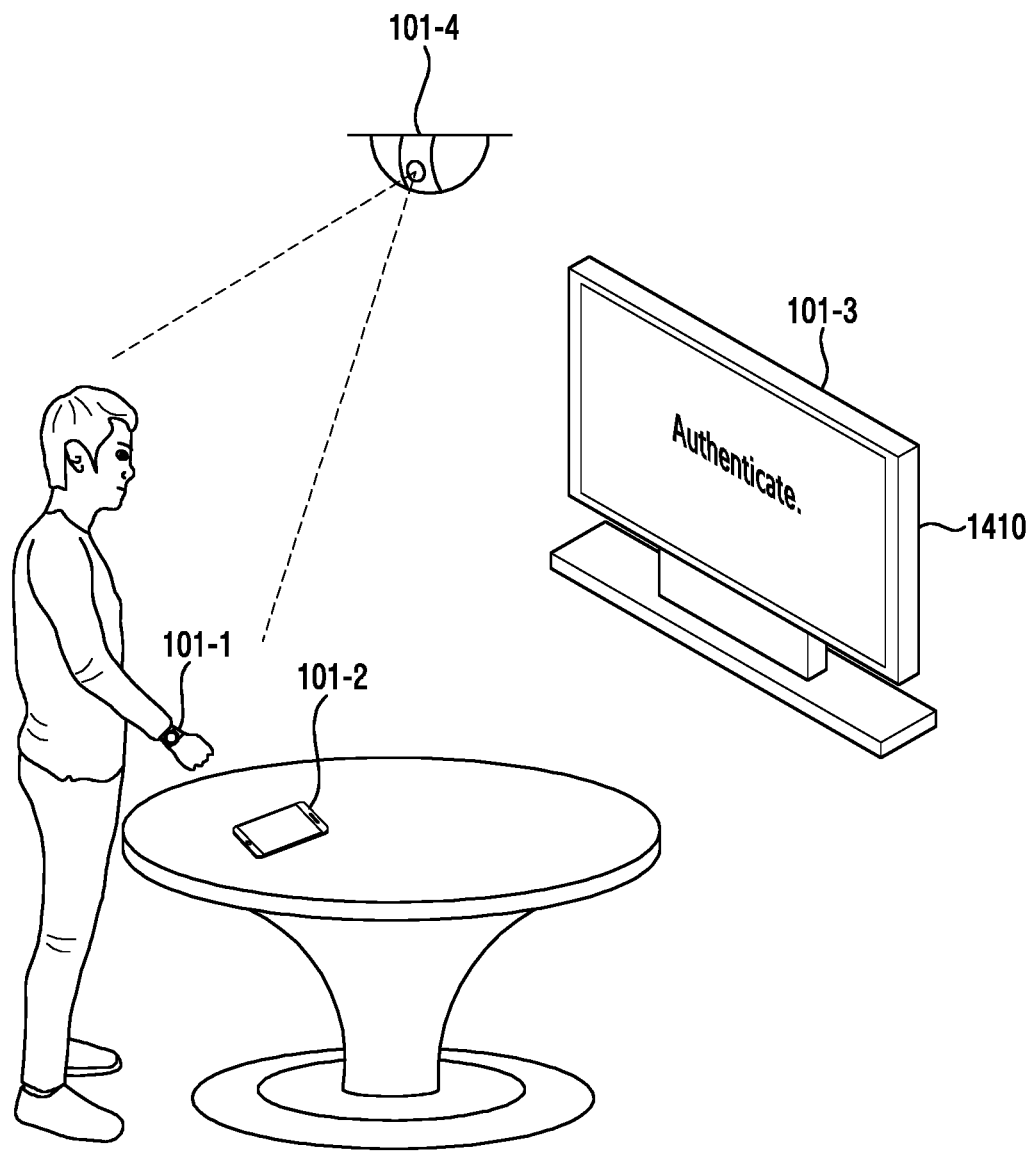
FIGS. 14A and 14B are diagrams illustrating an example operation of the electronic device in the IoT environment according to various example embodiments of the present disclosure.
Figure 14B:
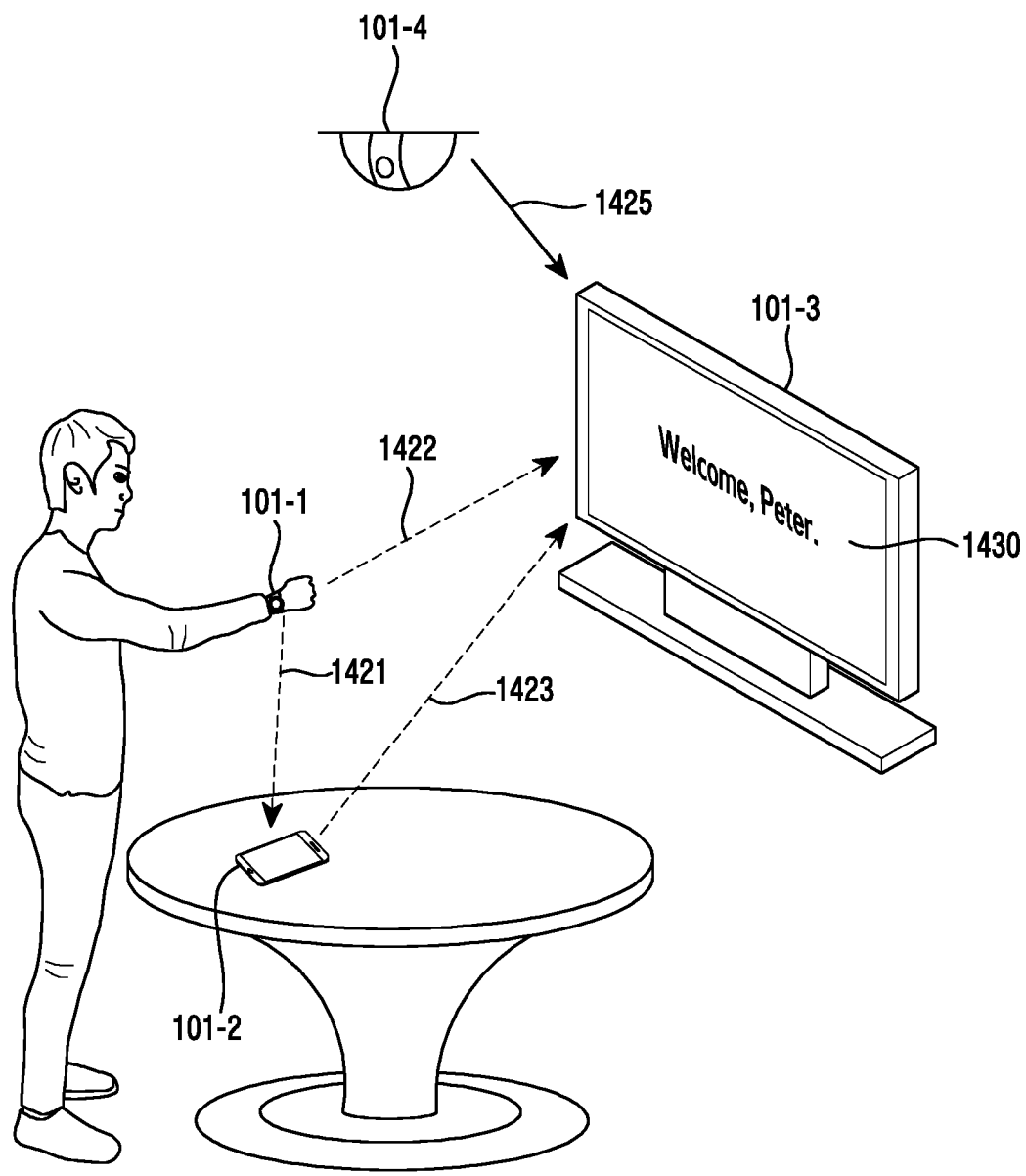

FIG. 13 is a flowchart illustrating an example method of controlling an electronic device in an Internet of Things (IoT) environment according to various example embodiments of the present disclosure. The embodiment of FIG. 13 will be described in greater detail with reference to FIGS. 14A and 14B. FIGS. 14A and 14B are diagrams illustrating an example operation of the electronic device in the IoT environment according to various example embodiments of the present disclosure.

In operation 1310, the first electronic device 101-1 may share virtual biometric information with the second electronic device 101-2 and the third electronic device 101-3. It is assumed that operation 1310 is performed at a time point when the virtual biometric information is registered. According to various example embodiments of the present disclosure, the first electronic device 101-1 may acquire biometric information at the time point when the biometric information is registered, and determine virtual biometric information corresponding to the acquired biometric information. The first electronic device 101-1 may share relevant information between user-specific biometric information and virtual biometric information with other electronic devices 101-2 and 101-3. According to another example embodiment, the first electronic device 101-1 may share user-specific virtual biometric information with other electronic devices 101-2 and 101-3.

For example, as illustrated in FIG. 14A, the first electronic device 101-1 may share, in advance, relevant information between user-specific biometric information and virtual biometric information or user-specific biometric information with other electronic devices 101-2, 101-3, and 101-4. For example, the first electronic device 101-1 may be implemented as a wrist watch type wearable electronic device, and may sense a user's vein shape and share virtual biometric information corresponding to the user's vein shape with other electronic devices 101-2, 101-3, and 101-4. In the example embodiment of FIGS. 14A and 14B, it is assumed that the electronic device shares only virtual biometric information with other electronic devices. For example, virtual biometric information of a first user that the first electronic device 101-1 shares with other electronic devices 101-2, 101-3, and 101-4 may be as shown in [Table 5].

TABLE 5

| User | Biometric information type | Data on biometric information (virtual biometric information) |
|---|---|---|
| First user | Vein shape | 010-1234-1111 |

As shown in [Table 5], the first electronic device 101-1 may determine a phone number allocated to the first electronic device 101-1 as the virtual biometric information of the vein shape and shape the phone number with other electronic devices 101-2, 101-3, and 101-4. Meanwhile, the first electronic device 101-1 may store relevant information between the vein shape and the virtual biometric information.

Further, the fourth electronic device 101-4 may include a camera and sense a user's face shape and a gait habit as the biometric information. The fourth electronic device 101-4 may determine virtual biometric information corresponding to the biometric information such as the user's face shape or the user's gait habit and share the virtual biometric information with other electronic devices 101-1, 101-2, and 101-3.

For example, the virtual biometric information of the first user which the fourth electronic device 101-4 shares with the other electronic devices 101-1, 101-2, and 101-3 may be as shown in [Table 6].

TABLE 6

| User | Biometric information type | Virtual biometric information |
|---|---|---|
| First user | Face shape<br>Gait habit | 0100011011<br>11, 22, 33, 44, 55, 66 |

As shown in [Table 6], the fourth electronic device 101-4 may determine a dummy value of which uniqueness is guaranteed as the virtual biometric information of the face shape, determine a MAC address allocated to the fourth electronic device 101-4 as the virtual biometric information of the gait habit, and share the determined virtual biometric information with the other electronic devices 101-1, 101-2, and 101-3. Meanwhile, the fourth electronic device 101-4 may store relevant information between the face shape and gait habit, and the virtual biometric information.

Accordingly, all the electronic devices 101-1 to 101-4 within the system may store user-specific virtual biometric information as shown in [Table 7].

TABLE 7

| User | Biometric information type | Virtual biometric information |
|---|---|---|
| First user | Vein shape<br>Face shape<br>Gait habit | 010-1234-1111<br>0100011011<br>11, 22, 33, 44, 55, 66 |

Referring back to FIG. 13, in operation 1320, the first electronic device 101-1 may sense biometric information. In the example embodiment of FIG. 13, it is assumed that operation 1310 is performed at a registration time point and operations after operation 1320 are performed in an authentication process. According to various example embodiments of the present disclosure, the first electronic device 101-1 may provide a user interface that induces the user to input biometric information and sense the biometric information. Meanwhile, according to another example embodiment, the first electronic device 101-1 may sense the biometric information from the user without consciousness of the user.

For example, as illustrated in FIG. 14B, a host device (for example, the third electronic device 101-3) that authenticates the user may transmit a user authentication command to the first electronic device 101-1 and the fourth electronic device 101-4, and the first electronic device 101-1 and the fourth electronic device 101-4 may authenticate the user. The host device (for example, the third electronic device 101-3) may output an authentication request screen 1410.

In operation 1330, the first electronic device 101-1 may determine whether the sensed biometric information is the same as pre-stored biometric information. In operation 1340, the first electronic device 101-1 may determine virtual biometric information corresponding to the sensed biometric information. In operation 1350 and operation 1360, the first electronic device 101-1 may transmit virtual biometric information to the host device (for example, the third electronic device 101-3) or another electronic device (for example, the second electronic device 101-2). Further, in operation 1370, the second electronic device 101-2 may transmit the received virtual biometric information to the host device (for example, the third electronic device 101-3).

For example, as illustrated in FIG. 14B, the first electronic device 101-1 may sense the user's vein shape. The first electronic device 101-1 may transmit virtual biometric information 1422 corresponding to the sensed vein shape (for example, "010-1234-1111") to the host device (for example, the third electronic device 101-3) based on relevant information between the pre-stored vein shape and the virtual biometric information.

When the first electronic device 101-1 is connected only to the second electronic device 101-2 through short-range communication such as Bluetooth communication, the first electronic device 101-1 may transmit virtual biometric information 1421 to the second electronic device 101-2 and the second electronic device 101-2 may transmit virtual biometric information 1423.

Further, the fourth electronic device 101-4 may transmit virtual biometric information 1425 corresponding to the sensed face shape and the gait habit (for example, "0100011011" and "11.22.33.44.55.66") based on relevant information between the pre-stored face shape and gait habit, and the virtual biometric information.

Accordingly, the host device (for example, the third electronic device 101-3) may receive "010-1234-1111" 1422, and "0100011011" and "11.22.33.44.55.66" 1425. The host device (for example, the third electronic device 101-3) may compare the pre-stored user-specific virtual biometric information as shown in [Table 7] and the received virtual biometric information 1422 and 1425 and determine that a target to be authenticated is a first user. The host device (for example, the third electronic device 101-3) may output an identified authentication screen 1430.

As described above, the host device in the IoT environment may receive virtual biometric information corresponding to various pieces of biometric information from electronic devices including various types of sensors and authenticate the user. Particularly, when information sharing is frequently generated like in the IoT environment, security may be more focused on as virtual biometric information is used instead of biometric information.

Figure 15:
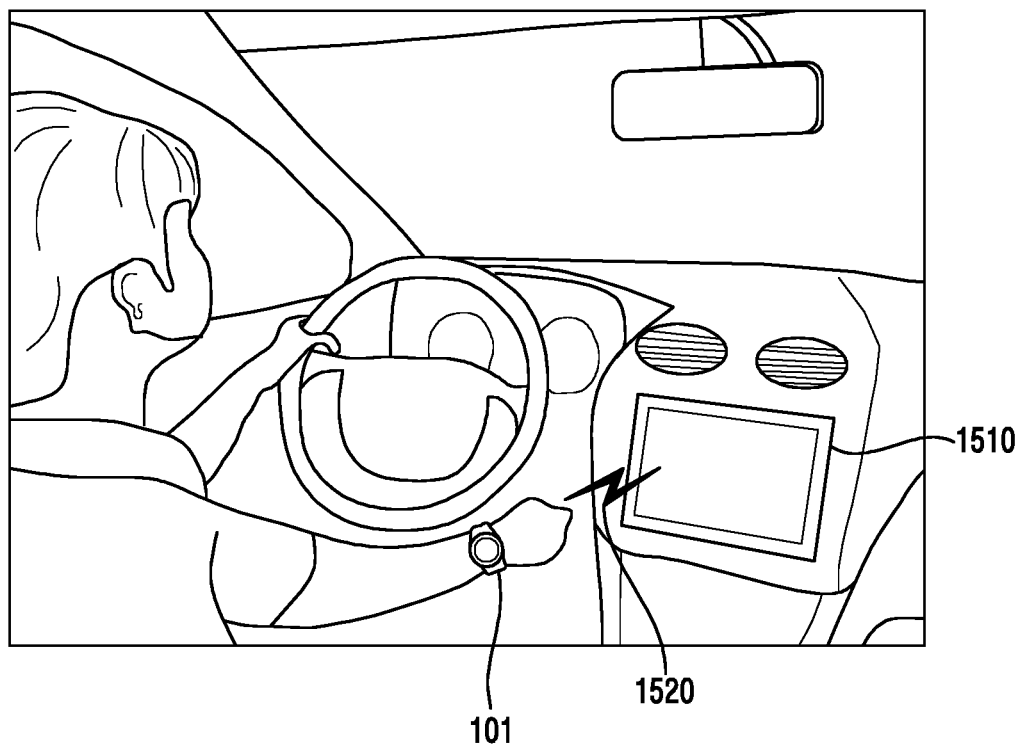
FIG. 15 is a diagram illustrating an example user authentication process in a car.

FIG. 15 is a diagram illustrating an example user authentication process in a car.

As illustrated in FIG. 15, the car may include an electronic device 1510 for performing a user authentication. The electronic device 1510 may control at least one other electric field included in the car based on a result of the performance of the user authentication. The electronic device 1510 may communicate with the electronic device 101. Meanwhile, at a time point when biometric information of the user is registered, the electronic device 101 may acquire the biometric information and store the biometric information to be linked with virtual biometric information corresponding to the biometric information. Further, the electronic device 101 may share relevant information between user-specific biometric information and virtual biometric information with the electronic device 1510. The electronic device 101 may share the user-specific virtual biometric information with the electronic device 1510.

Meanwhile, at a time point when the user is authenticated, the electronic device 101 may sense biometric information from the user. For example, the electronic device 101 may sense the user's vein shape as the biometric information. The electronic device 101 may determine virtual biometric information corresponding to the acquired vein shape and transmit virtual biometric information 1520 to the electronic device 1510. The electronic device 1510 may compare the received virtual biometric information 1520 with pre-stored virtual biometric information and authenticate the user based on a result of the comparison. Accordingly, even though a sensor for sensing the biometric information is not included in the car, the user authentication using the biometric information is possible.

Figure 16:
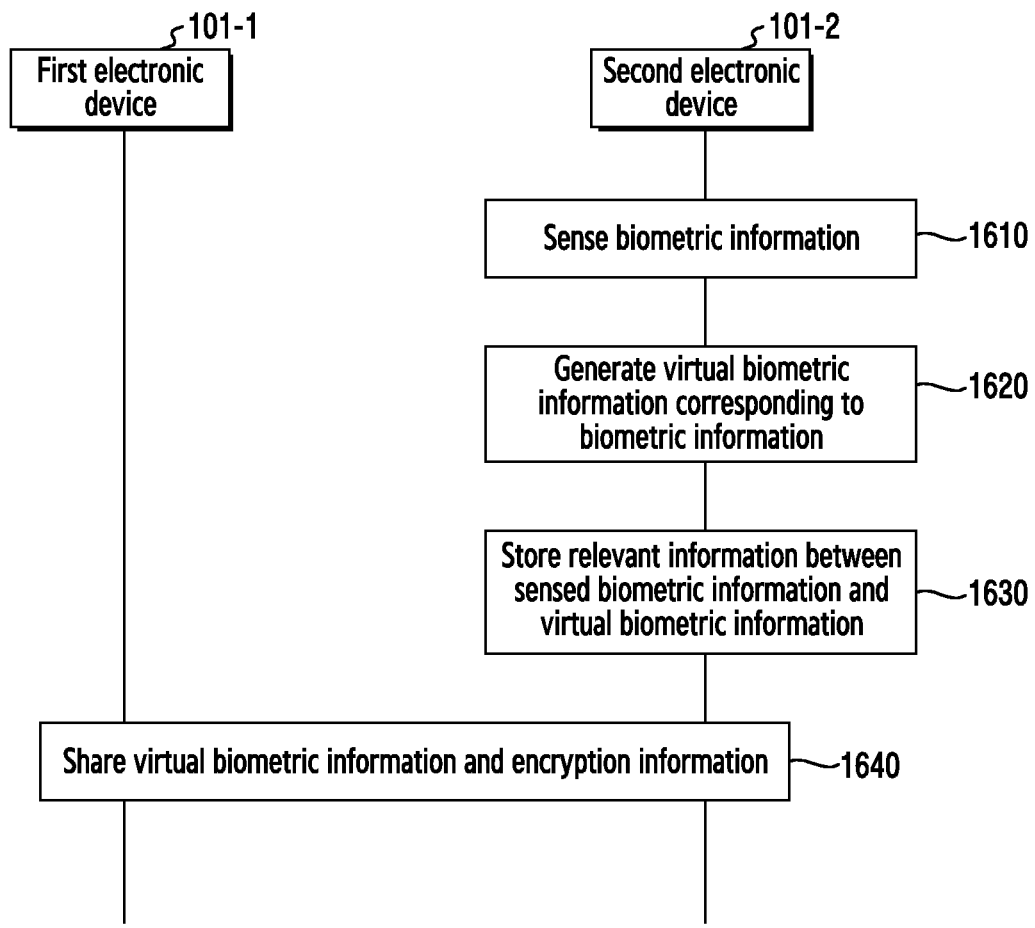
FIG. 16 is a flowchart illustrating an example method of registering biometric information registration by the electronic device according to various example embodiments of the present disclosure.

FIG. 16 is a flowchart illustrating an example method of registering biometric information registration by the electronic device according to various example embodiments of the present disclosure.

In operation 1610, the second electronic device 101-2 may sense the biometric information at a time point when the biometric information is registered. In operation 1620, the second electronic device 101-2 may generate virtual biometric information corresponding to the biometric information. As described above, the second electronic device 101-2 may generate a value which is different from data on the biometric information and of which uniqueness is guaranteed as the virtual biometric information.

In operation 1630, the second electronic device 101-2 may store relevant information between the sensed biometric information and the virtual biometric information. In operation 1640, the second electronic device 101-2 may share the virtual biometric information and encryption information with the first electronic device 101-1. The first electronic device 101-1 may store user-specific virtual biometric information and encryption information.

Figure 17:
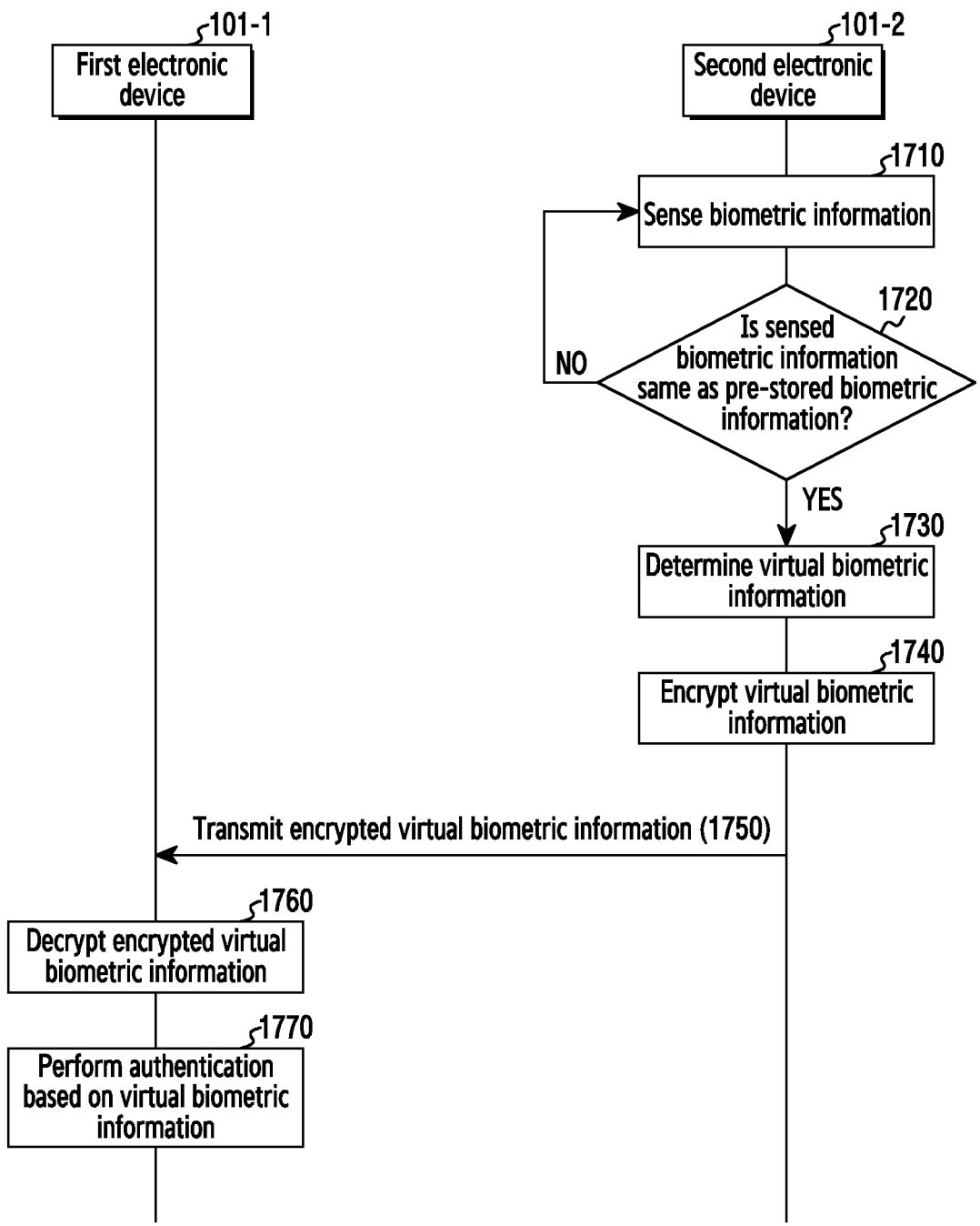
FIG. 17 is a flowchart illustrating an example user authentication process of the electronic device according to various example embodiments of the present disclosure.

FIG. 17 is a flowchart illustrating an example user authentication process of the electronic device according to various example embodiments of the present disclosure.

In operation 1710, the second electronic device 101-2 may sense biometric information at a time point when the user is authenticated. In operation 1720, the second electronic device 101-2 may determine whether the sensed biometric information is the same as pre-stored biometric information. When the sensed biometric information is the same as the pre-stored biometric information, the second electronic device 101-2 may determine virtual biometric information corresponding to the pre-stored biometric information in operation 1730.

In operation 1740, the second electronic device 101-2 may encrypt the virtual biometric information. The second electronic device 101-2 may encrypt the virtual biometric information using, for example, the encryption information which the second electronic device 101-2 shares with the first electronic device 101-1 in FIG. 16. In operation 1750, the second electronic device 101-2 may transmit the encrypted virtual biometric information to the first electronic device 101-1.

In operation 1760, the first electronic device 101-1 may decrypt the encrypted virtual biometric information. For example, the first electronic device 101-1 may decrypt the encrypted virtual biometric information using the encryption information received from the second electronic device 101-2 in FIG. 16. In operation 1770, the first electronic device 101-1 may authenticate the user based on the virtual biometric information.

As described above, the electronic device according to various example embodiments of the present disclosure may encrypt the virtual biometric information and then transmit the encrypted virtual biometric information, thereby increasing security of the virtual biometric information.

Figure 18:
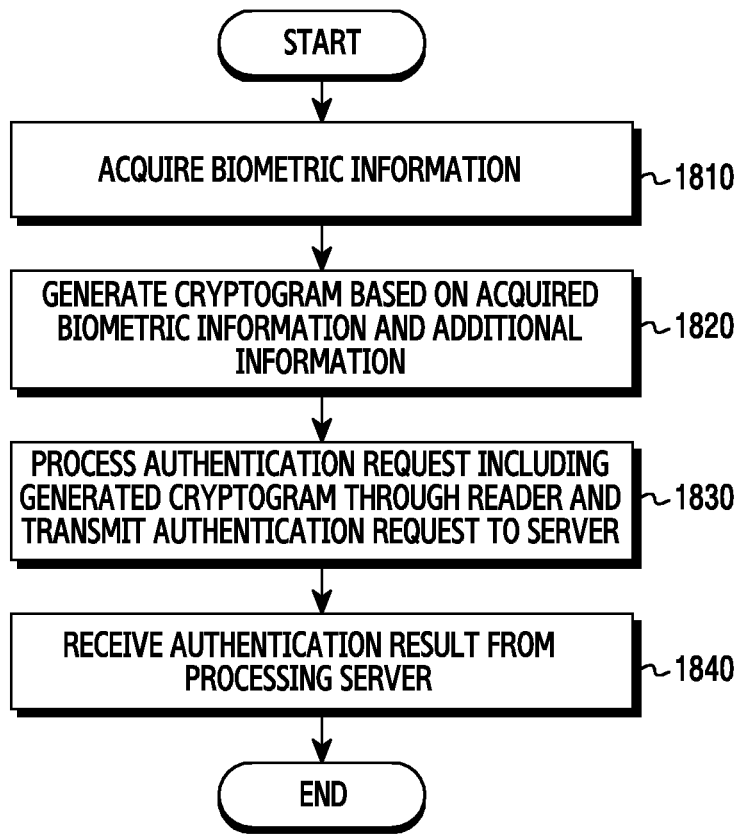
FIG. 18 is a flowchart illustrating an example method of controlling the electronic device according to a comparative example with the present disclosure.

FIG. 18 is a flowchart illustrating an example method of controlling the electronic device according to a comparative example of the present disclosure.

In operation 1810, the electronic device according to the comparative example may acquire biometric information. In operation 1820, the electronic device according to the comparative example may generate a cryptogram based on the acquired biometric information and additional information. The additional information may be added information used for a user authentication such as a credit card number.

In operation 1830, the electronic device according to the comparative example may process an authorization request including the generated cryptogram and transmit an authentication request including the generated cryptogram to a processing server through a reader. The processing server may decrypt the cryptogram and authenticate the user based on the biometric information sensed by the electronic device. In operation 1840, the electronic device according to the comparative example may receive a result of the authentication from the processing server. In this case, the biometric information may be encrypted with other additional information and transmitted to the processing server, but the biometric information may be leaked during the transmission process.

Figure 19:
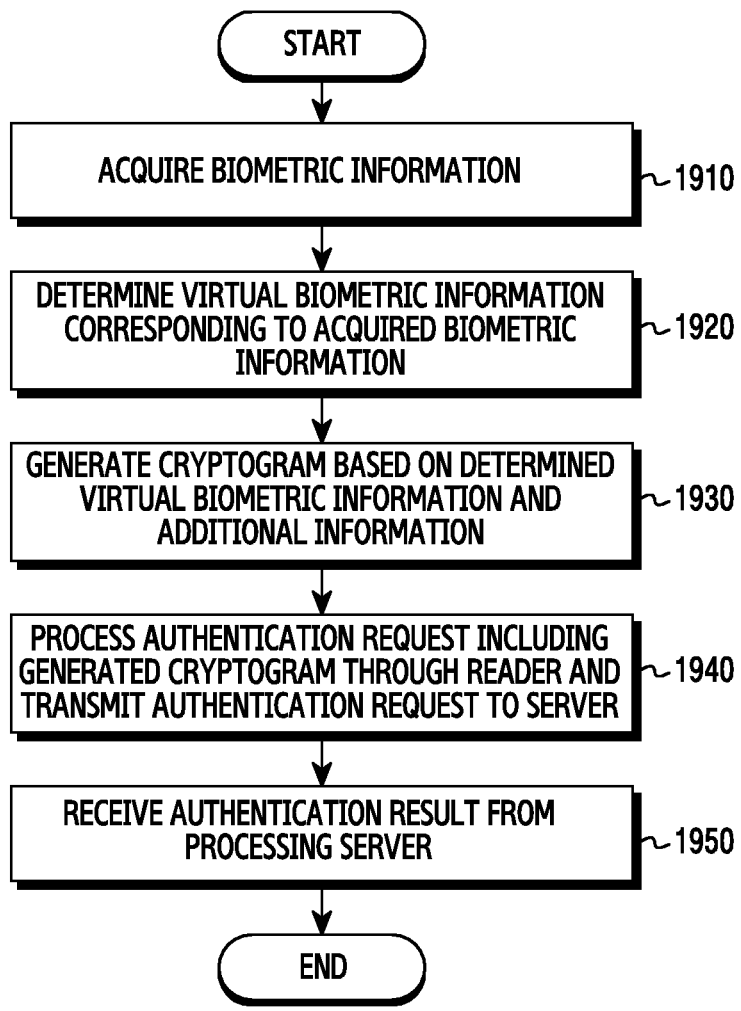
FIG. 19 is a flowchart illustrating an example method of controlling the electronic device according to various example embodiments of the present disclosure.
Figure 20:
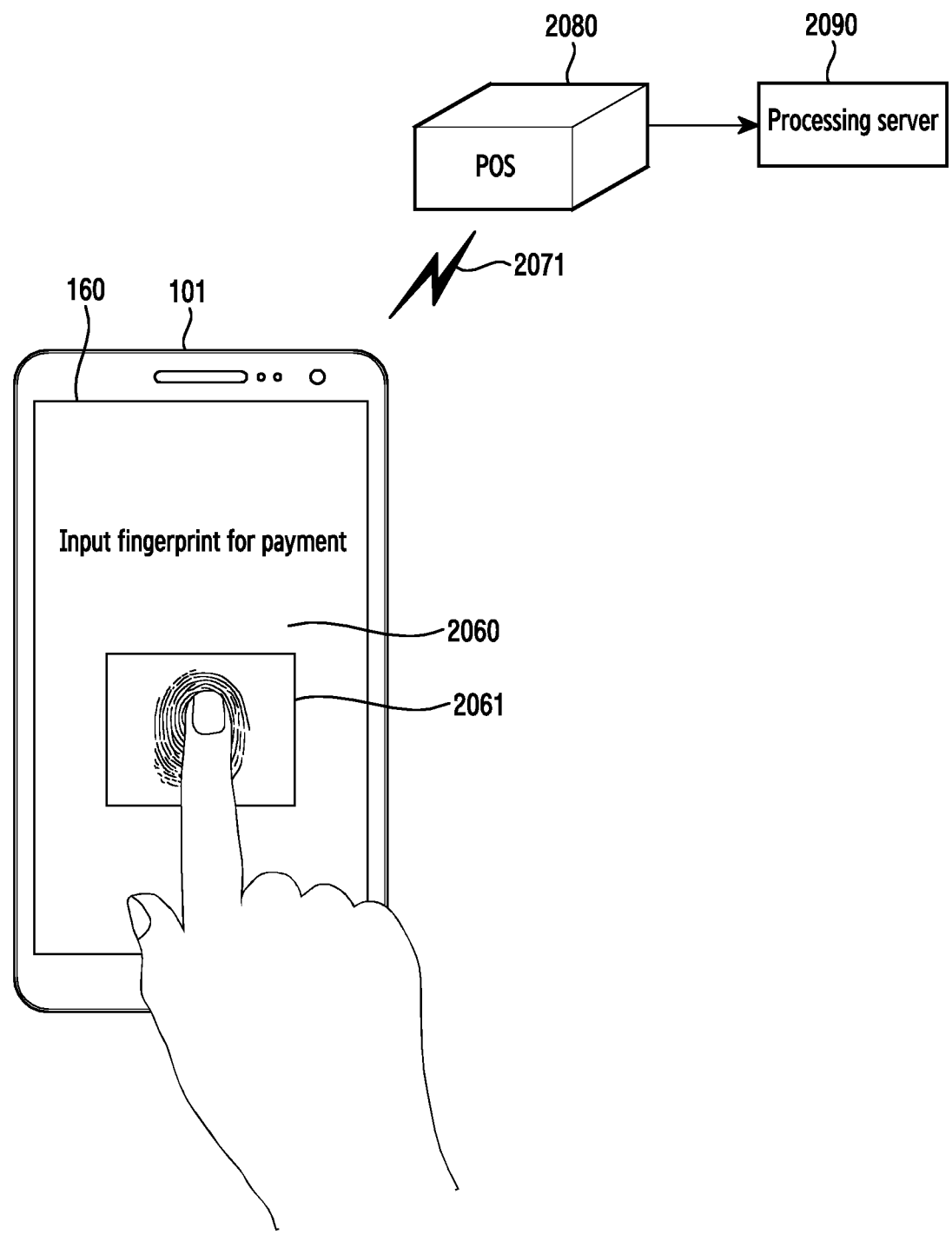
FIG. 20 is a diagram illustrating an example operation of the electronic device according to various example embodiments of the present disclosure.

FIG. 19 is a flowchart illustrating an example method of controlling the electronic device according to various example embodiments of the present disclosure. The embodiment of FIG. 19 will be described in greater detail with reference to FIG. 20. FIG. 20 is a diagram illustrating an example operation of the electronic device according to various example embodiments of the present disclosure.

In operation 1910, the electronic device 101 may acquire biometric information. For example, as illustrated in FIG. 20, the electronic device 101 may display a user interface 2060 for inducing acquisition of biometric information, for example, fingerprint information. The user may input biometric information, for example, fingerprint information through the user interface 2060. The electronic device 101 may display acquired fingerprint information 2061 to help the user recognition.

In operation 1920, the electronic device 101 may determine virtual biometric information corresponding to the acquired biometric information. For example, in the embodiment of FIG. 20, it is assumed that the electronic device 101 completes biometric information registration and stores relevant information between user-specific biometric information and virtual biometric information. The electronic device 101 may determine whether there is pre-stored biometric information that is the same as the acquired biometric information. When there is the biometric information that is the same as the acquired biometric information, the electronic device 101 may determine virtual biometric information corresponding to the corresponding biometric information.

In operation 1930, the electronic device 101 may generate a cryptogram based on the determined virtual biometric information and additional information. The additional information may be information used in electronic commerce such as a credit card number. The electronic device 101 may store an electronic commerce algorithm that performs an encryption based on the additional information and the biometric information in advance and generate a cryptogram through the electronic commerce algorithm. For example, while the cryptogram according to the comparative example is generated based on the biometric information and the additional information such as the credit card number, the cryptogram according to the present disclosure may be generated based on the virtual biometric information and the additional information.

In operation 1940, the electronic device 101 may process an authentication request including the generated cryptogram and transmit an authentication request including the generated cryptogram to a processing server 2090 through a reader 2080. The reader 2080 may receive a cryptogram 2071 from the electronic device 101 based on, for example, short-range communication such as Near Field Communication (NFC) or Magnetic Secure Transfer (MST) communication. The reader 2080 may transmit the received cryptogram 2071 to the processing server 2090. In operation 1950, the electronic device 101 may receive a result of the authentication from the processing server 2090. For example, the processing server 2090 may decrypt the received cryptogram 2071 to acquire virtual biometric information and additional information, and authenticate the user based on the acquired virtual biometric information and additional information. The processing server 2090 may determine whether to conduct the electronic commerce based on a result of the performance of the user authentication.

As described above, the electronic device 101 according to various embodiments of the present disclosure may generate the cryptogram based on both the virtual biometric information and other additional information and use the generated cryptogram for the user authentication as well as directly encrypting the virtual biometric information.

Figure 21:
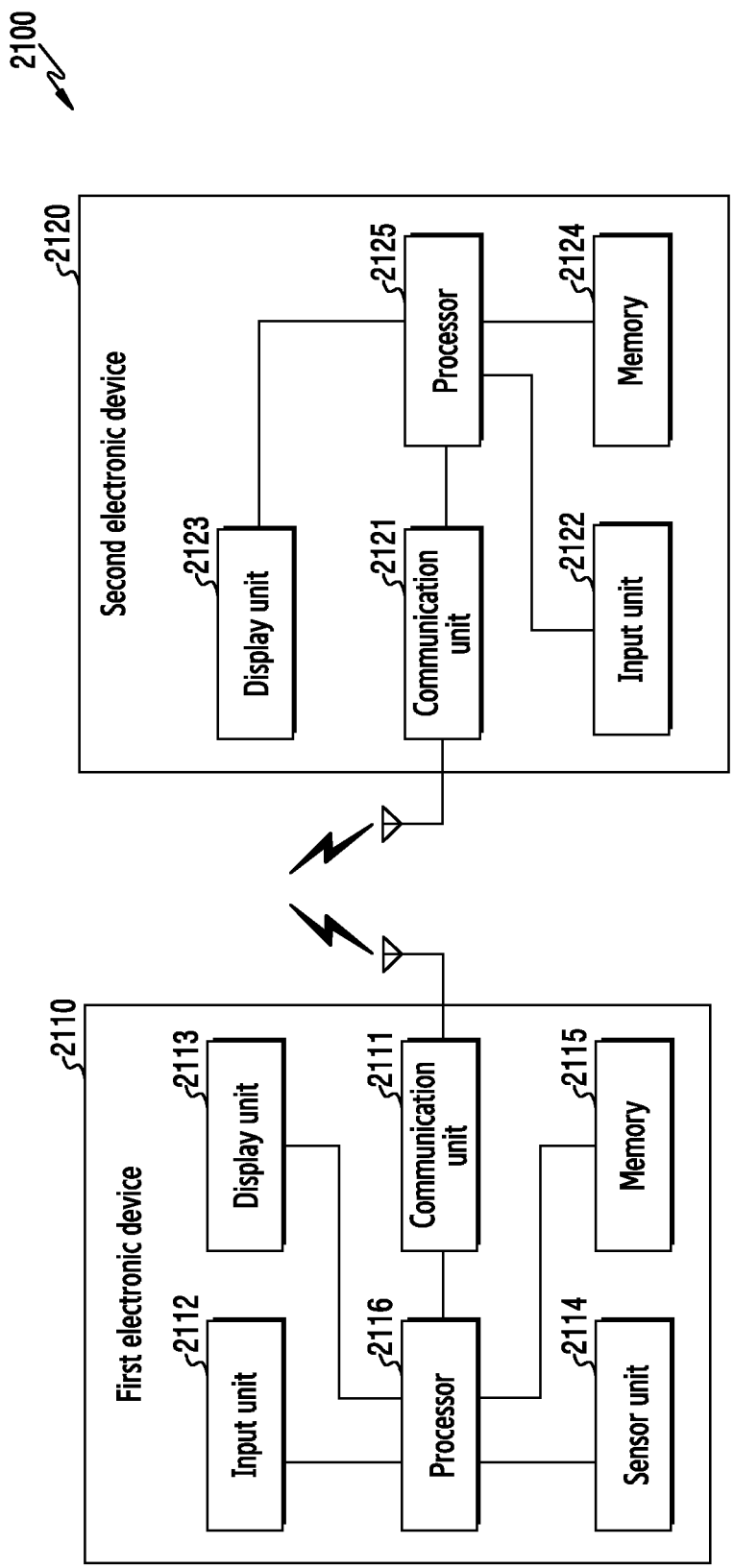
FIG. 21 is a block diagram illustrating an example communication system according to various example embodiments.

FIG. 21 is a block diagram illustrating an example communication system 2100 according to various example embodiments.

Referring to FIG. 21, the communication system 2100 according to various example embodiments may include a plurality of electronic devices 2110 and 2120. For example, the electronic devices 2110 and 2120 may include a first electronic device 2110 and a second electronic device 2120. The first electronic device 2110 and the second electronic device 2120 may be different types of electronic device or may be the same type of electronic device. The first electronic device 2110 and the second electronic device 2120 may access each other and communicate with each other.

The first electronic device 2110 may be driven while moving. For example, the first electronic device 2110 may move while being carried by the user. According to various example embodiments, the first electronic device 2110 may include a communication unit (e.g., including communication circuitry) 2111, an input unit (e.g., including input circuitry) 2112, a display unit 2113, a sensor unit 2148, a memory 2149, and a processor (e.g., including processing circuitry) 2116.

The communication unit 2111 may include various communication circuitry configured to perform communication in the first electronic device 2110. The communication unit 2111 may communicate with an external device through various communication schemes. For example, the communication unit 2111 may perform wired or wireless communication. To this end, the communication unit 2111 may include at least one antenna. Further, the communication unit 2111 may access at least one of a mobile communication network and a data communication network. The communication unit 2111 may perform short-range communication. For example, the external device may include at least one of an electronic device, a base station, and a satellite. According to various example embodiments, the external device may include the second electronic device 2120. Further, the communication schemes may include Long Term Evolution (LTE), Wideband Code Division Multiple Access (WCDMA), Global System for Mobile communications (GSM), Wi-Fi, wireless Local Area Network (wireless LAN), Bluetooth, and Near Field Communication (NFC).

The input unit 2112 may include various input circuitry configured to generate input data in the first electronic device 2110. The input unit 2112 may include at least one input means. For example, the input unit 2112 may include various input circuitry, such as, for example, and without limitation, at least one of a key pad, a dome switch, a physical button, a touch panel, and a jog & shuttle.

The display unit 2113 may output display data in the first electronic device 2110. For example, the display unit 2110 may include a Liquid Crystal Display (LCD), a Light Emitting Diode (LED) display, an Organic LED (OLED) display, an Active Matrix Light Emitting Diode (AMOLED) display, a Micro ElectroMechanical System (MEMS) display, and an electronic paper display, or the like, but is not limited thereto. The display unit 2113 may be combined with the input unit 2112 and may be implemented as a touch screen.

The sensor unit 2114 may determine a physical quantity around the first electronic device 2110. The sensor unit 2114 may detect a status of the first electronic device 2110. For example, the sensor unit 2114 may detect a physical signal. Further, the sensor unit 2114 may convert the physical signal into an electrical signal. The sensor unit 2114 may include at least one sensor. For example, the sensor unit 2114 may include at least one of a gesture sensor, a gyro sensor, an atmospheric pressure sensor, a magnetic sensor, an acceleration sensor, a grip sensor, a proximity sensor, a color sensor (for example, a Red, Greed, and Blue (RGB) sensor), a biometric sensor, a temperature/humidity sensor, an illumination sensor, and ultra violet (UV) sensor. The biometric sensor may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor.

The memory 2115 may store operation programs of the first electronic device 2110. Further, the memory 2115 may store data generated while the programs are executed. The memory 2115 may store identification information of the first electronic device 2110, that is, first identification information. For example, the memory 2115 may include one of an internal memory and an external memory. The internal memory may include at least one of a volatile memory (for example, a DRAM, an SRAM, an SDRAM, and the like) and a non-volatile memory (for example, a one time programmable ROM (OTPROM), a PROM, an EPROM, an EEPROM, a mask ROM, a flash ROM, a flash memory, a hard disk drive, or a Solid State Drive (SSD)). The external memory may include one of a flash drive, a Compact Flash (CF), a Secure Digital (SD), a Micro-SD, a Mini-SD, an eXtreme digital (xD), a Multi-Media Card (MMC), and a memory stick.

The processor 2116 may include various processing circuitry configured to control the general operation of the first electronic device 2110. The processor 2116 may perform various functions. To this end, the processor 2116 may control elements of the first electronic device 2110. Further, the processor 2116 may receive instructions and data from the elements of the first electronic device 2110 and process the instructions and data.

The second electronic device 2120 may be driven at a predetermined position. The second electronic device 2120 may be driven while moving. According to various example embodiments, the second electronic device 2120 may include a communication unit (e.g., including communication circuitry) 2121, an input unit (e.g., including input circuitry) 2122, a display unit 2123, a memory 2124, and a processor (e.g., including processing circuitry) 2125.

The communication unit 2121 may include various communication circuitry configured to perform communication in the second electronic device 2120. The communication unit 2121 may communicate with an external device through various communication schemes. For example, the communication unit 2121 may perform wired or wireless communication. To this end, the communication unit 2121 may include at least one antenna. Further, the communication unit 2121 may access at least one of a mobile communication network and a data communication network. The communication unit 2121 can perform short-range communication. For example, the external device may include at least one of an electronic device, a base station, and a satellite. According to various example embodiments, the external device may include the first electronic device 2110. Further, the communication schemes may include Long Term Evolution (LTE), Wideband Code Division Multiple Access (WCDMA), Global System for Mobile communications (GSM), Wi-Fi, wireless Local Area Network (wireless LAN), Bluetooth, and Near Field Communication (NFC).

The input unit 2122 may generate input data in the second electronic device 2120. At this time, the input unit 2122 may include at least one input means. For example, the input unit 2122 may include various input circuitry, such as, for example, and without limitation, at least one of a key pad, a dome switch, a physical button, a touch panel, and a jog & shuttle.

The display unit 2123 may output display data in the second electronic device 2120. For example, the display unit 2120 may include a Liquid Crystal Display (LCD), a Light Emitting Diode (LED) display, an Organic LED (OLED) display, an Active Matrix Light Emitting Diode (AMOLED) display, a Micro ElectroMechanical System (MEMS) display, and an electronic paper display, or the like, but is not limited thereto. The display unit 2123 may be combined with the input unit 2122 and may be implemented as a touch screen.

The memory 2124 may store operation programs of the second electronic device 2120. Further, the memory 2124 may store data generated while the programs are executed. The memory 2124 may store identification information of the second electronic device 2120, that is, second identification information. For example, the memory 2124 may include one of an internal memory and an external memory. The internal memory may include at least one of a volatile memory (for example, a DRAM, an SRAM, an SDRAM, and the like) and a non-volatile memory (for example, a one time programmable ROM (OTPROM), a PROM, an EPROM, an EEPROM, a mask ROM, a flash ROM, a flash memory, a hard disk drive, or a Solid State Drive (SSD)). The external memory may include one of a flash drive, a Compact Flash (CF), a Secure Digital (SD), a Micro-SD, a Mini-SD, an eXtreme digital (xD), a Multi-Media Card (MMC), and a memory stick.

The processor 2125 may include various processing circuitry configured to control the general operation of the second electronic device 2120. The processor 2125 may perform various functions. To this end, the processor 2125 may control elements of the second electronic device 2120. Further, the processor 2125 may receive instructions and data from the elements of the first electronic device 2120 and process the instructions and data.

Figure 22:
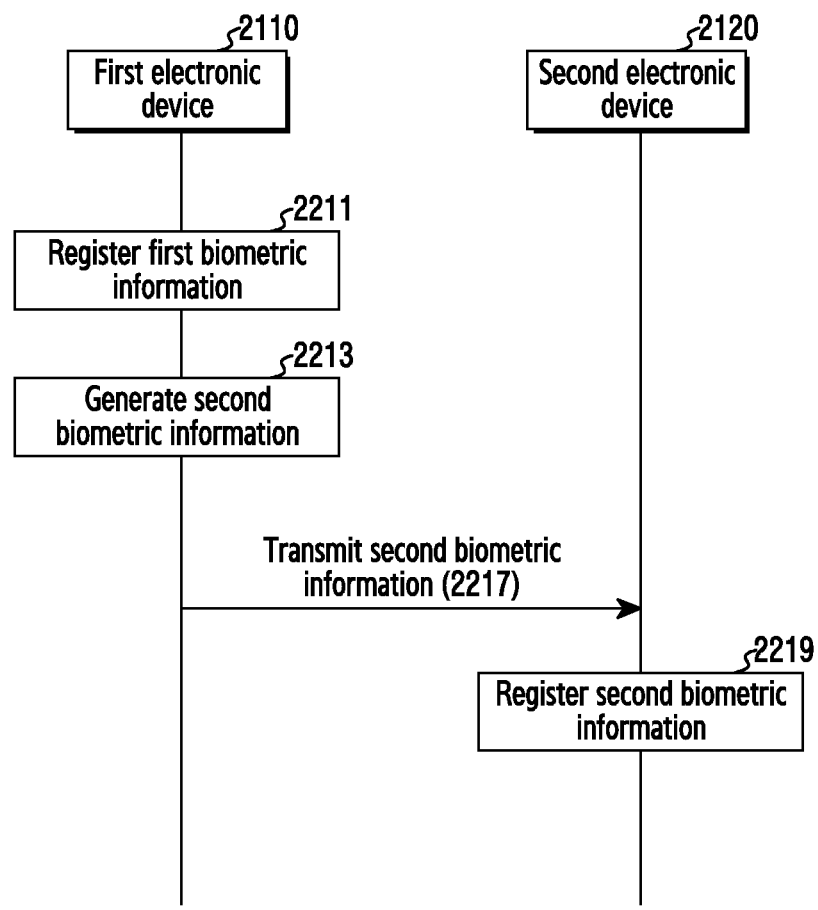
FIG. 22 is a flowchart illustrating an example method of registering biometric information in a communication system according to various example embodiments.

FIG. 22 is a flowchart illustrating an example method of registering biometric information in the communication system 2100 according to various example embodiments.

Referring to FIG. 22, the first electronic device 2110 may register first biometric information in operation 2211. The first electronic device 2110 may acquire the first biometric information from the user. Further, the first electronic device 2110 may store the first biometric information corresponding to the user. According to an example embodiment, the first electronic device 2110 may scan the user's fingerprint to generate a fingerprint image. The first electronic device 2110 may extract at least one feature point from the fingerprint image. To this end, the first electronic device 2110 may acquire the fingerprint image or at least one feature point of the fingerprint image as the first biometric information. Further, the first electronic device 2110 may store the fingerprint image or at least one feature point of the fingerprint image as the first biometric information.

According to an example embodiment, the first electronic device 2110 may set a right to access the first electronic device 2110 in accordance with the first biometric information. For example, the first electronic device 2100 may set a right to unlock the first electronic device 2110 in accordance with the first biometric information. The first electronic device 2110 may set a right to execute a particular function in accordance with the first biometric information.

According to various example embodiments, the first electronic device 2110 may generate second biometric information based on the first biometric information in operation 2213. The first electronic device 2110 may encrypt the first biometric information to generate the second biometric information. According to an example embodiment, the first electronic device 2110 may encrypt the fingerprint image or at least one feature point of the fingerprint image. For example, the first electronic device 2110 may store the second biometric information.

According to various example embodiments, the first electronic device 2110 may transmit the second biometric information to the second electronic device 2120 in operation 2217. To this end, the first electronic device 2110 may store second identification information of the second electronic device 2120. Further, the first electronic device 2110 may transmit the second biometric information to the second electronic device 2120 based on a user's selection. For example, the first electronic device 2110 may transmit the second biometric information to the second electronic device 2120 through a short-range communication scheme.

The first electronic device 2110 may transmit first identification information along with the second identification information.

According to various example embodiments, the second electronic device 2120 may register the second biometric information in operation 2219. For example, the second electronic device 2120 may store the second biometric information in accordance with the user. The second electronic device 2120 may store the second biometric information in accordance with the first electronic device 2110.

According to an example embodiment, the second electronic device 2120 may include a plurality of external electronic devices (for example, tablets, notebooks, etc.), and broadcast the second biometric information to the plurality of external electronic devices or multicast the second biometric information to some of the external electronic devices selected from the plurality of external electronic devices.

According to an example embodiment, the second electronic device 2120 may set a right to access the second electronic device 2120 in accordance with the second biometric information. For example, the second electronic device 2120 may set a right to unlock the second electronic device 2120 in accordance with the first electronic device 2110 and the second biometric information. The second electronic device 2120 may set a right to execute a particular function in accordance with the first electronic device 2110 and the second biometric information.

Figure 23:
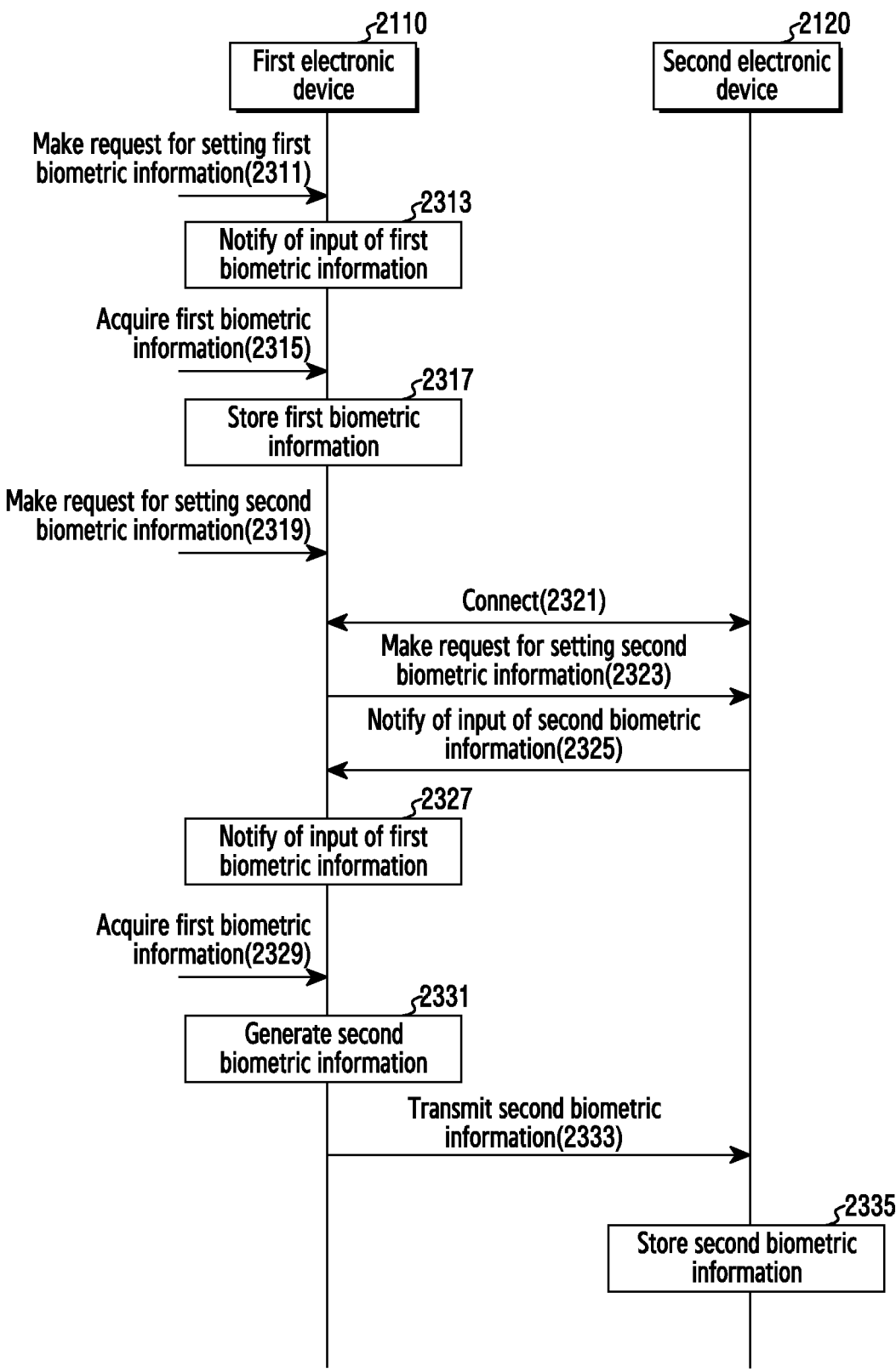
FIG. 23 is a flowchart illustrating an example method of registering biometric information in a communication system according to an example embodiment.

FIG. 23 is a flowchart illustrating an example method of registering biometric information in the communication system 2100 according to an example embodiment.

Referring to FIG. 23, the first electronic device 2110 may receive a request for setting first biometric information in operation 2311. For example, when the request for setting the first biometric information in the first electronic device 2110 is generated by the user, the first electronic device 2110 detects or receives the request. In response to this, the first electronic device 2110 may notify of an input of the first biometric information to the user in operation 2313. For example, the first electronic device 2110 may display a user interface for acquiring the first biometric information. According to an example embodiment, the user interface may be pre-downloaded to the first electronic device 2110 or downloaded from an external device, for example, a server or another electronic device. The first electronic device 2110 may acquire the first biometric information of the user in operation 2315. The first electronic device 2110 may store the first biometric information in accordance with the user in operation 2317.

According to an example embodiment, the first electronic device 2110 may receive a request for setting second biometric information in operation 2319. For example, the request for setting the second biometric information in the second electronic device 2120 is generated by the user, the first electronic device 2110 may detect the request. In response to this, the first electronic device 2110 may perform a connection with the second electronic device 2120 in operation 2321. For example, the first electronic device 2110 may perform the connection with the second electronic device 2120 through a short-range communication scheme. To this end, the first electronic device 2110 may store second identification information of the second electronic device 2120. Further, the first electronic device 2110 may perform the connection with the second electronic device 2120 based on a user's selection. The first electronic device 2110 may transfer the request for setting the second biometric information to the second electronic device 2120 in operation 2323. When the request for setting the second biometric information is received from the first electronic device 2110 in operation 2323, the second electronic device 2120 may notify of an input of the second biometric information to the first electronic device 2110 in operation 2325.

According to an example embodiment, when the input of the second biometric information is notified of from the second electronic device 2120 in operation 2325, the first electronic device 2110 may notify of the input of the first biometric information to the user in operation 2327. The first electronic device 2110 may acquire the first biometric information of the user in operation 2329. The first electronic device 2110 may generate the second biometric information based on the first biometric information in operation 2331. The first electronic device 2110 may encrypt the first biometric information to generate the second biometric information. For example, the first electronic device 2110 may store the second biometric information. The first electronic device 2110 may transmit the second biometric information to the second electronic device 2120 in operation 2333. When the second biometric information is received from the first electronic device 2110 in operation 2333, the second electronic device 2120 may store the second biometric information in operation 2335.

Further, according an example embodiment of the present disclosure, although it is described that the first electronic device 2110 (for example, the processor 2116) detects the request for setting the second biometric information in the second electronic device 2120, the present disclosure is not necessarily limited thereto. According to an example embodiment, the first electronic device 2110 (for example, the processor 2116) may receive the request for setting the second biometric information from the second electronic device 2120 and may operate.

Figure 24:
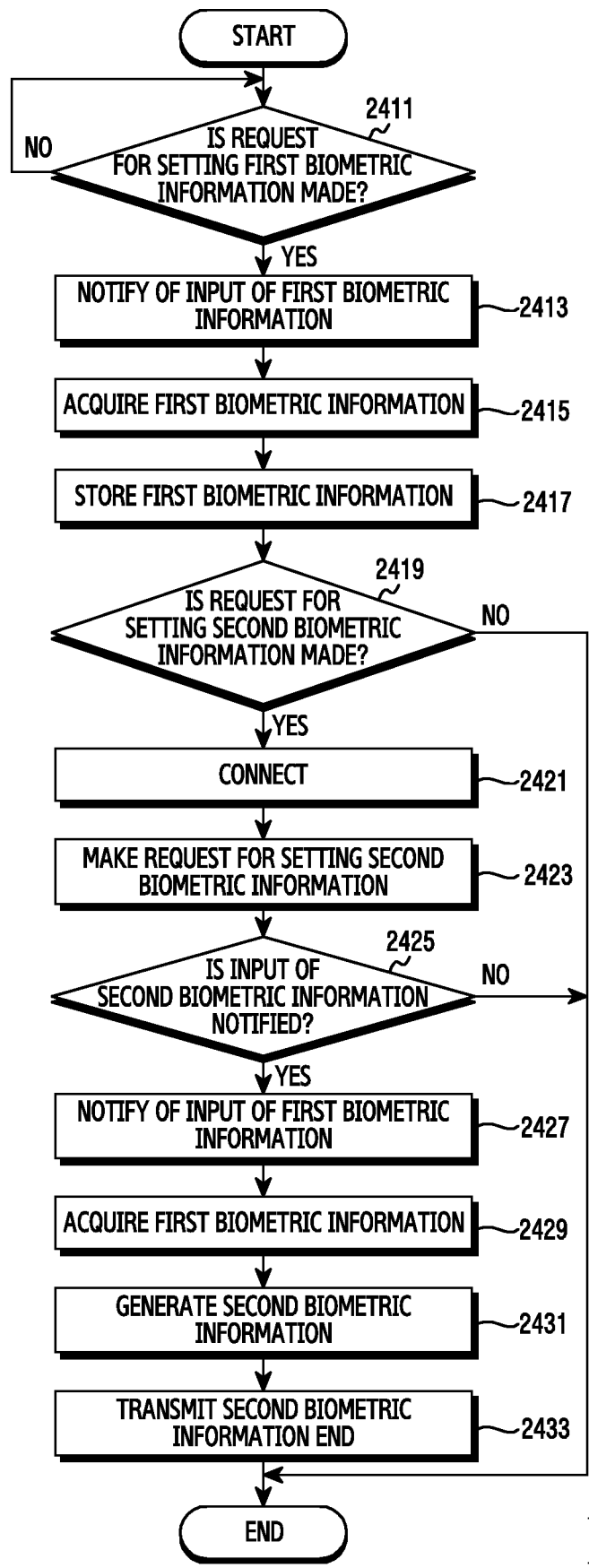
FIG. 24 is a flowchart illustrating an example method of operating a first electronic device according to an example embodiment.

FIG. 24 is a flowchart illustrating an example method of operating the first electronic device 2110 according to an example embodiment.

Referring to FIG. 24, the processor 2116 may detect a request for setting first biometric information in operation 2411. For example, when the request for setting the first biometric information in the first electronic device 2110 is generated by the user, the processor 2116 may detect the request. For example, the processor 2116 may detect the request for setting the first biometric information through the input unit 2112 or the sensor unit 2114.

The processor 2116 may notify an input of the first biometric information to the user in operation 2413. The processor 2116 may notify of the input of the first biometric information to the user through display data or audio data. For example, the processor 2116 may output a notification message for inputting the first biometric information through the display unit 413.

The processor 2116 may acquire the first biometric information of the user in operation 2415. To this end, the processor 2116 may temporarily turn on a biometric sensor of the sensor unit 2114. For example, the biometric sensor may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. Further, the processor 2116 may acquire the first biometric information through the biometric sensor. According to an example embodiment, the processor 2116 may scan a user's fingerprint to generate a fingerprint image. The processor 2116 may extract at least one feature point from the fingerprint image. Accordingly, the processor 2116 may acquire the fingerprint image or at least one feature point of the fingerprint image as the first biometric information.

The processor 2116 may store the first biometric information in accordance with the user in operation 2417. For example, the processor 2116 may store the fingerprint image or at least one feature point of the fingerprint image in the memory 2115 as the first biometric information. For example, the processor 2116 may set a right to access the first electronic device 2110 in accordance with the first biometric information. According to an example embodiment, the processor 2116 may set a right to unlock the first electronic device 2110 in accordance with the first biometric information. The processor 2116 may set a right to execute a particular function in accordance with the first biometric information.

The processor 2116 may detect a request for setting second biometric information in operation 2419. For example, when the request for setting the second biometric information in the second electronic device 2120 is generated by the user, the processor 2116 may detect the request. For example, the processor 2116 may detect the request for setting the second biometric information through the input unit 2112 or the sensor unit 2114.

The processor 2116 may perform a connection with the second electronic device 2120 in operation 2421. For example, the processor 2116 may perform the connection with the second electronic device 2120 through a short-range communication scheme. The processor 2116 may transmit a request for the connection to the second electronic device 2120. Further, the processor 2116 may receive a response to the request for the connection from the second electronic device 2120. Accordingly, when the response to the request for the connection from the second electronic device 2120 is positive, the processor 2116 may complete the connection with the second electronic device 2120. To this end, second identification information of the second electronic device 2120 may be stored in the memory 2115. Further, the processor 2116 may perform the connection with the second electronic device 2120 based on a user's selection. According to an example embodiment, the processor 2116 may search for a peripheral device. When the second electronic device 2120 is found, the processor 2116 may perform the connection with the second electronic device 2120. Further, the processor 2116 may perform the connection with the second electronic device 2120 based on a user's selection. The processor 2116 may transfer a request for setting second biometric information to the second electronic device 2120 in operation 2423.

When an input of the second biometric information is notified of from the second electronic device 2120, the processor 2116 may detect the notification in operation 2425. In response to this, the processor 2116 may notify of the input of the first biometric information to the user in operation 2427. The processor 2116 may notify of the input of the first biometric information to the user through display data or audio data. For example, the processor 2116 may output a notification message for inputting the first biometric information through the display unit 2113.

The processor 2116 may acquire the first biometric information of the user in operation 2429. To this end, the processor 2116 may temporarily turn on a biometric sensor of the sensor unit 2114. According to an example embodiment, the processor 2116 may scan a user's fingerprint to generate a fingerprint image. The processor 2116 may extract at least one feature point from the fingerprint image. Accordingly, the processor 2116 may acquire the fingerprint image or at least one feature point of the fingerprint image as the first biometric information.

The processor 2116 may generate second biometric information based on the first biometric information in operation 2431. For example, the processor 2116 may compare the first biometric information with the first biometric information stored in operation 2417. When the first biometric information is the same as the first biometric information stored in operation 2417, the processor 2116 may generate the second biometric information. The first electronic device 2110 may encrypt the first biometric information to generate the second biometric information. For example, the first electronic device 2110 may encrypt the fingerprint image or at least one feature point of the fingerprint image. For example, the processor 2116 may store the second biometric information. The processor 2116 may transmit the second biometric information to the second electronic device 2120 in operation 2433.

Figure 25:
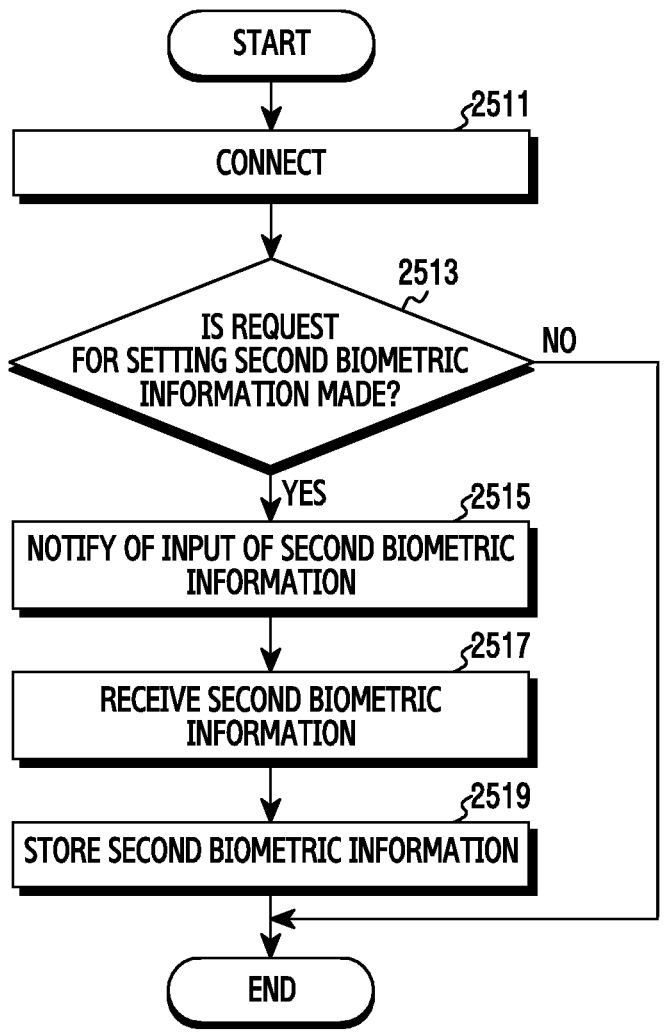
FIG. 25 is a flowchart illustrating an example method of operating a second electronic device according to an example embodiment.

FIG. 25 is a flowchart illustrating an example method of operating the second electronic device 2120 according to an example embodiment.

Referring to FIG. 25, the processor 2125 may perform a connection with the first electronic device 2110 in operation 2511. For example, the processor 2125 may perform the connection with the first electronic device 2110 through a short-range communication scheme. When a request for the connection is received from the first electronic device 2110, the processor 2125 may determine whether to perform the connection with the first electronic device 2110. Further, the processor 2125 may transmit a response to the request for the connection that indicates whether to perform the connection to the first electronic device 2110. Accordingly, when the response to the request for the connection is positive, the processor 2125 may complete the connection with the first electronic device 2110.

The processor 2125 may detect a request for setting second biometric information in operation 2513. For example, when the request for setting the second biometric information is received from the first electronic device 2110, the processor 2125 may detect the request. For example, the processor 2125 may detect the request for setting the second biometric information through the communication unit 2121. The processor 2125 may notify of an input of the second biometric information to the first electronic device 2110 in operation 2515.

The processor 2125 may receive the second biometric information from the first electronic device 2110 in operation 2517. The processor 2125 may store the second biometric information in operation 2519. That is, the processor 2125 may store the second biometric information in accordance with the user. The processor 2125 may store the second biometric information in accordance with the first electronic device 2110. According to an example embodiment, the processor 2125 may set a right to access the second electronic device 2120 in accordance with the second biometric information. For example, the processor 2125 may set a right to unlock the second electronic device 2120 in accordance with the second biometric information. The processor 2125 may set a right to execute a particular function in accordance with the second biometric information.

Figure 26:
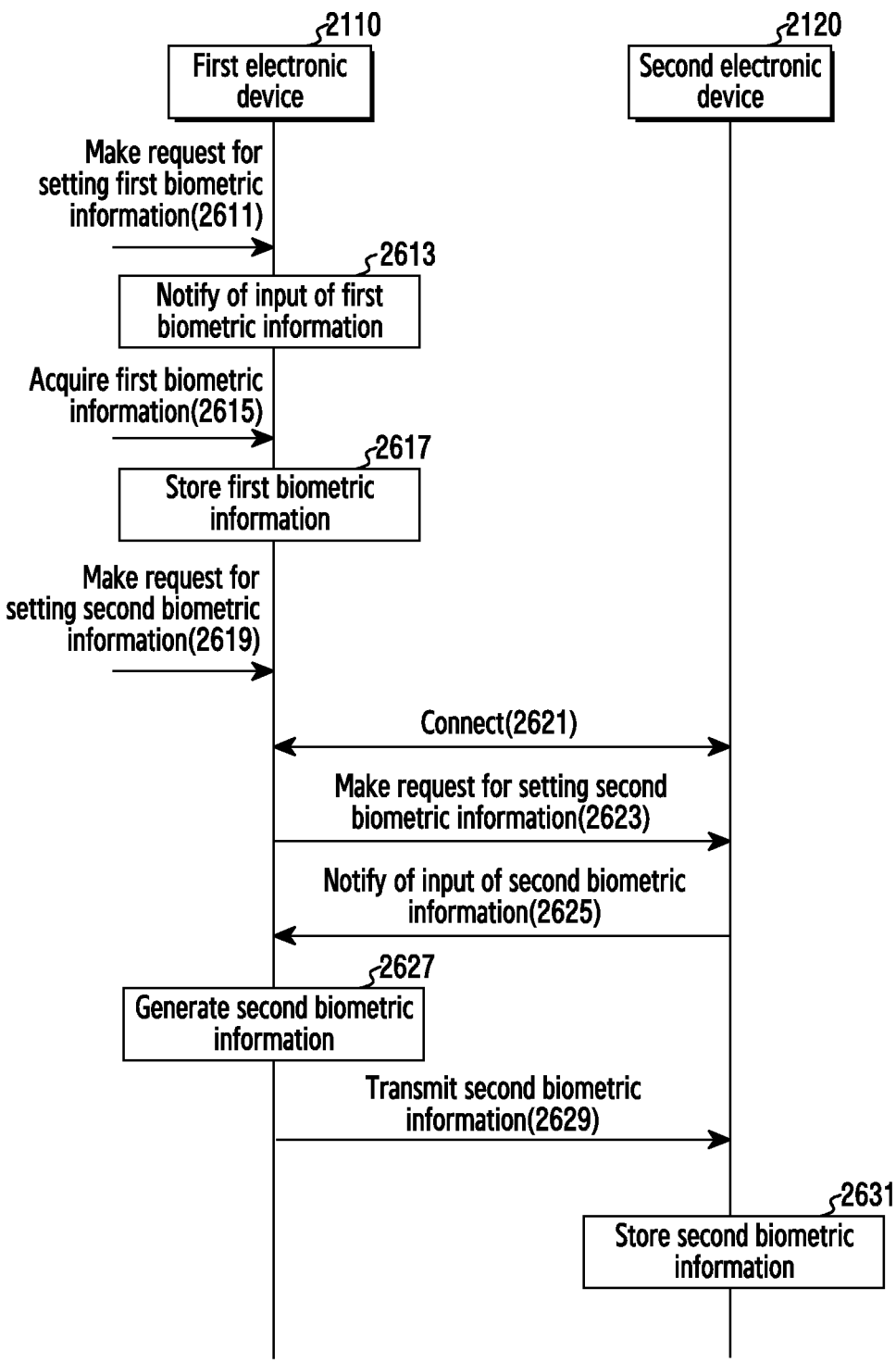
FIG. 26 is a flowchart illustrating an example method of registering biometric information in a communication system according to another example embodiment.

FIG. 26 is a flowchart illustrating an example method of registering biometric information in the communication system 2100 according to another example embodiment.

Referring to FIG. 26, the first electronic device 2110 may detect or receive a request for setting first biometric information in operation 2611. For example, when the request for setting the first biometric information in the first electronic device 2110 is generated by the user, the first electronic device 2110 detects the request. In response to this, the first electronic device 2110 may notify the user of an input of the first biometric information in operation 2613. The first electronic device 2110 may acquire the first biometric information of the user in operation 2615. The first electronic device 2110 may store the first biometric information in accordance with the user in operation 2617.

According to another example embodiment, the first electronic device 2110 may detect a request for setting second biometric information in operation 2619. For example, the request for setting the second biometric information in the second electronic device 2120 is generated by the user, the first electronic device 2110 may detect the request. In response to this, the first electronic device 2110 may perform a connection with the second electronic device 2120 in operation 2621. For example, the first electronic device 2110 may perform the connection with the second electronic device 2120 through a short-range communication scheme. To this end, the first electronic device 2110 may store second identification information of the second electronic device 2120. Further, the first electronic device 2110 may perform the connection with the second electronic device 2120 based on a user's selection. The first electronic device 2110 may transfer the request for setting the second biometric information to the second electronic device 2120 in operation 2623. When the request for setting the second biometric information is received from the first electronic device 2110 in operation 2623, the second electronic device 2120 may notify of an input of the second biometric information to the first electronic device 2110 in operation 2625.

According to another example embodiment, the first electronic device 2110 may generate the second biometric information based on the first biometric information in operation 2627. The first electronic device 2110 may generate the second biometric information based on the first biometric information stored in operation 2617. The first electronic device 2110 may encrypt the first biometric information to generate the second biometric information. For example, the first electronic device 2110 may store the second biometric information. The first electronic device 2110 may transmit the second biometric information to the second electronic device 2120 in operation 2629. When the second biometric information is received from the first electronic device 2110 in operation 2629, the second electronic device 2120 may store the second biometric information in operation 2631.

Figure 27:
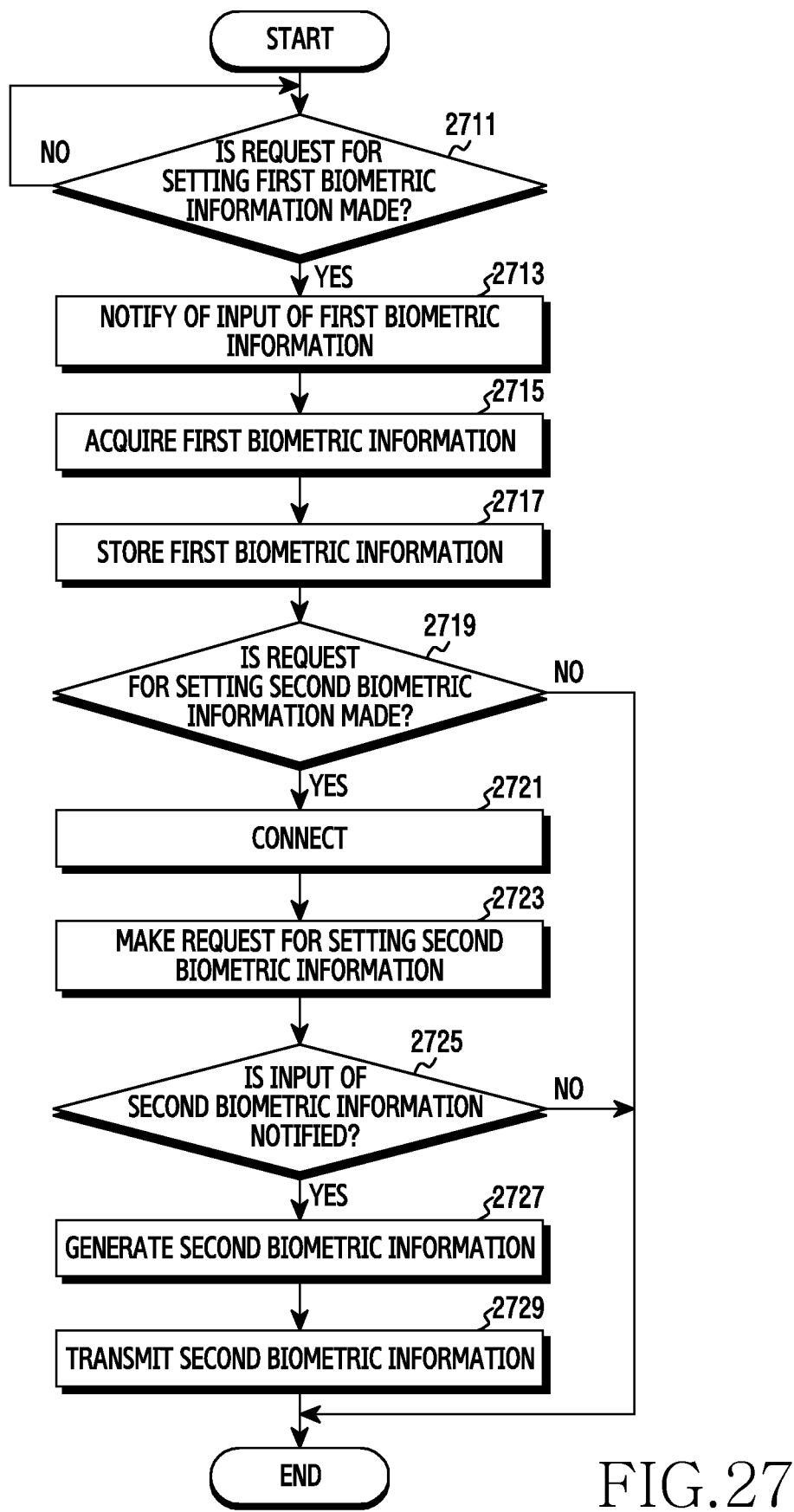
FIG. 27 is a flowchart illustrating an example method of operating the first electronic device according to another example embodiment.

FIG. 27 is a flowchart illustrating an example method of operating the first electronic device 2110 according to another example embodiment.

Referring to FIG. 27, the processor 2116 may detect a request for setting first biometric information in operation 2711. For example, when the request for setting the first biometric information in the first electronic device 2110 is generated by the user, the processor 2116 may detect the request. For example, the processor 2116 may detect the request for setting the first biometric information through the input unit 2112 or the sensor unit 2114.

The processor 2116 may notify of an input of the first biometric information to the user in operation 2713. The processor 2116 may notify of the input of the first biometric information to the user through display data or audio data. For example, the processor 2116 may output a notification message for inputting the first biometric information through the display unit 2113.

The processor 2116 may acquire the first biometric information of the user in operation 2715. To this end, the processor 2116 may temporarily turn on a biometric sensor of the sensor unit 2114. For example, the biometric sensor may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. Further, the processor 2116 may acquire the first biometric information through the biometric sensor. According to an example embodiment, the processor 2116 may scan a user's fingerprint to generate a fingerprint image. The processor 2116 may extract at least one feature point from the fingerprint image. Accordingly, the processor 2116 may acquire the fingerprint image or at least one feature point of the fingerprint image as the first biometric information.

The processor 2116 may store the first biometric information in accordance with the user in operation 2717. For example, the processor 2116 may store the fingerprint image or at least one feature point of the fingerprint image in the memory 2115 as the first biometric information. For example, the processor 2116 may set a right to access the first electronic device 2110 in accordance with the first biometric information. According to an example embodiment, the processor 2116 may set a right to unlock the first electronic device 2110 in accordance with the first biometric information. The processor 2116 may set a right to execute a particular function in accordance with the first biometric information.

The processor 2116 may detect a request for setting second biometric information in operation 2719. For example, when the request for setting the second biometric information in the second electronic device 2120 is generated by the user, the processor 2116 may detect the request. For example, the processor 2116 may detect the request for setting the second biometric information through the input unit 2112 or the sensor unit 2114.

The processor 2116 may perform a connection with the second electronic device 2120 in operation 2721. For example, the processor 2116 may perform the connection with the second electronic device 2120 through a short-range communication scheme. The processor 2116 may transmit a request for the connection to the second electronic device 2120. Further, the processor 2116 may receive a response to the request for the connection from the second electronic device 2120. Accordingly, when the response to the request for the connection from the second electronic device 2120 is positive, the processor 2116 may complete the connection with the second electronic device 2120. To this end, second identification information of the second electronic device 2120 may be stored in the memory 2115. Further, the processor 2116 may perform the connection with the second electronic device 2120 based on a user's selection. According to an example embodiment, the processor 2116 may search for a peripheral device. When the second electronic device 2120 is found, the processor 2116 may perform the connection with the second electronic device 2120. Further, the processor 2116 may perform the connection with the second electronic device 2120 based on a user's selection. The processor 2116 may transfer a request for setting second biometric information to the second electronic device 2120 in operation 2723.

When an input of the second biometric information is notified of from the second electronic device 2120, the processor 2116 may detect the notification in operation 2725. In response to this, the processor 2116 may generate second biometric information based on the first biometric information in operation 2727. The processor 2116 may generate the second biometric information based on the first biometric information stored in operation 2727. The first electronic device 2110 may encrypt the first biometric information to generate the second biometric information. For example, the first electronic device 2110 may encrypt the fingerprint image or at least one feature point of the fingerprint image. For example, the processor 2116 may store the second biometric information. The processor 2116 may transmit the second biometric information to the second electronic device 2120 in operation 2729.

According to another example embodiment, the method of operating the second electronic device 2120 is similar to FIG. 25, and a detailed description thereof will be omitted.

Figure 28:
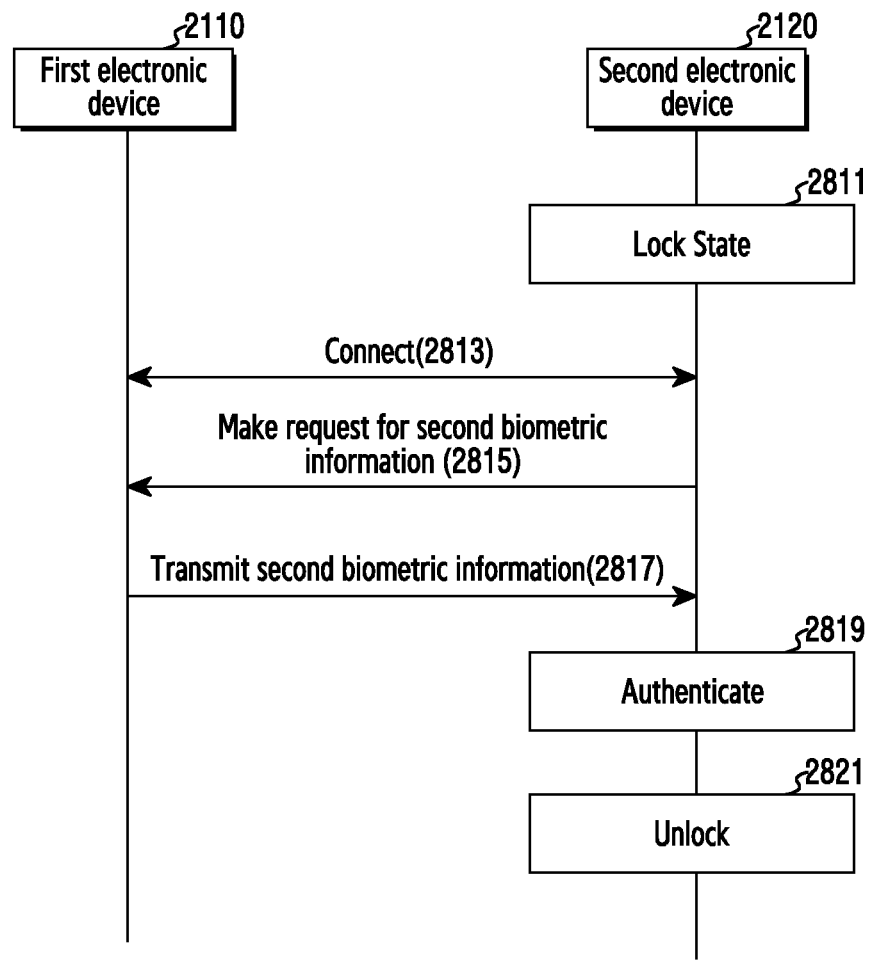
FIG. 28 is a flowchart illustrating an example method of performing an authentication in the communication system according to an example embodiment of the present disclosure.

FIG. 28 is a flowchart illustrating an example method of performing an authentication in the communication system according to an example embodiment of the present disclosure.

Referring to FIG. 28, the second electronic device 2120 (for example, the processor 2125) may identify that the second electronic device 2120 is in a lock state in operation 2811. According to an example embodiment, the lock state of the second electronic device 2120 may refer to a state in which power is provided to the second electronic device 2120 but there is no right to access to the second electronic device 2120 or right to execute a particular function since authentication information, for example, a password is not input. When the second electronic device 2120 (for example, the processor 2125) is in the lock state, an input notification screen may be displayed on the display unit 2123 of the second electronic device 2120.

In operation 2813, the first electronic device 2110 and the second electronic device 2120 may perform the connection. For example, the first electronic device 2110 (for example, the processor 2116) may perform the connection with the second electronic device 2120 through a short-range communication scheme. To this end, the first electronic device 2110 may store second identification information of the second electronic device 2120. Further, the first electronic device 2110 (for example, the processor 2116) may perform the connection with the second electronic device 2120 based on a user's selection. The second electronic device 2120 (for example, the processor 2125) may identify that the first electronic device 2110 approaches within a threshold radius based on a communication scheme such as Bluetooth Low Energy (BLE). When the first electronic device 2110 approaches within the threshold radius, the second electronic device 2120 (for example, 2125) may perform the connection with the first electronic device 2110.

The second electronic device 2120 (for example, the processor 2125) may transfer a request for receiving the second biometric information to the first electronic device 2110 in operation 2815. When the request for the second biometric information is received from the second electronic device 2120 in operation 2815, the first electronic device 2110 (for example, the processor 2116) may transmit the second biometric information to the second electronic device 2120 in operation 2817. The first electronic device 2110 (for example, the processor 2116) may execute one of a manual mode and an automatic mode in operation 2817. An example in which the first electronic device 2110 (for example, the processor 2116) transmits the second biometric information to the second electronic device 2120 when the first electronic device 2110 is in the manual mode will be described in greater detail with reference to FIGS. 46 to 48. An example in which the first electronic device 2110 (for example, the processor 2116) transmits the second biometric information to the second electronic device 2120 when the first electronic device 2110 is in the automatic mode will be described in greater detail with reference to FIGS. 49 and 50.

The second electronic device 2120 (for example, the processor 2125) may perform an authentication based on the second biometric information received from the first electronic device 2110 in operation 2819. When the second biometric information received from the first electronic device 2110 is the same as the second biometric information registered in operation 2219 of FIG. 22, the second electronic device 2120 (for example, the processor 2125) may succeed in the authentication using the second biometric information. When the second electronic device 2120 (for example, the processor 2125) succeeds in the authentication using the second biometric information, the lock state of the second electronic device 2120 may be released in operation 2821. The second electronic device 2120 (for example, the processor 2125) may release the lock state and provide a right to access the second electronic device 2120 and a right to execute a particular function to the user.

Figure 29:
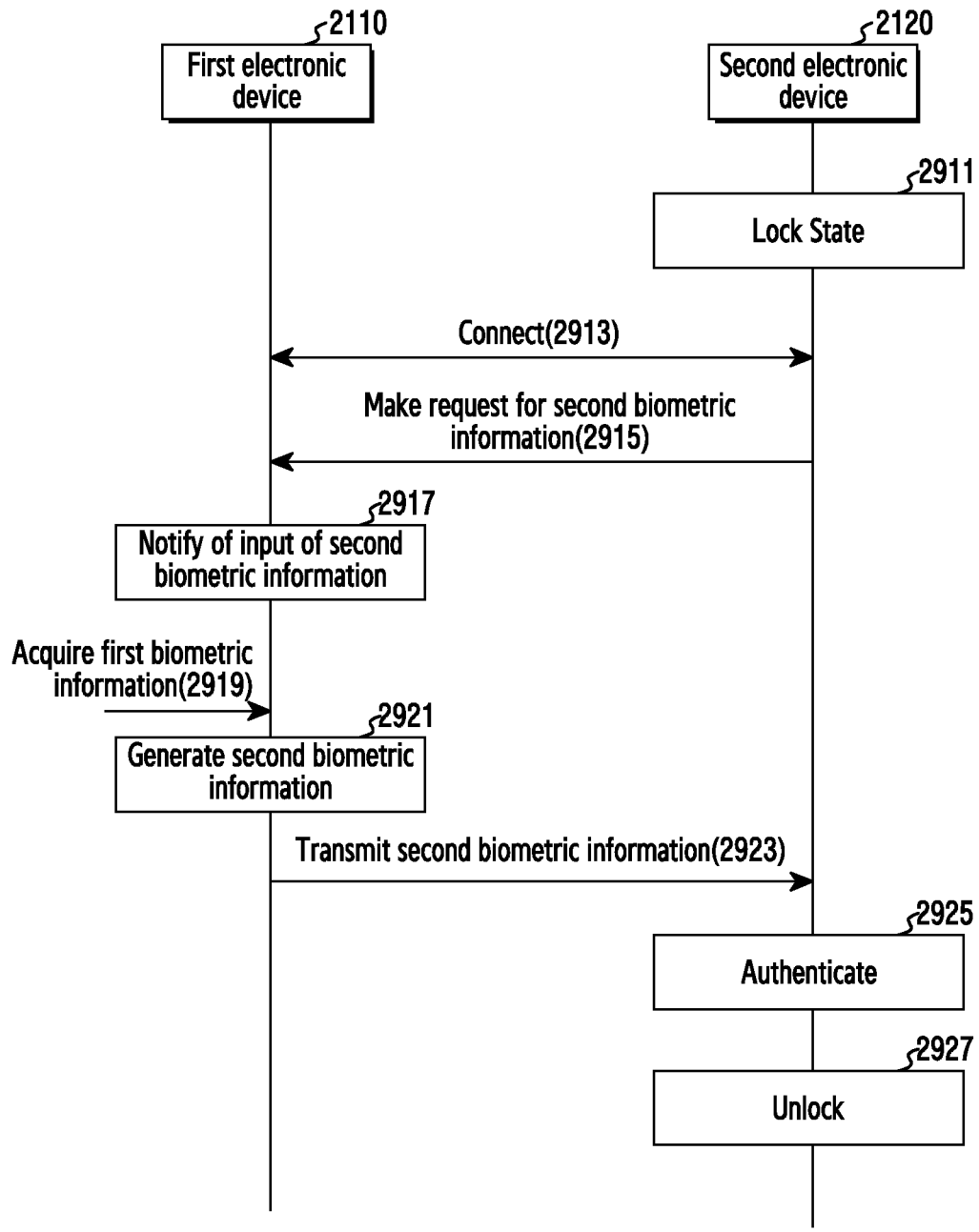
FIG. 29 is a flowchart illustrating an example method of performing an authentication in the communication system according to an example embodiment of the present disclosure.

FIG. 29 is a flowchart illustrating an example method of performing an authentication in the communication system according to an example embodiment of the present disclosure.

Referring to FIG. 29, the second electronic device 2120 (for example, the processor 2125) may identify that the second electronic device 2120 is in a lock state in operation 2911. According to an example embodiment, the lock state of the second electronic device 2120 may refer to a state in which power is provided to the second electronic device 2120 but there is no right to access to the second electronic device 2120 or right to execute a particular function since authentication information, for example, a password is not input. When the second electronic device 2120 (for example, the processor 2125) is in the lock state, an input notification screen may be displayed on the display unit 2123 of the second electronic device 2120.

In operation 2913, the first electronic device 2110 and the second electronic device 2120 may perform the connection. For example, the first electronic device 2110 (for example, the processor 2116) may perform the connection with the second electronic device 2120 through a short-range communication scheme. To this end, the first electronic device 2110 may store second identification information of the second electronic device 2120. Further, the first electronic device 2110 (for example, the processor 2116) may perform the connection with the second electronic device 2120 based on a user's selection. The second electronic device 2120 (for example, the processor 2125) may identify that the first electronic device 2110 approaches within a threshold radius based on a communication scheme such as Bluetooth Low Energy (BLE). When the first electronic device 2110 approaches within the threshold radius, the second electronic device 2120 (for example, 2125) may perform the connection with the first electronic device 2110.

The second electronic device 2120 (for example, the processor 2125) may transfer a request for receiving the second biometric information to the first electronic device 2110 in operation 2915. When the request for the second biometric information is received from the second electronic device 2120 in operation 2915, the first electronic device 2110 (for example, the processor 2116) may notify of an input of the first biometric information to the user in operation 2917. The first electronic device 2110 (for example, the processor 2116) may display screen data that makes a request for inputting the first biometric information through the display unit 413, and output sound data that makes a request for inputting the first biometric information through a speaker (not shown). In operation 2919, the first electronic device 2110 (for example, the processor 2116) may acquire the first biometric information of the user. In operation 2921, the first electronic device 2110 (for example, the processor 2116) may generate the second biometric information based on the first biometric information. The first electronic device 2110 (for example, the processor 2116) may generate the second biometric information by encrypting the first biometric information. In operation 2923, the first electronic device 2110 (for example, the processor 2116) may transmit the second biometric information to the second electronic device 2120.

The second electronic device 2120 (for example, the processor 2125) may perform an authentication based on the second biometric information received from the first electronic device 2110 in operation 2925. When the second biometric information received from the first electronic device 2110 is the same as the second biometric information registered in operation 519 of FIG. 5, the second electronic device 2120 (for example, the processor 2125) may succeed in the authentication using the second biometric information. When the second electronic device 2120 (for example, the processor 2125) succeeds in the authentication using the second biometric information, the lock state of the second electronic device 2120 may be released in operation 2927. The second electronic device 2120 (for example, the processor 2125) may release the lock state and provide a right to access the second electronic device 2120 and a right to execute a particular function to the user.

Figure 30:
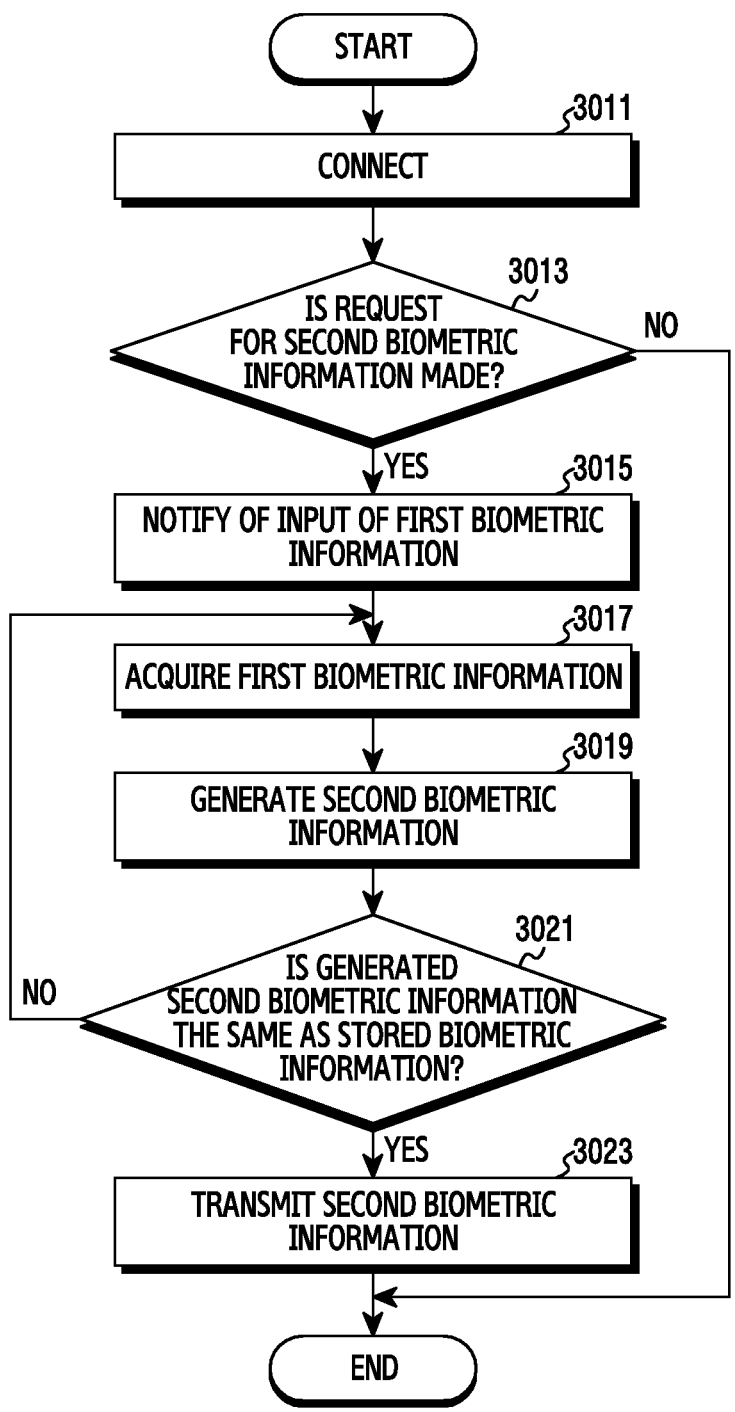
FIG. 30 is a flowchart illustrating an example method of operating the first electronic device according to an example embodiment of the present disclosure.

FIG. 30 is a flowchart illustrating an example method of operating the first electronic device according to an example embodiment of the present disclosure.

Referring to FIG. 30, the processor 2116 may perform a connection with the second electronic device 2120 in operation 3011. For example, the processor 2116 may perform the connection with the second electronic device 2120 through a short-range communication scheme. The processor 2116 may transmit a request for the connection to the second electronic device 2120. Further, the processor 2116 may receive a response to the request for the connection from the second electronic device 2120. Accordingly, when the response to the request for the connection from the second electronic device 2120 is positive, the processor 2116 may complete the connection with the second electronic device 2120. To this end, second identification information of the second electronic device 2120 may be stored in the memory 2115. Further, the processor 2116 may perform the connection with the second electronic device 2120 based on a user's selection. According to an example embodiment, the processor 2116 may search for a peripheral device. When the second electronic device 2120 is found, the processor 2116 may perform the connection with the second electronic device 2120. Further, the processor 2116 may perform the connection with the second electronic device based on a user's selection.

In operation 3013, the processor 2116 may detect a request for the second biometric information. For example, when the request for the second biometric information is made by the second electronic device 2120, operation 3015 may be performed. When the request for the second biometric information is not made by the second electronic device 2120 in operation 3013, the processor 2116 may end the process.

The processor 2116 may notify of the input of the first biometric information to the user in operation 3015. The processor 2116 may display screen data that makes a request for inputting the first biometric information through the display unit 2113, and output sound data that makes a request for inputting the second biometric information through a speaker (not shown). In operation 3017, the processor 2116 may acquire the first biometric information of the user. To this end, the processor 2116 may temporarily turn on a biometric sensor of the sensor unit 2114. According to an example embodiment, the processor 2116 may generate a fingerprint image by scan a user's fingerprint. Alternatively, the processor 2116 may extract at least one feature point from the fingerprint image. Accordingly, the processor 2116 may acquire the fingerprint image or at least one feature point of the fingerprint image as the first biometric information.

In operation 3019, the processor 2116 may generate the second biometric information based on the first biometric information. For example, the processor 2116 may generate the second biometric information by encrypting the first biometric information. For example, the processor 2116 may encrypt the fingerprint image or at least one feature point of the fingerprint image. In operation 3021, the processor 2116 may determine whether the second biometric information generated and stored in operation 513 of FIG. 5 is the same as the second biometric information generated in operation 3019.

When the two pieces of second biometric information are the same based on a result of the determination in operation 3021, the processor 2116 may perform operation 3023. In operation 3023, the processor 2116 may transmit the acquired second biometric information to the second electronic device 2120. When the two pieces of second biometric information are not the same based on the result of the determination in operation 3021, the processor 2116 may return to operation 3017 and additionally acquire the first biometric information of the user.

Figure 31:
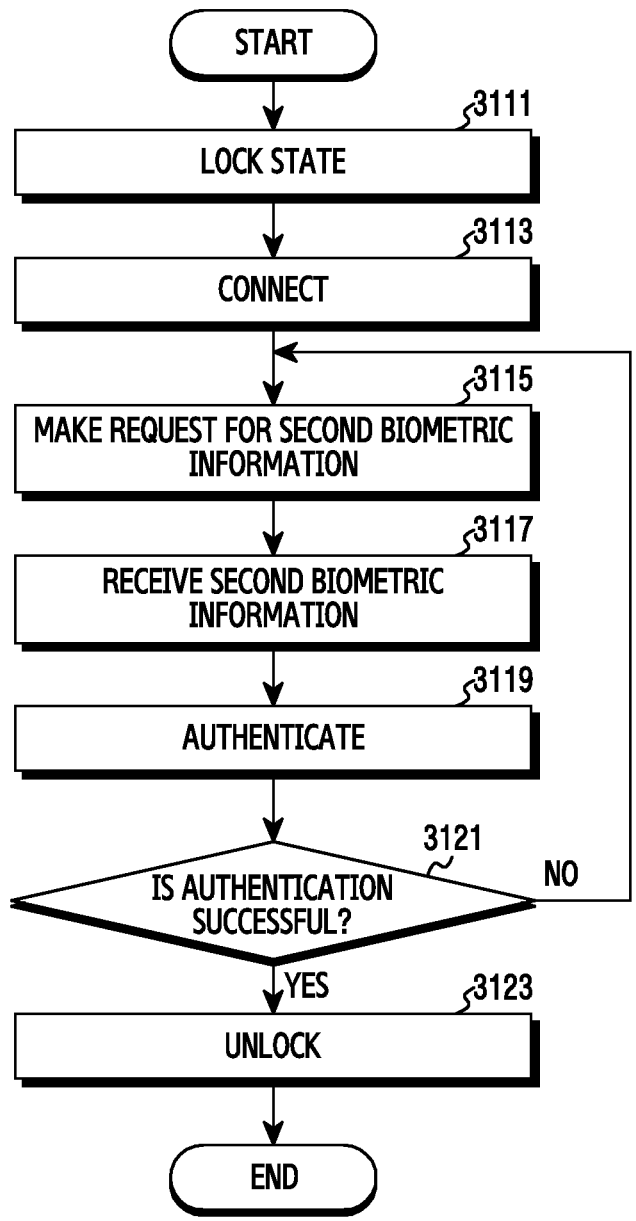
FIG. 31 is a flowchart illustrating an example method of operating the second electronic device according to an example embodiment of the present disclosure.

FIG. 31 is a flowchart illustrating an example method of operating the second electronic device according to an example embodiment of the present disclosure.

Referring to FIG. 31, the processor 2125 may identify that the second electronic device 2120 is in a lock state in operation 3111. According to an example embodiment, the lock state of the second electronic device 2120 may refer to a state in which power is provided to the second electronic device 2120 but there is no right to access to the second electronic device 2120 or right to execute a particular function since authentication information, for example, a password is not input. In the lock state, the processor 2125 may display an input notification screen on the display unit 2123 of the second electronic device 2120.

The processor 2125 may perform a connection with the first electronic device 2110 in operation 3113. For example, the processor 2125 may perform the connection with the first electronic device 2110 through a short-range communication scheme. When a request for the connection is received from the first electronic device 2110, the processor 2125 may determine whether to perform the connection with the first electronic device 2110. Further, the processor 2125 may transmit a response to the request for the connection that indicates whether to perform the connection to the first electronic device 2110. Accordingly, when the response to the request for the connection is positive, the processor 2125 may complete the connection with the first electronic device 2110.

In operation 3115, the processor 2125 may make a request for second biometric information to the first electronic device 2110. In operation 3117, the processor 2125 may receive the second biometric information corresponding to the request for the second biometric information from the first electronic device 2110.

In operation 3119, the processor 2125 may authenticate the second electronic device 2120 based on the second biometric information received from the first electronic device 2110. The processor 2125 may identify whether the second biometric information registered in operation 519 of FIG. 5 is the same as the second biometric information received from the first electronic device 2110. When the authentication is successful in operation 3121, the processor 2125 may perform operation 3123. For example, when the second biometric information received from the first electronic device 2110 is the same as the second biometric information registered in operation 2219 of FIG. 22, the processor 2125 may identify that the authentication is successful and perform operation 3123. In operation 3123, the processor 2125 may unlock the second electronic device 2120. The processor 2125 may release the lock state and may provide the user with a right to access the second electronic device 2120 and a right to execute a particular function.

Figure 32:
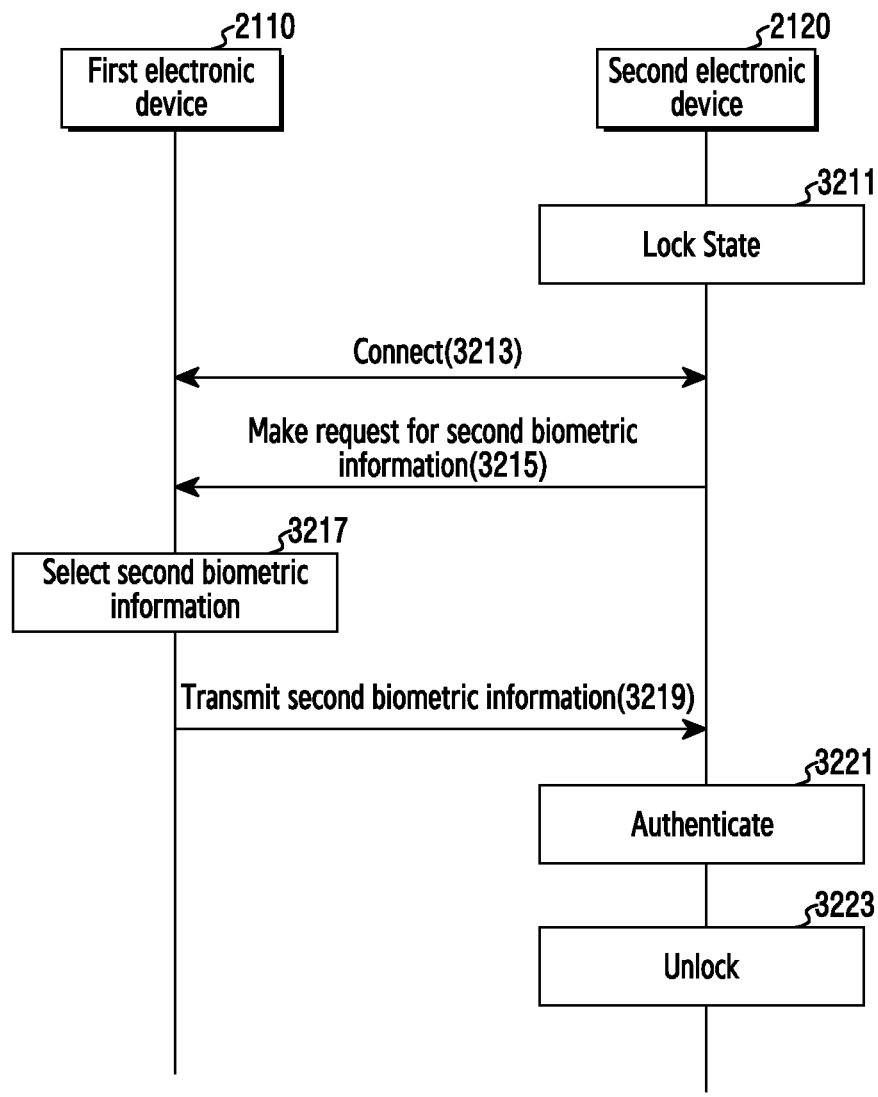
FIG. 32 is a flowchart illustrating an example method of performing an authentication in the communication system according to another example embodiment of the present disclosure.

FIG. 32 is a flowchart illustrating an example method of performing an authentication in the communication system according to another example embodiment of the present disclosure.

Referring to FIG. 32, the second electronic device 2120 (for example, the processor 2125) may identify that the second electronic device 2120 is in a lock state in operation 3211. According to an example embodiment, the lock state of the second electronic device 2120 may refer to a state in which power is provided to the second electronic device 2120 but there is no right to access to the second electronic device 2120 and a right to execute a particular function since authentication information, for example, a password is not input. When the second electronic device 2120 (for example, the processor 2125) is in the lock state, an input notification screen may be displayed on the display unit 2123 of the second electronic device 2120.

In operation 3213, the first electronic device 2110 and the second electronic device 2120 may perform the connection. For example, the first electronic device 2110 (for example, the processor 2116) may perform the connection with the second electronic device 2120 through a short-range communication scheme. To this end, the first electronic device 2110 may store second identification information of the second electronic device 2120. Further, the first electronic device 2110 (for example, the processor 2116) may perform the connection with the second electronic device 2120 based on a user's selection. The second electronic device 420 (for example, the processor 2125) may identify that the first electronic device 2110 approaches within a threshold radius based on a communication scheme such as Bluetooth Low Energy (BLE). When the first electronic device 2110 (for example, the processor 2125) approaches within the threshold radius, the second electronic device 2120 (for example, 2125) may perform the connection with the first electronic device 2110.

The second electronic device 2120 (for example, the processor 2125) may transfer a request for receiving the second biometric information to the first electronic device 2110 in operation 3215. When the request for the second biometric information is received from the second electronic device 2120 in operation 3215, the first electronic device 2110 (for example, the processor 2116) may select the second biometric information in operation 3217. The first electronic device 2110 (for example, the processor 2116) may newly generate the second biometric information based on the first biometric information registered in operation 2211 of FIG. 22. The first electronic device 2110 (for example, the processor 2116) may generate the second biometric information by encrypting the first biometric information. The first electronic device 2110 (for example, the processor 2116) may call the second biometric information generated in operation 2213 of FIG. 22. In operation 3219, the first electronic device 2110 (for example, the processor 2116) may transmit the newly generated second biometric information or the called second biometric information to the second electronic device 2120.

The second electronic device 2120 (for example, the processor 2125) may perform an authentication based on the second biometric information received from the first electronic device 2110 in operation 3221. When the second biometric information received from the first electronic device 2110 is the same as the second biometric information registered in operation 2219 of FIG. 22, the second electronic device 2120 (for example, the processor 2125) may succeed in the authentication using the second biometric information. When the second electronic device 2120 (for example, the processor 2125) succeeds in the authentication using the second biometric information, the lock state of the second electronic device 2120 may be released in operation 3223. The second electronic device 2120 (for example, the processor 2125) may release the lock state and provide a right to access the second electronic device 2120 and a right to execute a particular function to the user.

Figure 33:
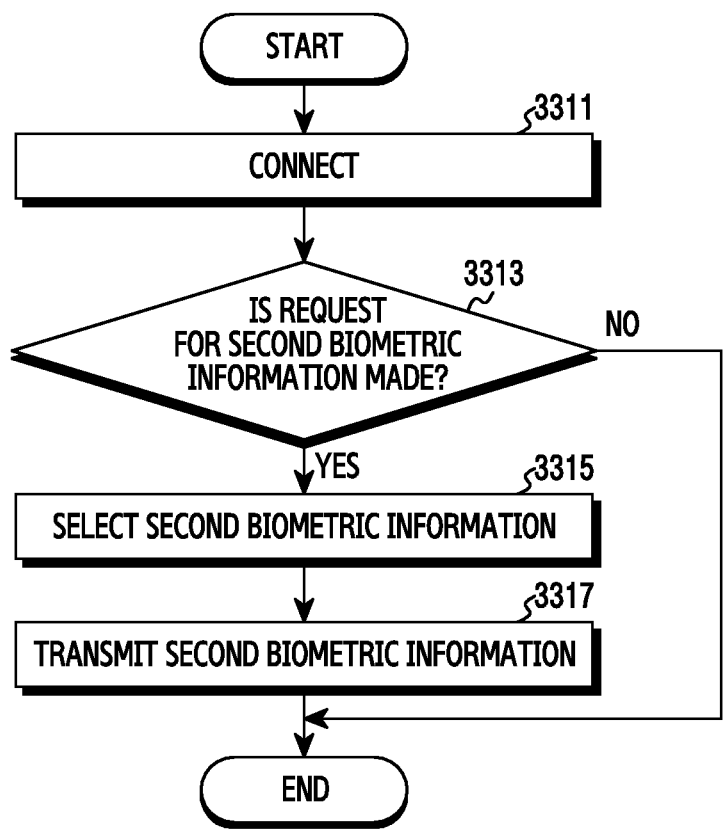
FIG. 33 is a flowchart illustrating an example method of operating the first electronic device according to another example embodiment of the present disclosure.

FIG. 33 is a flowchart illustrating an example method of operating the first electronic device according to another example embodiment of the present disclosure.

Referring to FIG. 33, the processor 2116 may perform a connection with the second electronic device 2120 in operation 3311. For example, the processor 2116 may perform the connection with the second electronic device 2120 through a short-range communication scheme. The processor 2116 may transmit a request for the connection to the second electronic device 2120. Further, the processor 2116 may receive a response to the request for the connection from the second electronic device 2120. Accordingly, when the response to the request for the connection from the second electronic device 2120 is positive, the processor 2116 may complete the connection with the second electronic device 2120. To this end, second identification information of the second electronic device 2120 may be stored in the memory 2115. Further, the processor 2116 may perform the connection with the second electronic device 2120 based on a user's selection. According to an example embodiment, the processor 2116 may search for a peripheral device. When the second electronic device 2120 is found, the processor 2116 may perform the connection with the second electronic device 2120. Further, the processor 2116 may perform the connection with the second electronic device 2120 based on a user's selection.

In operation 3313, the processor 2116 may detect a request for the second biometric information. For example, when the request for the second biometric information is made by the second electronic device 2120, operation 3315 may be performed. When the request for the second biometric information is not made by the second electronic device 2120 in operation 3313, the processor 2116 may end the process.

In operation 3315, the processor 2116 may select the second biometric information. The processor 2116 may newly generate the second biometric information based on the first biometric information registered in operation 2211 of FIG. 22. The processor 2116 may call the second biometric information generated in operation 2213 of FIG. 22. In operation 3315, the processor 2116 may select one piece of the second biometric information from the generated second biometric information or the called second biometric information. In operation 3317, the processor 2116 may transmit the selected second biometric information to the second electronic device 2120.

Further, since a method of unlocking the second electronic device 2120 when the first electronic device 2110 is in the automatic mode is the same as the method of unlocking the second electronic device 2120 when the first electronic device 2110 is in the manual mode in FIG. 31, a detailed description thereof will be omitted.

Figure 34:
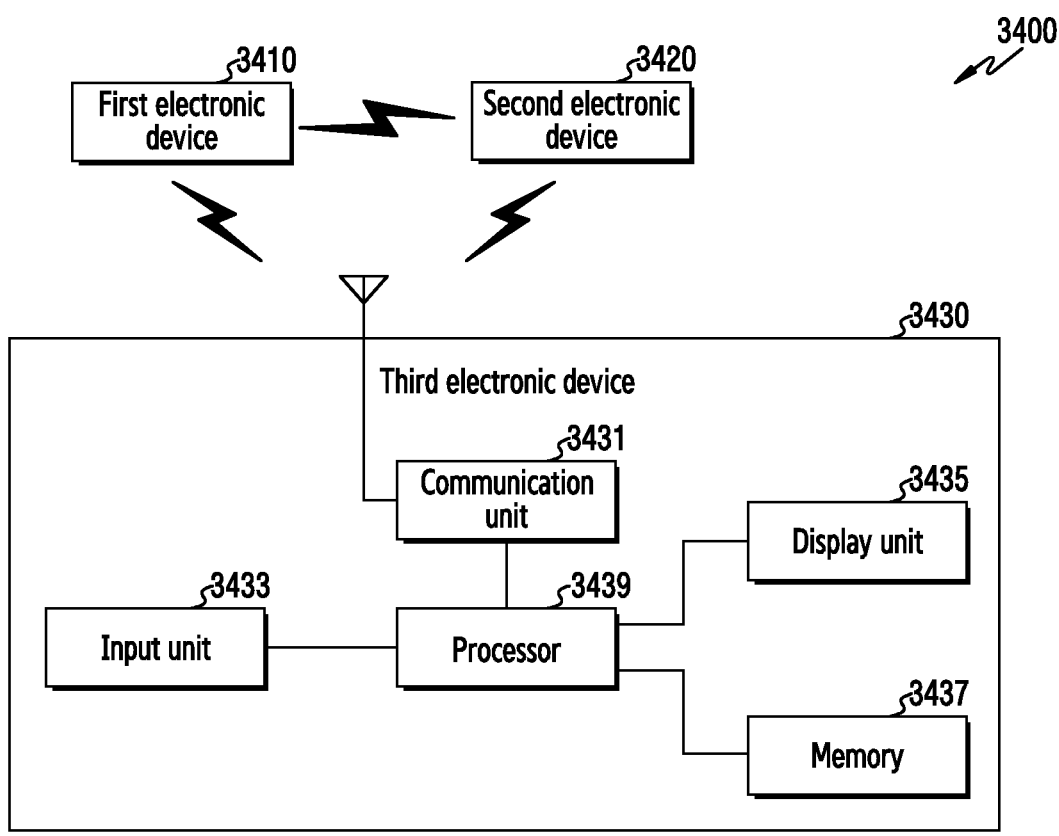
FIG. 34 is a block diagram illustrating an example communication system according to an example embodiment of the present disclosure.

FIG. 34 is a block diagram illustrating an example communication system according to an example embodiment of the present disclosure.

Referring to FIG. 34, a communication system 3400 according to the present disclosure may include a first electronic device 3410, a second electronic device 3420, and a third electronic device 3430. The first electronic device 3410, the second electronic device 3420, and the third electronic device 3430 may be different types of electronic device or may be the same type of electronic device. The first electronic device 3410, the second electronic device 3420, or the third electronic device 3430 may access each other and communicate with each other. Since the first electronic device 3410 and the second electronic device 3420 are the same as the first electronic device 2110 and the second electronic device 2120 of FIG. 21, respectively, a detailed description thereof will be omitted.

The third electronic device 3430 may be driven while moving. For example, the third electronic device 3430 may move while being mounted on the user. According to various example embodiments, the third electronic device 3430 may include a communication unit (e.g., including communication circuitry) 3431, an input unit (e.g., including input circuitry) 3433, a display unit 3435, a memory 3437, and a processor (e.g., including processing circuitry) 3439. According to an example embodiment, the third electronic device 3430 may be a wearable device such as a smart watch or smart glasses. The third electronic device 3430 may store second biometric information received form the first electronic device 3410 or the second electronic device 3420 and unlock the second electronic device 3420 based on the stored second biometric information.

The communication unit 3431 may include various communication circuitry configured to perform communication in the third electronic device 3430. The communication unit 3431 may communicate with an external device through various communication schemes. For example, the communication unit 3431 may perform wired or wireless communication. To this end, the communication unit 3431 may include at least one antenna. Further, the communication unit 3431 may access at least one of a mobile communication network and a data communication network. Alternatively, the communication unit 3431 can perform short-range communication. For example, the external device may include at least one of an electronic device, a base station, and a satellite. According to various example embodiments, the external device may include at least one of the first electronic device 3410 and the second electronic device 3420. Further, the communication schemes may include Long Term Evolution (LTE), Wideband Code Division Multiple Access (WCDMA), Global System for Mobile communications (GSM), Wi-Fi, wireless Local Area Network (wireless LAN), Bluetooth, and Near Field Communication (NFC).

The input unit 3433 may generate input data in the third electronic device 3430. The input unit 3433 may include at least one input means. For example, the input unit 3433 may include various input circuitry, such as, for example, and without limitation, at least one of a key pad, a dome switch, a physical button, a touch panel, and a jog & shuttle.

The display unit 3435 may output display data in the third electronic device 3430. For example, the display unit 3435 may include a Liquid Crystal Display (LCD), a Light Emitting Diode (LED) display, an Organic LED (OLED) display, an Active Matrix Light Emitting Diode (AMOLED) display, a Micro ElectroMechanical System (MEMS) display, and an electronic paper display, or the like, but is not limited thereto. The display unit 3435 may be combined with the input unit 3433 and may be implemented as a touch screen.

The memory 3437 may store operation programs of the third electronic device 3430. Further, the memory 3437 may store data generated while the programs are executed. The memory 3437 may store identification information of the third electronic device 3430, that is, third identification information. For example, the memory 3437 may include one of an internal memory and an external memory. The internal memory may include at least one of a volatile memory (for example, a DRAM, an SRAM, an SDRAM, and the like) and a non-volatile memory (for example, a one time programmable ROM (OTPROM), a PROM, an EPROM, an EEPROM, a mask ROM, a flash ROM, a flash memory, a hard disk drive, or a Solid State Drive (SSD)). The external memory may include one of a flash drive, a Compact Flash (CF), a Secure Digital (SD), a Micro-SD, a Mini-SD, an eXtreme digital (xD), a Multi-Media Card (MMC), and a memory stick.

The processor 3439 may include various processing circuitry configured control the general operation of the third electronic device 3430. The processor 3439 may perform various functions. To this end, the processor 3439 may control elements of the third electronic device 3430. Further, the processor 3439 may receive instructions and data from the elements of the third electronic device 3430 and process the instructions and data.

According to an example embodiment, the electronic device (for example, the first electronic device 2110 or 3410) according to the present disclosure may include the sensor unit 2114 for recognizing first biometric information, the communication unit 2111, the sensor unit 2114, and the processor 2116 functionally connected to the communication unit 2111, wherein the processor 2116 may configured to register the first biometric information recognized by the sensor unit 2114 to perform an authentication, to generate second biometric information based on the first biometric information when a request for setting biometric information registration in an external device (for example, the second electronic device 2120 or 3420) is made, and to output the second biometric information to register the second biometric information in the external device (for example, the second electronic device 2120 or 3420) through the communication unit 2111. The first biometric information may be fingerprint information.

The processor 2116 may perform a communication connection with the external device (for example, the second electronic device 420 or 3420) through the communication unit 2111 when the request for setting the biometric information registration is made, generate second biometric information when the external device (for example, the second electronic device 2120 or 3420) makes a request for inputting biometric information, and output the second biometric information to the external device (for example, the second electronic device 2120 or 3420) to register the second biometric information in the external device (for example, the second electronic device 2120 or 3420).

When a request for setting biometric information registration is made, the processor 2116 may perform a communication connection with the external device (for example, the second electronic device 420 or 3420) through the communication unit 2111, recognize first biometric information through the sensor unit 2114, generate second biometric information based on the first biometric information, and output the second biometric information to the external device (for example, the second electronic device 2120 or 3420) through the communication unit 2111.

When the external device (for example, the second electronic device 420 or 3420) makes a request for the authentication, the processor 2116 may output second biometric information for executing a user authentication to the external device (for example, the second electronic device 420 or 3420) through the communication unit 2111.

When an approach of the external device (for example, the second electronic device 420 or 3420) is recognized, the processor 2116 may perform a communication connection with the external device (for example, the second electronic device 2120 or 3420) and, when the external device (for example, the second electronic device 2120 or 3420) makes the request for the authentication, output second biometric information for authenticating the user of the external device (for example, the second electronic device 2120 or 3420) through the communication unit 2111.

When the approach of the external device (for example, the second electronic device 420 or 3420) is recognized, the processor 2116 may perform the communication connection with the external device (for example, the second electronic device 2120 or 3420) and, when the external device (for example, the second electronic device 2120 or 3420) makes the request for the authentication, recognize first biometric information through the sensor unit 2114, generate second biometric information based on the first biometric information, and output the second biometric information for authenticating the user of the external device (for example, the second electronic device 2120 or 3420) through the communication unit 2111.

The communication unit 411 may include various communication circuitry, such as, for example, and without limitation, a Bluetooth and/or NFC communication unit, and may recognize an approach of the external device (for example, the second electronic device 2120 or 3420) and perform a communication connection operation with the external device (for example, the second electronic device 2120 or 3420).

The wearable device (for example, the third electronic device 3430) may be further included, and, when a request for setting biometric information registration in the wearable device (for example, the third electronic device 3430) is made, the processor 2116 may generate second biometric information based on first biometric information and output the second biometric information through the communication unit 2111 to register the second biometric information in the wearable device (for example, the third electronic device 3430).

When the external device (for example, the second electronic device 2120 or 3420) makes the request for the authentication, the wearable device (for example, the third electronic device 3430) may output second biometric information in the external device (for example, the second electronic device 2120 or 3420) through the communication unit 2111 to perform a user authentication.

An operation method according to the electronic device (for example, the first electronic device 2110 or 3410) of the present disclosure may include an operation of acquiring biometric information corresponding to the user of the electronic device (for example, the first electronic device 2110 or 3410), an operation of generating virtual biometric information at least based on the biometric information, and an operation of providing the virtual biometric information to the external device (for example, the second electronic device 2120 or 3420) to allow the external device (for example, the second electronic device 2120 or 3420) to register the virtual biometric information as information for authenticating the user. The operation of acquiring the biometric information may be an operation of acquiring information related to a user's fingerprint.

The operation of acquiring the biometric information may further include an operation of receiving a request for authenticating the user, an operation of displaying a user interface for acquiring biometric information, an operation of acquiring second biometric information through the user interface, and an operation of generating second virtual biometric information at least based on the second biometric information.

The operation of providing the virtual biometric information to the external device (for example, the second electronic device 2120 or 3420) may further include an operation of receiving an authentication request from the external device (for example, the second electronic device 2120 or 3420) and an operation of providing second virtual biometric information to the external device (for example, the second electronic device 2120 or 3420).

The electronic device (for example, the first electronic device 2110 or 3410) may further include the memory 2115, and further include an operation of storing biometric information in the memory 2115.

The operation of generating the virtual biometric information may further include an operation of receiving the authentication request from the external device (for example, the second electronic device 2120 or 3420) and an operation of generating the virtual biometric information based on the stored biometric information.

The operation of generating the virtual biometric information may further include an operation of receiving a request for authenticating the user from the external device (for example, the second electronic device 2120 or 3420) and an operation of displaying a user interface for acquiring biometric information in response to the request.

The electronic device (for example, the first electronic device 2110 or 3410 may further include the sensor unit 2114, and the operation of providing the virtual biometric information to the external device (for example, the second electronic device 2120 or 3420) may further include an operation of recognizing the approach of the external device (for example, the second electronic device 2120 or 3420) through the sensor unit 2114 and an operation of providing virtual biometric information to the external device (for example, the second electronic device 2120 or 3420) in response to the approach.

The sensor unit 2114 may further include a Bluetooth or NFC communication unit, and the operation of recognizing the approach of the external device (for example, the second electronic device 2120 or 3420) may be an operation of recognizing the approach of the external device (for example, the second electronic device 2120 or 3420) through the Bluetooth or NFC communication unit.

Information related to the user's finger may be information including a feature point and an image related to the fingerprint.

Figure 35:
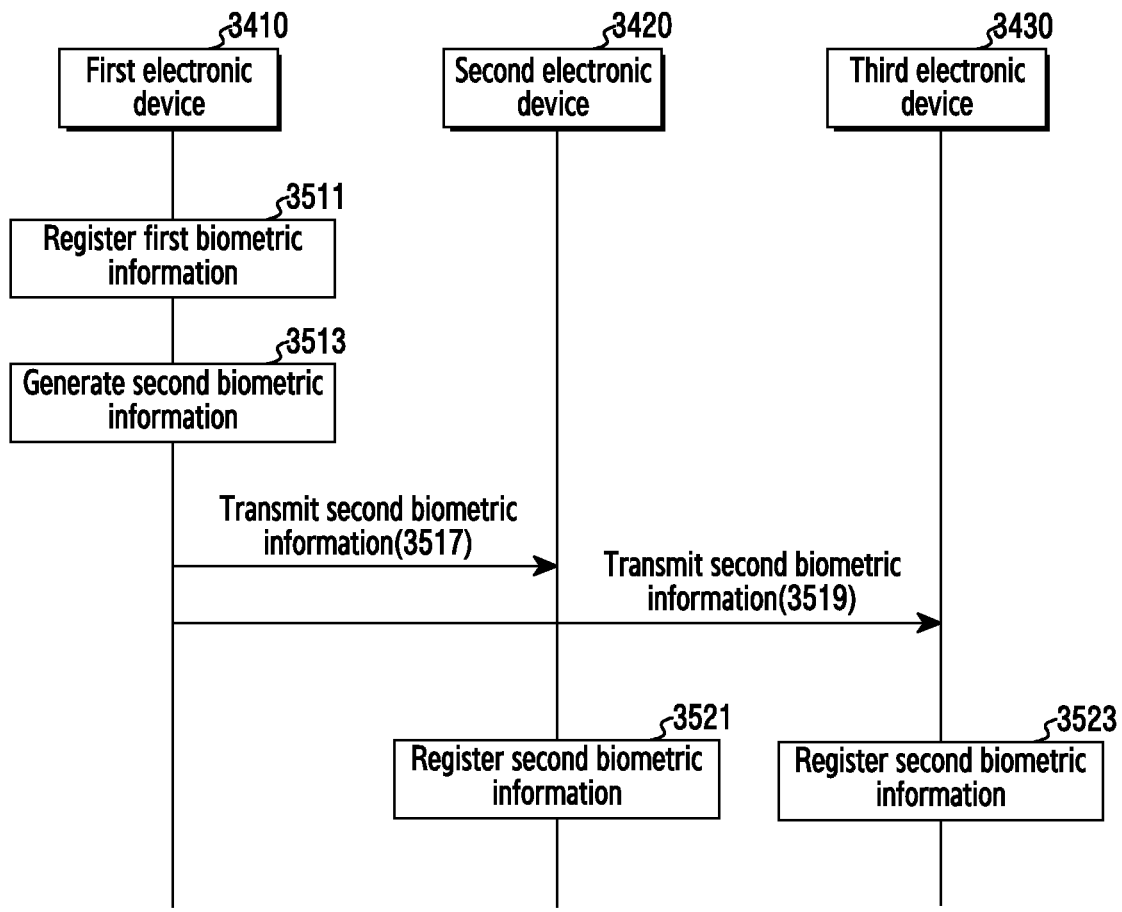
FIG. 35 is a flowchart illustrating an example method of registering biometric information in the communication system according to an example embodiment of the present disclosure.

FIG. 35 is a flowchart illustrating an example method of registering biometric information in the communication system according to an example embodiment of the present disclosure.

Referring to FIG. 35, in operation 3511, the first electronic device 3410 (for example, the processor 3439) may register first biometric information. The first electronic device 3410 (for example, the processor 3439) may acquire the first biometric information from the user. Further, the first electronic device 3410 (for example, the processor 3439) may store the first biometric information in accordance with the user. According to an example embodiment, the first electronic device 3410 (for example, the processor 3439) may generate a fingerprint image by scanning a user's fingerprint. The first electronic device 3410 (for example, the processor 3439) may extract at least one feature point from the fingerprint image. Accordingly, the first electronic device 3410 (for example, the processor 3439) may acquire the fingerprint image or at least one feature point of the fingerprint image as the first biometric information. Further, the first electronic device 3410 (for example, the processor 3439) may store the fingerprint image or at least one feature point of the fingerprint image as the first biometric information.

According to an example embodiment, the first electronic device 3410 (for example, the processor 3439) may set a right to access the first electronic device 3410 (for example, the processor 3439) in accordance with the first biometric information. For example, the first electronic device 3410 (for example, the processor 3439) may set a right to unlock the first electronic device 3410 (for example, the processor 3439) in accordance with the first biometric information. Alternatively, the first electronic device 3410 (for example, the processor 3439) may set a right to execute a particular function in accordance with the first biometric information.

According to various example embodiments, in operation 3513, the first electronic device 3410 (for example, the processor 3439) may generate second biometric information based on the first biometric information. The first electronic device 3410 (for example, the processor 3439) may generate the second biometric information by encrypting the first biometric information. For example, the first electronic device 3410 may store the second biometric information. According to an example embodiment, the first electronic device 3410 (for example, the processor 3439) may encrypt the fingerprint image or at least one feature point of the fingerprint image.

According to various example embodiments, in operation 3517, the first electronic device 3410 (for example, the processor 3439) may transmit the second biometric information to the second electronic device 3420. To this end, the first electronic device 3410 (for example, the processor 3439) may store second identification information of the second electronic device 3420. Further, the first electronic device 3410 (for example, the processor 3439) may transmit the second biometric information to the second electronic device 3420 based on a user's selection. For example, the first electronic device 3410 (for example, the processor 3439) may transmit the second biometric information to the second electronic device 3420 through a short-range communication scheme. At this time, the first electronic device 3410 (for example, the processor 3439) may transmit first identification information along with the second identification information.

According to various example embodiments, in operation 3519, the first electronic device 3410 (for example, the processor 3439) may transmit the second biometric information to the third electronic device 3430. To this end, the first electronic device 3410 (for example, the processor 3439) may store third identification information of the third electronic device 3430. Further, the first electronic device 3410 (for example, the processor 3439) may transmit the third biometric information to the third electronic device 3430 based on a user's selection. For example, the first electronic device 3410 (for example, the processor 3439) may transmit the third biometric information to the third electronic device 3430 through a short-range communication scheme. At this time, the first electronic device 3410 (for example, the processor 3439) may transmit the first identification information along with the third identification information.

According to various example embodiments, in operation 3521, the second electronic device 3420 (for example, the processor 2125) may register the second biometric information. For example, the second electronic device 3420 (for example, the processor 2125) may store the second biometric information in accordance with the user. The second electronic device 3420 (for example, the processor 2125) may store the second biometric information in accordance with the first electronic device 3410.

According to an example embodiment, the second electronic device 3420 (for example, the processor 2125) may set a right to access the second electronic device 3420 (for example, the processor 2125) in accordance with the second biometric information. For example, the second electronic device 3420 (for example, the processor 2125) may set a right to unlock the second electronic device 3420 in accordance with the second biometric information. The second electronic device 3420 (for example, the processor 2125) may set a right to execute a particular function in accordance with the second biometric information.

According to various example embodiments, in operation 3523, the third electronic device 3430 (for example, the processor 3439) may register the second biometric information. For example, the third electronic device 3430 (for example, the processor 3439) may store the second biometric information in accordance with the user. The third electronic device 3430 (for example, the processor 3439) may store the second biometric information in accordance with the first electronic device 3410.

Figure 36:
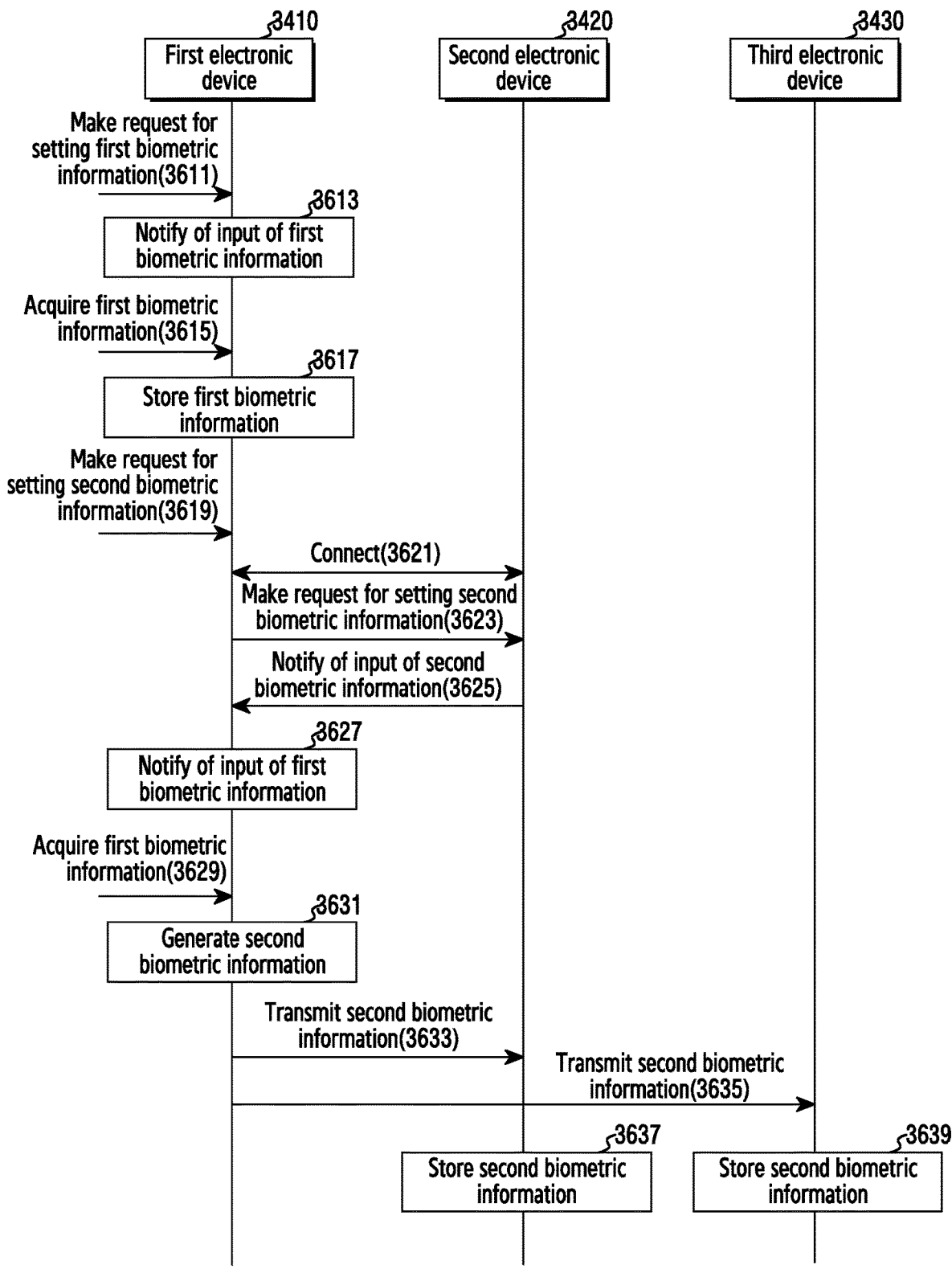
FIG. 36 is a flowchart illustrating an example method of registering biometric information in the communication system according to an example embodiment of the present disclosure.

FIG. 36 is a flowchart illustrating an example method of registering biometric information in the communication system according to an example embodiment of the present disclosure.

Referring to FIG. 36, in operation 3611, the first electronic device 3410 (for example, the processor 2116) may detect a request for setting the first biometric information. For example, when the request for setting the first biometric information in the first electronic device 3410 is generated by the user, the first electronic device 3410 (for example, the processor 2116) may detect the request. In operation 3613, the first electronic device 3410 (for example, the processor 2116) may notify of an input of the first biometric information to the user in response to the request for setting the first biometric information. In operation 3615, the first electronic device 3410 (for example, the processor 2116) may acquire the first biometric information of the user. In operation 3617, the first electronic device 3410 (for example, the processor 2116) may store the first biometric information in accordance with the user.

According to various example embodiments, in operation 3619, the first electronic device 3410 (for example, the processor 2116) may detect a request for setting the second biometric information. For example, when the request for setting the second biometric information in the second electronic device 3420 is generated, the first electronic device 3410 (for example, the processor 2116) may detect the request. In operation 3621, the first electronic device 3410 (for example, the processor 2116) may perform a connection with the second electronic device 3420 in response to the request for setting the second biometric information. For example, the first electronic device 3410 (for example, the processor 2116) may perform the connection with the second electronic device 3420 through a short-range communication scheme. To this end, the first electronic device 3410 may store second identification information of the second electronic device 3420. Further, the first electronic device 3410 (for example, the processor 2116) may perform the connection with the second electronic device 3420 based on a user's selection. In operation 3623, the first electronic device 3410 (for example, the processor 2116) may transfer the request for setting the second biometric information to the second electronic device 3420. When the request for setting the second biometric information is received from the first electronic device 3410 in operation 3623, the second electronic device 3420 (for example, the processor 2125) may notify of an input of the second biometric information to the first electronic device 3410 in operation 3625.

According to various example embodiments, when the input of the second biometric information is notified by the second electronic device 3420 in operation 3625, the first electronic device 3410 (for example, the processor 2116) may notify of the input of the first biometric information to the user in operation 3627. The first electronic device 3410 (for example, the processor 2116) may display screen data that makes a request for inputting the first biometric information through the display unit 413, and output sound data that makes a request for inputting the first biometric information through a speaker (not shown). In operation 3629, the first electronic device 3410 (for example, the processor 2116) may acquire the first biometric information of the user. In operation 3631, the first electronic device 3410 (for example, the processor 2116) may generate second biometric information based on the first biometric information. The first electronic device 3410 (for example, the processor 2116) may generate the second biometric information by encrypting the first biometric information. For example, the first electronic device 3410 may store the second biometric information. In operation 3633, the first electronic device 3410 (for example, the processor 2116) may transmit the second biometric information to the second electronic device 3420. When the second biometric information is received from the first electronic device 3410 in operation 3633, the second electronic device 3420 (for example, the processor 2125) may store the second biometric information in operation 3637. In operation 3635, the first electronic device 3410 (for example, the processor 2116) may transmit the second biometric information to the third electronic device 3430. In operation 3639, the third electronic device 3430 (for example, the processor 3439) may store the second biometric information.

Figure 37:
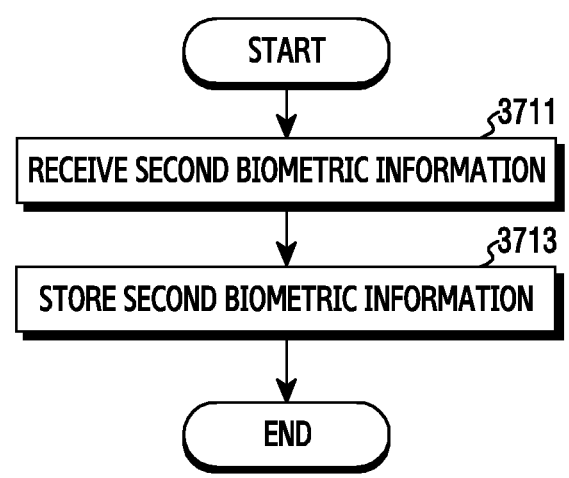
FIG. 37 is a flowchart illustrating an example method of operating a third electronic device according to an example embodiment of the present disclosure.

FIG. 37 is a flowchart illustrating an example method of operating the third electronic device according to an example embodiment of the present disclosure.

Referring to FIG. 37, the processor 3439 may receive second biometric information from the first electronic device 3410 or the second electronic device 3420 in operation 3711. The third electronic device 3430 may perform wireless communication with the first electronic device 3410 or the second electronic device 3420 through short-range communication such as Bluetooth or Bluetooth Low Energy (BLE), and perform wired communication through a cable. In operation 3713, the processor 3439 may store the second biometric information.

Operations of the first electronic device 3410 and the second electronic device 3420 illustrated in FIG. 36 are the same as the operations of the first electronic device 2110 and the second electronic device 2120 illustrated in FIG. 6. Accordingly, flowcharts illustrating methods of operating the first electronic device 3410 and the second electronic device 3420 may be replaced with FIGS. 24 and 25.

Figure 38:
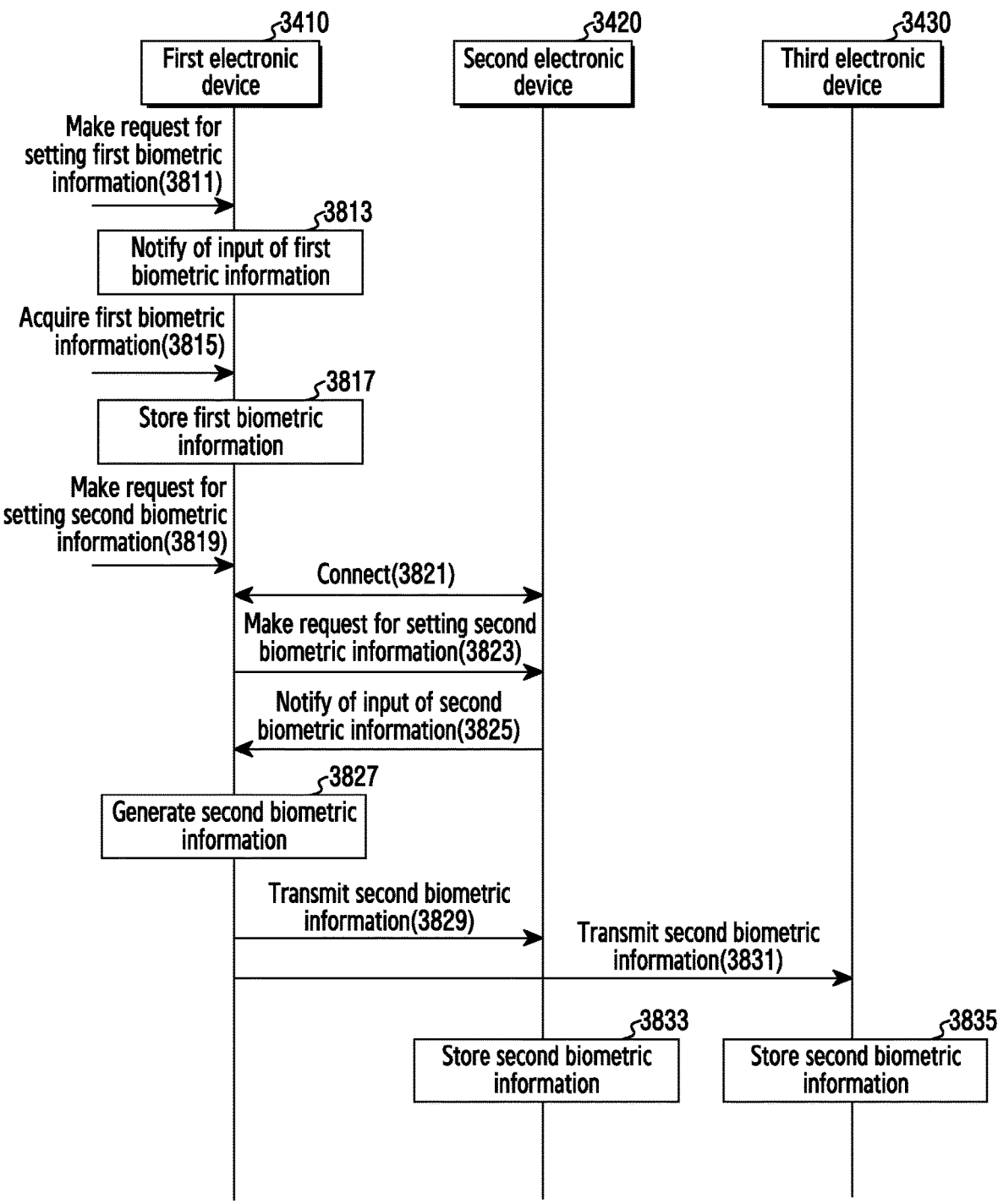
FIG. 38 is a flowchart illustrating an example method of registering biometric information in the communication system according to another example embodiment of the present disclosure.

FIG. 38 is a flowchart illustrating an example method of registering biometric information in the communication system according to another example embodiment of the present disclosure.

Referring to FIG. 38, in operation 3811, the first electronic device 3410 (for example, the processor 2116) may detect a request for setting the first biometric information. For example, when the request for setting the first biometric information in the first electronic device 3410 is generated, the first electronic device 3410 (for example, the processor 2116) may detect the request. In response to this, the first electronic device 3410 (for example, the processor 2116) may notify of an input of first biometric information to the user in operation 3813. In operation 3815, the first electronic device 3410 (for example, the processor 2116) may acquire the first biometric information of the user. In operation 3817, the first electronic device 3410 (for example, the processor 2116) may store the first biometric information in accordance with the user.

According to various example embodiments, in operation 3819, the first electronic device 3410 (for example, the processor 2116) may detect the request for setting the second biometric information. For example, when the request for setting the second biometric information in the second electronic device 3420 is generated, the first electronic device 3410 (for example, the processor 2116) may detect the request In response to this, in operation 3821, the first electronic device 3410 (for example, the processor 2116) may perform a connection with the second electronic device 3420. For example, the first electronic device 3410 may perform the connection with the second electronic device 3420 through a short-range communication scheme. To this end, the first electronic device 3410 may store second identification information of the second electronic device 3420. Further, the first electronic device 3410 (for example, the processor 2116) may perform the connection with the second electronic device 3420 based on a user's selection. In operation 3823, the first electronic device 3410 (for example, the processor 2116) may transfer the request for setting the second biometric information to the second electronic device 3420. When the request for setting the second biometric information is received from the first electronic device 3410 in operation 3823, the second electronic device 3420 (for example, the processor 2125) may notify of an input of the second biometric information to the first electronic device 3410 in operation 3825.

According to various example embodiments, in operation 3827, the first electronic device 3410 (for example, the processor 2116) may generate second biometric information based on the first biometric information. The first electronic device 3410 (for example, the processor 2116) may generate the second biometric information based on the first biometric information stored in operation 3827. The first electronic device 3410 (for example, the processor 2116) may generate the second biometric information by encrypting the first biometric information. For example, the first electronic device 3410 may store the second biometric information. In operation 3829, the first electronic device 3410 (for example, the processor 2116) may transmit the second biometric information to the second electronic device 3420. In operation 3831, the first electronic device 3410 (for example, the processor 2116) may transmit the second biometric information to the third electronic device 3430. The second electronic device 3420 (for example the processor 2125) may store the second biometric information in operation 3833, and the third electronic device 3430 (for example, the processor 3439) may store the second biometric information in operation 3835.

Operations of the first electronic device 3410 and the second electronic device 3420 illustrated in FIG. 38 are the same as the operations of the first electronic device 2110 and the second electronic device 2120 illustrated in FIG. 26. Accordingly, flowcharts illustrating methods of operating the first electronic device 3410 and the second electronic device 3420 may be replaced with FIGS. 27 and 25. Further, the operation of the third electronic device 3430 illustrated in FIG. 38 is the same as the operation of the third electronic device 3430 illustrated in FIG. 36. Accordingly, a flowchart illustrating a method of operating the third electronic device 3430 may be replaced with FIG. 37.

Figure 39:
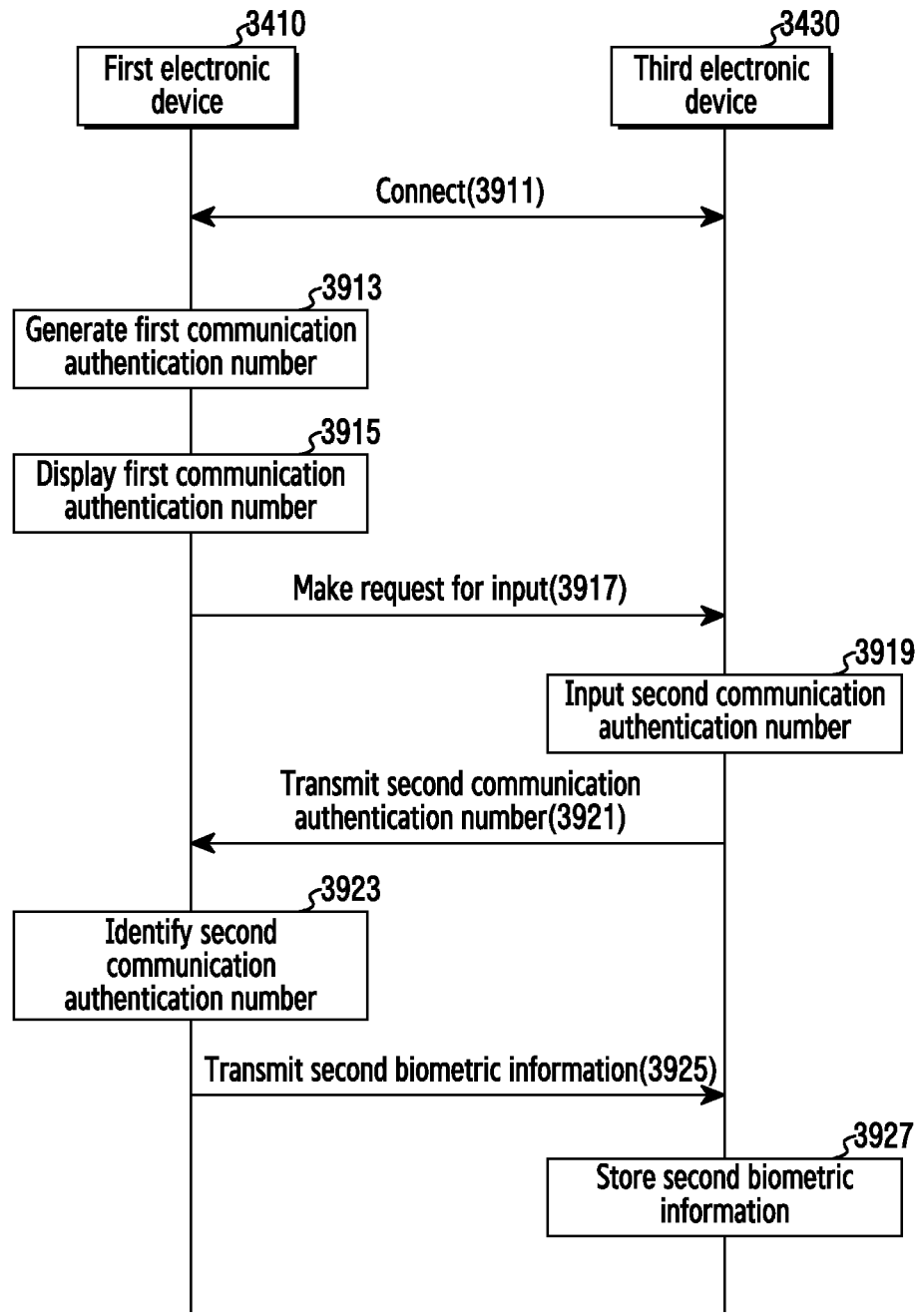
FIG. 39 is a flowchart illustrating an example method of storing biometric information in the first electronic device to the third electronic device according to an example embodiment of the present disclosure.

FIG. 39 is a flowchart illustrating an example method of storing biometric information in the first electronic device to the third electronic device according to an example embodiment of the present disclosure.

Referring to FIG. 39, in operation 3911, the first electronic device 3410 and the third electronic device 3430 may perform a connection to each other. When a request for the connection is received from the first electronic device 3410, the third electronic device 3430 (for example, the processor 3439) may determine whether to perform the connection with the first electronic device 3410. Further, the third electronic device 3430 (for example, the processor 3439) may transmit a response to the request for the connection that indicates whether to perform the connection to the first electronic device 3410. When the response to the request for the connection is positive, the third electronic device 3430 (for example, the processor 3439) may complete the connection with the first electronic device 3410.

The first electronic device 3410 (for example, the processor 2116) may generate a first communication authentication number in operation 3913. The first communication authentication number may be a Personal Identification Number (PIN) code or may be a number for authenticating that a user of the first electronic device 3410 and a user of the third electronic device 3430 are the same user. In operation 3915, the first electronic device 3410 (for example, the processor 2116) may display the first communication authentication number on the display unit 413. In operation 3917, the first electronic device 3410 (for example, the processor 2116) may make a request for inputting the first communication authentication number to the third electronic device 3430.

In operation 3919, the third electronic device 3430 (for example, the processor 3439) may receive a second communication authentication number from the user. In operation 3921, the third electronic device 3430 (for example, the processor 3439) may transmit the input second communication authentication number to the first electronic device 3410. In operation 3923, the first electronic device 3410 (for example, the processor 2116) may identify the second communication authentication number received from the third electronic device 3430. The first electronic device 3410 (for example, the processor 2116) may identify whether the first communication authentication number generated in operation 3913 is the same as the second communication authentication number received in operation 3921. When the first communication authentication number is the same as the second communication authentication number, the first electronic device 3410 (for example, the processor 2116) may transmit second biometric information to the third electronic device 3430 in operation 3925.

Although it is described that the first electronic device 3410 (for example, the processor 2116) may transmit the second biometric information to the third electronic device 3430 through wired communication with the third electronic device 3430, the present disclosure is not necessarily limited thereto. When the first electronic device 3410 and the third electronic device 3430 are connected through wired communication, the second biometric information of the first electronic device 3410 may be transmitted to the third electronic device 3430 without any authentication process through the communication authentication number.

In operation 3927, the third electronic device 3430 may store the second biometric information in a storage thereof.

Figure 40:
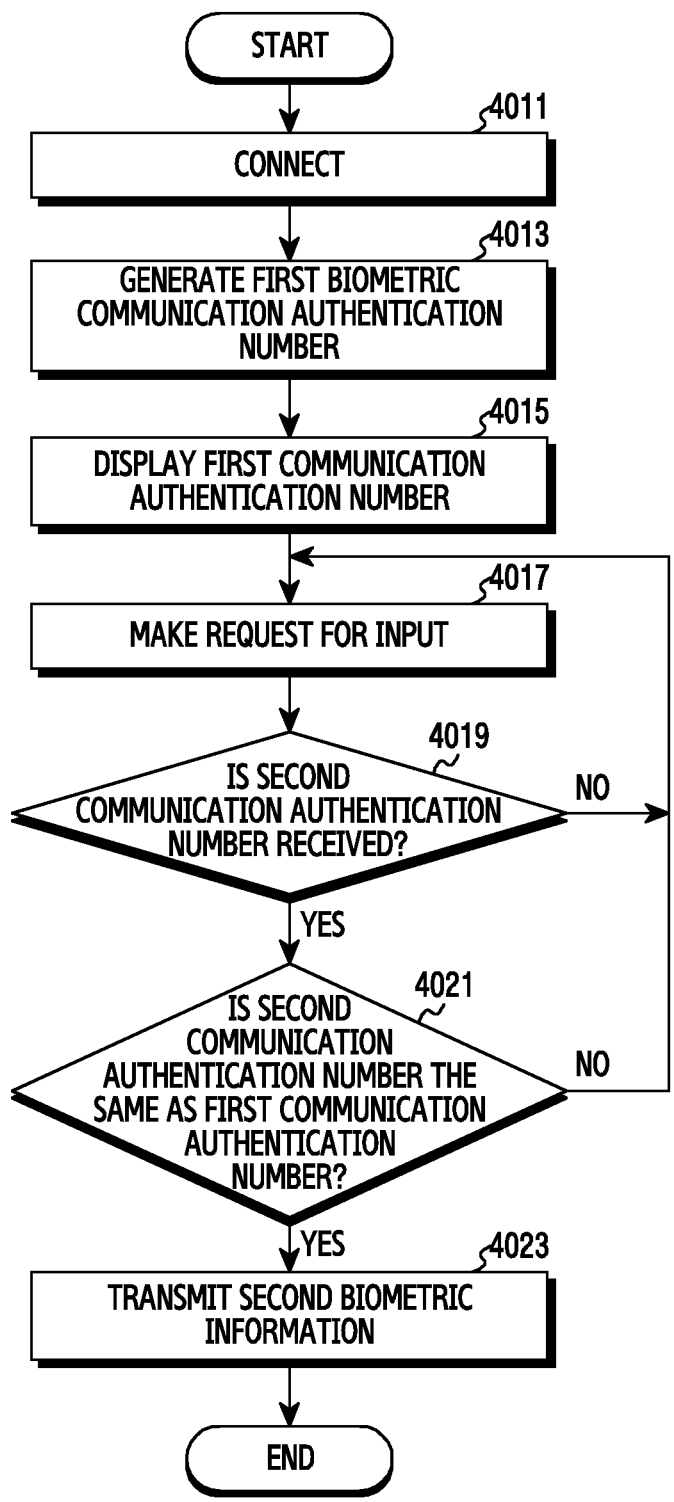
FIG. 40 is a flowchart illustrating an example method of operating the first electronic device according to an example embodiment of the present disclosure.

FIG. 40 is a flowchart illustrating an example method of operating the first electronic device according to an example embodiment of the present disclosure.

Referring to FIG. 40, the processor 2116 may perform a connection with the third electronic device 3430 in operation 4011. The processor 2116 may generate a first communication authentication number in operation 4013. The first communication authentication number may be a Personal Identification Number (PIN) code or may be a number for authenticating that a user of the first electronic device 3410 and a user of the third electronic device 3430 are the same user. The processor 2116 may display the generated first communication authentication number on the display unit 413 in operation 4015.

The processor 2116 may make a request for inputting the first communication authentication number to the third electronic device 3430 in operation 4017. When a second communication authentication number is received from the third electronic device 3430 in operation 4019, the processor 2116 may perform operation 4021. When the second communication authentication number is not received from the third electronic device 3430 in operation 4019, the processor 2116 may return to operation 4017. In operation 4021, the processor 2116 may identify whether the second communication authentication number received from the third electronic device 3430 is the same as the first communication authentication number generated in operation 4013. When the first communication authentication number is the same as the second communication authentication number based on a result of the identification in operation 4021, the processor 2116 may perform operation 4023. The processor 2116 may transmit the second biometric information generated and stored in operation 3513 of FIG. 35 to the third electronic device 3430 in operation 4023.

Figure 41:
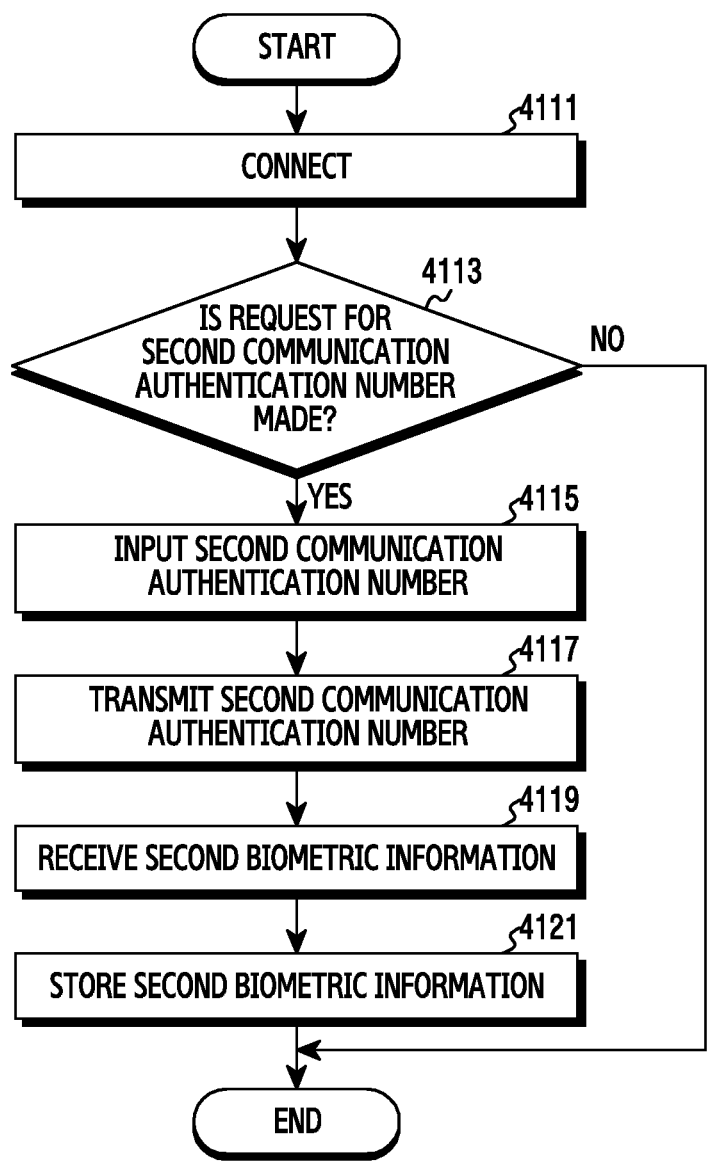
FIG. 41 is a flowchart illustrating an example method of operating the third electronic device according to an example embodiment of the present disclosure.

FIG. 41 is a flowchart illustrating an example method of operating the third electronic device according to an example embodiment of the present disclosure.

Referring to FIG. 41, the processor 3439 may perform a communication connection with the first electronic device 3410 in operation 4111. When a request for the connection is received from the first electronic device 3410, the processor 3439 may determine whether to perform the connection with the first electronic device 3410. Further, the processor 3439 may transmit a response to the request for the connection that indicates whether to perform the connection to the first electronic device 3410. Accordingly, when the response to the request for the connection is positive, the processor 3439 may complete the connection with the first electronic device 3410.

When a request for the second communication authentication number is made by the first electronic device 3410 in operation 4113, the processor 3439 may perform operation 4115. When the request for the second communication authentication number is not made by the first electronic device 3410 in operation 4113, the processor 3439 may end the process. The request for the second communication authentication number in operation 4113 may be a message that makes a request for a communication authentication number which is the same as the first communication authentication number displayed on the display unit 413 of the first electronic device 3410.

In operation 4115, the processor 3439 may input the second communication authentication number by a user's input. In operation 4117, the processor 3439 may transmit the input second communication authentication number to the first electronic device 3410. In operation 4119, the processor 3439 may receive second biometric information from the first electronic device 3410. In operation 4121, the processor 3439 may store the received second biometric information.

Figure 42:
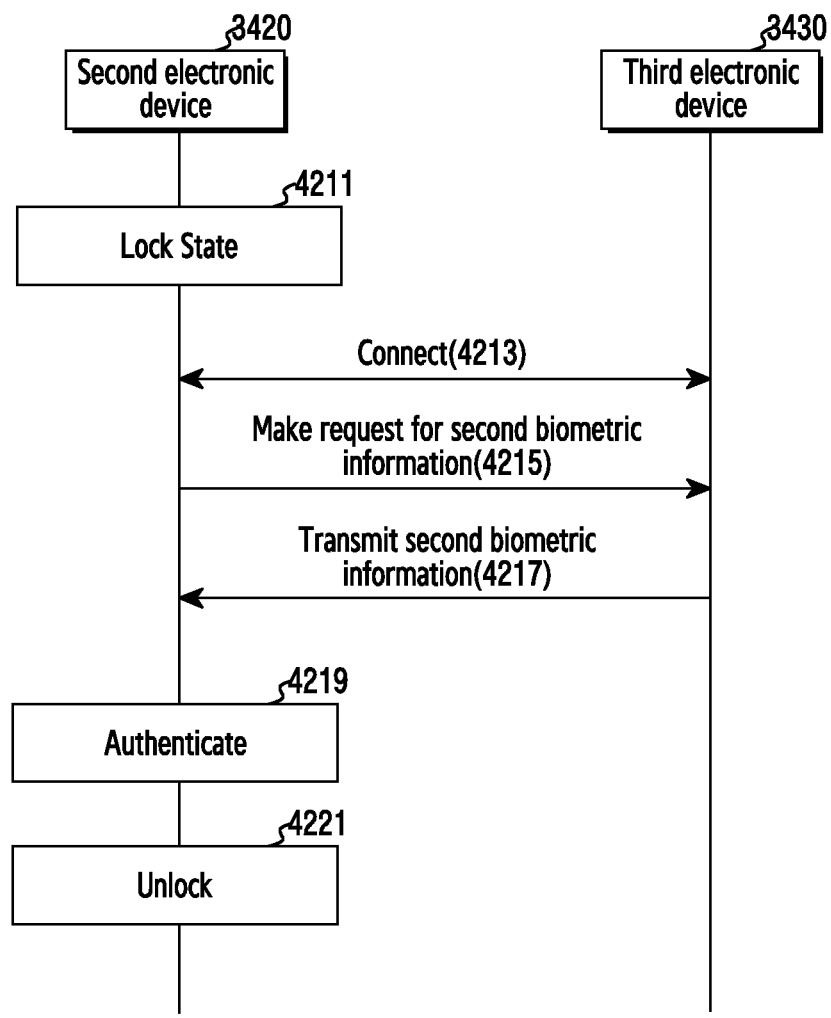
FIG. 42 is a flowchart illustrating an example method of unlocking the second electronic device according to an example embodiment of the present disclosure.

FIG. 42 is a flowchart illustrating an example method of unlocking the second electronic device according to an example embodiment of the present disclosure.

Referring to FIG. 42, the second electronic device 3420 (for example, the processor 3420) may identify that the second electronic device 3420 is in a lock state in operation 4211. According to an example embodiment, the lock state of the second electronic device 3420 may refer to a state in which power is provided to the second electronic device 3420 but there is no right to access to the second electronic device 3420 or right to execute a particular function since authentication information, for example, a password is not input. When the second electronic device 3420 (for example, the processor 2125) is in the lock state, an input notification screen may be displayed on the display unit 2123 of the second electronic device 3420.

In operation 4213, the second electronic device 3420 and the third electronic device 3430 may perform a connection to each other. For example, the second electronic device 3420 (for example, the processor 2125) may perform the connection with the third electronic device 3430 through a short-range communication scheme. To this end, the second electronic device 3420 may store third identification information of the third electronic device 3430. Further, the second electronic device 3420 (for example, the processor 2125) may perform the connection with the third electronic device 3430 based on a user's selection. The second electronic device 3420 (for example, the processor 2125) may identify that the third electronic device 3430 approaches within a threshold radius based on a communication scheme such as Bluetooth Low Energy (BLE). When the third electronic device 3430 approaches within the threshold radius, the second electronic device 3420 (for example, the processor 2125) may perform the connection with the third electronic device 3430.

The second electronic device 3420 (for example, the processor 2125) may transfer a request for receiving the second biometric information to the third electronic device 3430 in operation 4215. When the request for the second biometric information is received from the second electronic device 3420 in operation 4215, the third electronic device 3420 (for example, the processor 3439) may transmit the second biometric information to the second electronic device 3439 in operation 4217.

The second electronic device 3420 (for example, the processor 2125) may perform an authentication based on the second biometric information received from the third electronic device 3430 in operation 4219. When the second biometric information received from the third electronic device 3430 is the same as the second biometric information registered in operation 3521 of FIG. 35, the second electronic device 3420 (for example, the processor 2125) may succeed in the authentication using the second biometric information. When the second electronic device 3420 (for example, the processor 2125) succeeds in the authentication using the second biometric information, the lock state of the second electronic device 3420 may be released in operation 4221. The second electronic device 3420 (for example, the processor 2125) may release the lock state and provide a right to access the second electronic device 3420 and a right to execute a particular function to the user.

Figure 43:
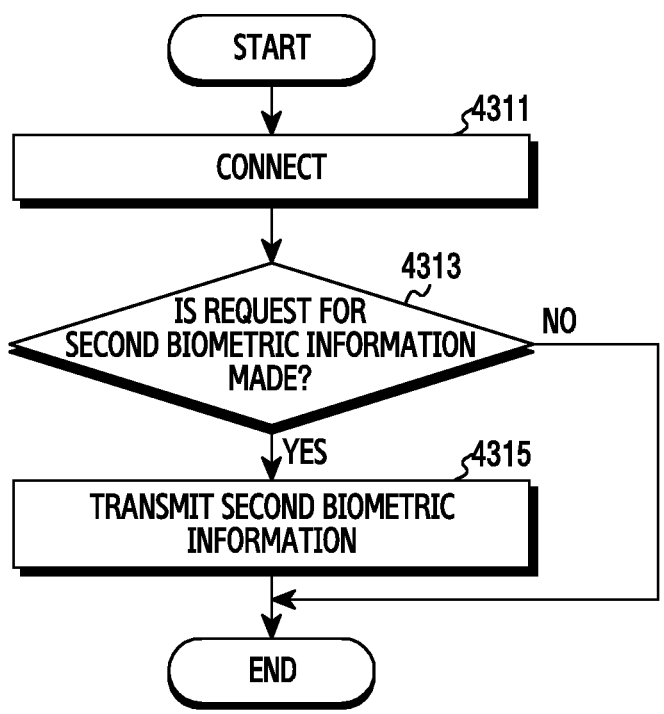
FIG. 43 is a flowchart illustrating an example method of operating the third electronic device according to an example embodiment of the present disclosure.

FIG. 43 is a flowchart illustrating an example method of operating the third electronic device according to an example embodiment of the present disclosure.

Referring to FIG. 43, the processor 3439 may perform a connection with the second electronic device 3420 in operation 4311. When a request for second biometric information is made by the second electronic device 3420 in operation 4313, the processor 3439 may perform operation 4315. When the request the second biometric information is not made by the second electronic device 3420 in operation 4313, the processor 3439 may end the process. In operation 4315, the processor 3439 may transmit the second biometric information stored in operation 3523 of FIG. 35 to the second electronic device 3420.

The method of operating the second electronic device 3420 illustrated in FIG. 42 is the same as the operation of the second electronic device 2120 illustrated in FIG. 31. Accordingly, a flowchart illustrating the method of operating the second electronic device 3420 may be replaced with FIG. 31.

According to an example embodiment, a storage medium storing instructions according to the present disclosure is provided. The instructions may be configured to, when executed by at least one processor, cause the processor to perform at least one operation. The at least one operation may include an operation of acquiring biometric information corresponding to the user of the electronic device (for example, the first electronic device 2110 or 3410) an operation of generating virtual biometric information at least based on the biometric information, and an operation of providing the virtual biometric information to the external device (for example, the second electronic device 2120 or 3420) to allow the external device (for example, the second electronic device 2120 or 3420) to register the virtual biometric information as information for authenticating the user. The operation of acquiring the biometric information may be an operation of acquiring information related to a user's fingerprint.

According to an example embodiment, an operation method according to the electronic device (for example, the third electronic device 3430) of the present disclosure may include an operation of communicating with the first external device (for example, the first electronic device 2110 or 3410) and the second external device (for example, the second electronic device 2120 or 3420), an operation of receiving virtual biometric information generated based on biometric information corresponding to the first external device (for example, the first electronic device 2110 or 3410) and the user of the electronic device (for example, the third electronic device 3430) from the first external device (for example, the first electronic device 2110 or 3410), an operation of storing the virtual biometric information, and an operation of transferring the stored virtual biometric information to the second external device (for example, the second electronic device 2120 or 2320).

Figure 44:
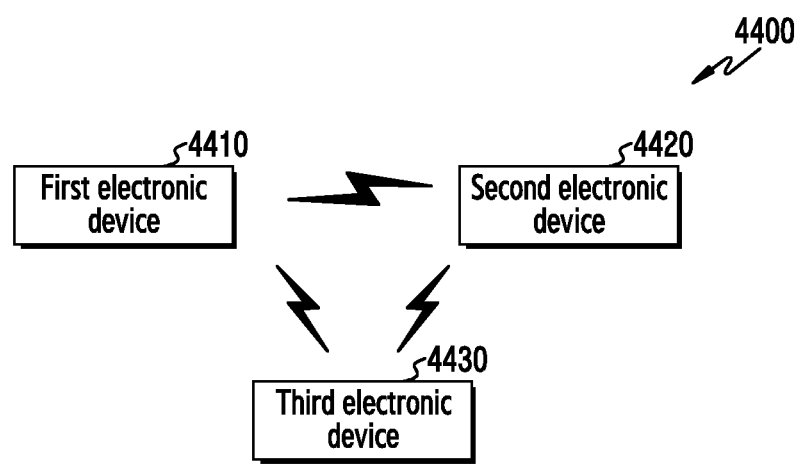
FIG. 44 is a block diagram illustrating an example communication system according to various example embodiments.

FIG. 44 is a block diagram illustrating an example communication system 4400 according to an example embodiment of the present disclosure.

Referring to FIG. 44, a communication system 4400 according to the present disclosure may include a first electronic device 4410, a second electronic device 4420, and a third electronic device 4430. The first electronic device 4410, the second electronic device 4420, and the third electronic device 4430 may be different types of electronic device or may be the same type of electronic device. The first electronic device 4410, the second electronic device 4420, or the third electronic device 4430 may access each other and communicate with each other. Since the first electronic device 4410 and the second electronic device 4420 are the same as the first electronic device 2110 and the second electronic device 2120 of FIG. 21, respectively, a detailed description thereof will be omitted.

The third electronic device 4430 may be driven at a predetermined position. For example, the third electronic device 4430 may be driven while being electrically connected to the second electronic device 4420. The third electronic device 4430 may be driven while being electrically connected to the second electronic device 4420. The third electronic device 4430 may be driven while being attached to the second electronic device 4420. For example, the third electronic device 4430 may include at least one of a dock state for tablet or a wearable device. The third electronic device 4430 may store identification information of the third electronic device 4430, that is, third identification information. Further, the third electronic device 4430 may store execution information. For example, the execution information may include identification data indicating a particular function. Third electronic device 4430 may broadcast the execution information periodically. The third electronic device 4430 may detect an approach of the first electronic device 4410 and transmit the execution.

An electronic device according to various embodiments includes: a touch screen; a communication interface comprising communication circuitry; and a processor functionally connected to the communication interface, wherein the processor is configured to receive execution information to be used for authenticating at least one resource of a second external device from a first external device through the communication circuitry of the communication interface, to display a user interface for acquiring biometric information of a user through the touch screen in response to receiving the execution information, to generate virtual biometric information based on the acquired biometric information, and to transmit the virtual biometric information to the second external device through the communication circuitry of the communication interface wherein the virtual biometric information is usable for authenticating the at least one resource.

According to various example embodiments, the processor may be configured to authenticate the user based on the biometric information, and to generate the virtual biometric information based on a result of the authentication.

According to various example embodiments, the processor may be configured to receive an application identifier corresponding to the user interface as at least some of the execution information.

According to various example embodiments, the at least one resource may include an application to be executed in the second external device, and the processor may be configured to receive an application identifier corresponding to the application as at least some of the execution information.

According to various example embodiments, the processor may be configured to associate the application identifier with the virtual biometric information, and transmit to the second external device.

According to various example embodiments, the communication interface may include a first communication interface which can support first short-range communication and a second communication interface which can support second short-range communication, and the processor may be configured to receive the execution information through the first communication interface and to transmit the virtual biometric information through the second interface.

According to various example embodiments, the first communication interface or the second communication interface may include a near-field communication interface.

According to various example embodiments, the first communication interface or the second communication interface may include a wired interface, for example, a USB.

According to various example embodiments, the processor may be configured to identify a state of the second external device through the communication interface and, when an authentication of at least one resource of the second external device is required, to transmit the virtual biometric information to the second external device.

According to various example embodiments, the second external electronic device may include a plurality of external electronic devices, and the processor may be configured to transmit the virtual biometric information to the plurality of external electronic devices through a broadcasting or a multicasting scheme as at least a part of an operation of transmitting the virtual biometric information.

An accessory device according to various example embodiments may include a communication interface for communicating with an external electronic device and a memory for storing an application identifier corresponding to a user interface for acquiring biometric information of a user to be executed in the external electronic device, and the communication interface may be configured to transmit the application identifier to the external electronic device.

According to various example embodiments, when an approach of the external electronic device is detected, the communication interface may be configured to provide the application identifier to the external electronic device.

According to various example embodiments, the communication interface may include a first communication interface supporting wireless communication and a second communication interface supporting wired communication, and the first communication interface may be connected to the external electronic device and the second communication interface may be connected to another external electronic device.

According to an example embodiment, a storage medium storing instructions according to the present disclosure is provided. The instructions may be configured to, when executed by at least one processor, cause the processor to perform at least one operation. The at least one operation may include an operation method according to an electronic device (for example, the third electronic device 3430), wherein the electronic device may communicate with a first external device (for example, the first electronic device 2110 or 3410) and a second external device (for example, the second electronic device 2120 or 3420), receive virtual biometric information generated based on biometric information corresponding to the first external device (for example, the first electronic device 2110 or 3410) and the user of the electronic device (for example, the third electronic device 3430) from the first external device (for example, the first electronic device 2110 or 3410), store the virtual biometric information, and transfer the stored virtual biometric information to the second external device (for example, the second electronic device 2120 or 3420).

Figure 45:
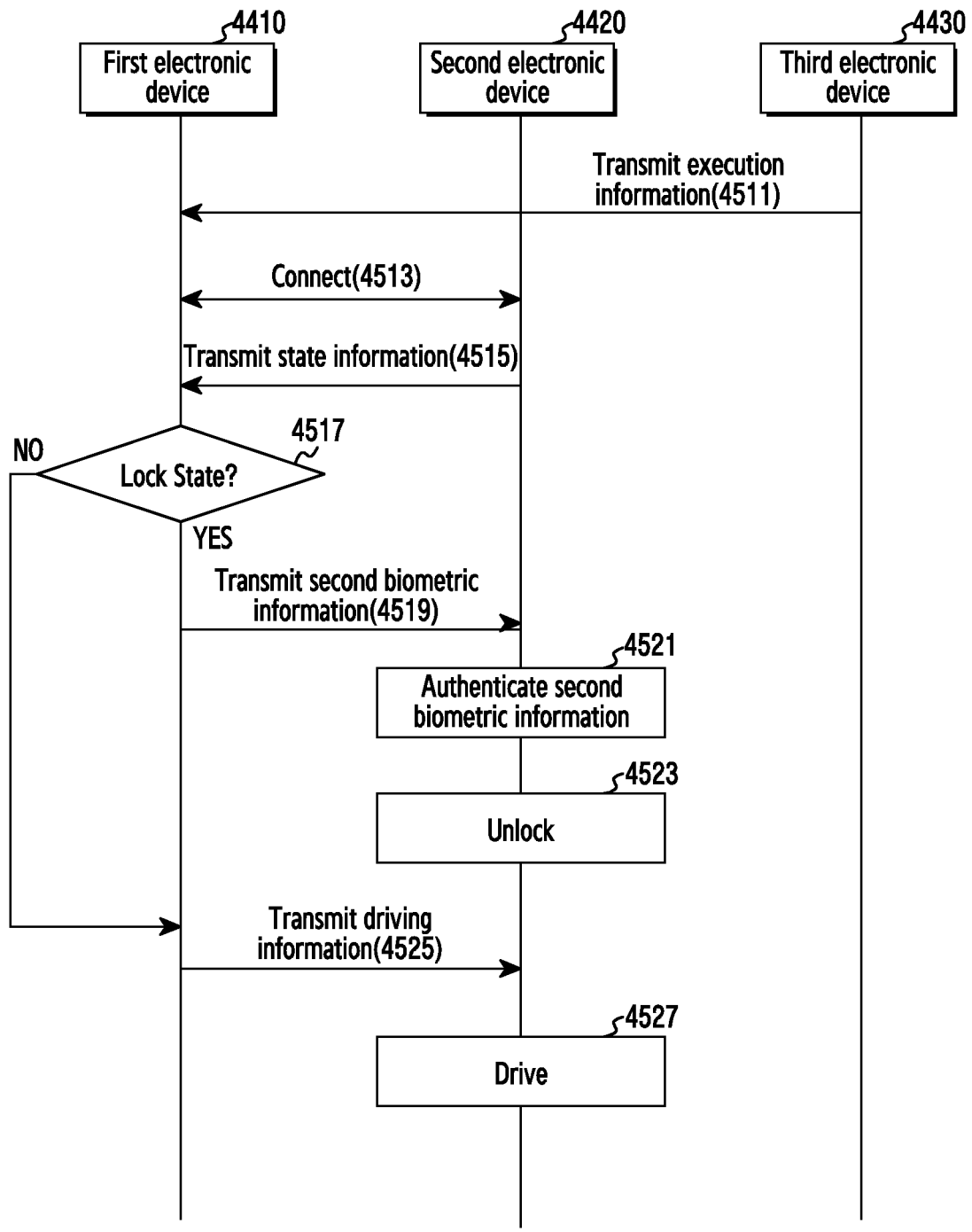
FIG. 45 is a flowchart illustrating an example method of authenticating biometric information in the communication system according to various example embodiments.

FIG. 45 is a flowchart illustrating an example method of authenticating biometric information in a communication system 4400 according to various example embodiments.

Referring to FIG. 45, the first electronic device 4410 may receive execution information of the third electronic device 4430 in operation 4511. The first electronic device 4410 may receive execution information of the third electronic device 4430 while performing a particular function. The first electronic device 4410 may receive the execution information of the third electronic device 4430 even though the particular function is not performed. For example, in a state where the first electronic device 4410 is unlocked, the first electronic device 4410 may receive the execution information of the third electronic device 4430. To this end, the third electronic device 4430 may periodically broadcast the execution information. When the approach of the first electronic device 4410 is detected, the third electronic device 4430 may transmit the execution information. For example, the execution information may include identification data indicating a particular function.

According to various example embodiments, the first electronic device 4410 may perform a connection with the second electronic device 4420 in operation 4513. The first electronic device 4410 may execute a particular function based on the execution information. For example, the first electronic device 4410 may execute a corresponding function in accordance with identification data of the execution information. Meanwhile, the first electronic device 4410 may perform the connection with the second electronic device 4420 through a short-range communication scheme. To this end, the first electronic device 4410 may store second identification information of the second electronic device 4420, and the second electronic device 4420 may store first identification information of the first electronic device 4410. Further, the first electronic device 4410 may perform the connection with the second electronic device 4420 based on a user's selection.

According to various example embodiments, the first electronic device 4410 may receive state information of the second electronic device 4420 in operation 4515. That is, when a communication connection with the first electronic device 4410 is made, the second electronic device 4420 may transmit the state information to the first electronic device 4410. For example, the state information may indicate whether the second electronic device 4420 is locked. The first electronic device 4410 may determine whether the second electronic device 4420 is in a lock state based on the state information of the second electronic device 4420 in operation 4517.

According to various example embodiments, when it is determined that the second electronic device 4420 is in the lock state in operation 4517, the first electronic device 4410 may transmit second biometric information to the second electronic device 4420 in operation 4519. For example, the first electronic device 4410 may generate the second biometric information based on pre-stored first biometric information. The second electronic device 4410 may generate the second biometric information by acquiring the first biometric information of the user. Accordingly, the first electronic device 4410 may transmit the second biometric information to the second electronic device 4420. Alternatively, the first electronic device 4410 may transmit pre-stored second biometric information to the second electronic device 4420.

According to various example embodiments, when the second biometric information is received from the first electronic device 4410 in operation 4519, the second electronic device 4420 may authenticate the second biometric information in operation 4521. For example, the second electronic device 4420 may compare the second biometric information with the pre-stored second biometric information. When the second biometric information is the same as the pre-stored second biometric information, the second electronic device 4420 may determine that the authentication of the second biometric information is successful. When the second biometric information is different from the pre-stored second biometric information, the second electronic device 4420 may determine that the authentication of the second biometric information has failed. Accordingly, the second electronic device 4420 may release the lock in operation 4523. For example, when the authentication of the second biometric information is successful, the second electronic device 4420 may be unlocked.

According to various example embodiments, the first electronic device 4410 may transmit driving information in operation 4525. For example, the driving information may include identification data of a function being executed in the first electronic device 4410. When the driving information is received in operation 4525, the first electronic device 4410 may execute a particular function based on the driving information in operation 4527. For example, the second electronic device 4420 may execute a corresponding function in accordance with the identification data of the driving information.

According to various example embodiments, when it is determined that the second electronic device 4420 is unlocked in operation 4517, the first electronic device 4410 may transmit the driving information in operation 4525. For example, the driving information may include identification data of a function being executed in the first electronic device 4410. When the driving information is received in operation 4525, the first electronic device 4410 may execute a particular function based on the driving information in operation 4527. For example, the second electronic device 4420 may execute a corresponding function in accordance with the identification data of the driving information.

Figure 46:
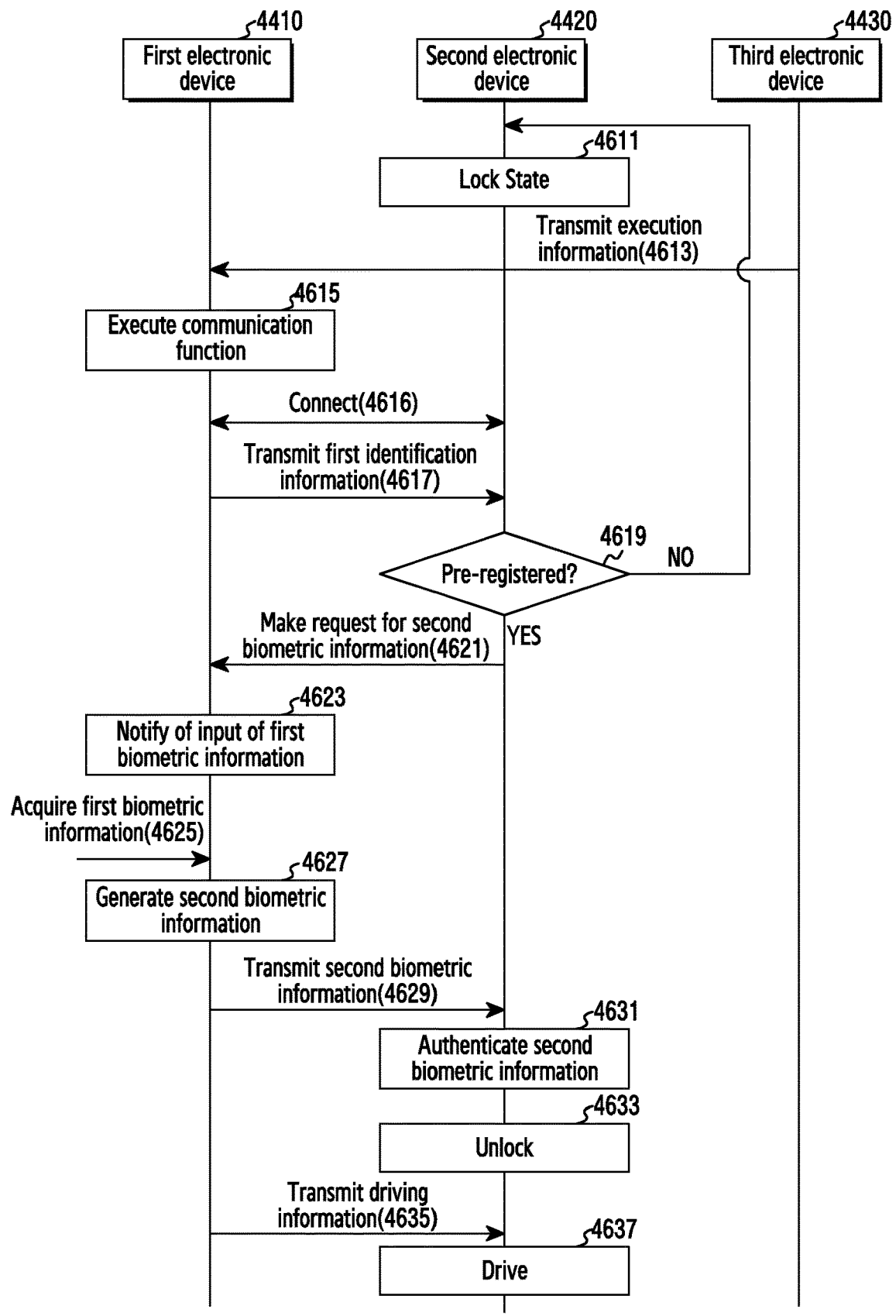
FIG. 46 is a flowchart illustrating an example method of authenticating biometric information in the communication system according to an example embodiment.

FIG. 46 is a flowchart illustrating an example method of authentication biometric information in the communication system 4400 according to an example embodiment.

Referring to FIG. 46, the second electronic device 4420 may be in a lock state in operation 4611. The third electronic device 4430 may transmit execution information in operation 4613. For example, the third electronic device 4430 may periodically broadcast the execution information. Alternatively, when the approach of the first electronic device 4410 is detected, the third electronic device 4430 may transmit the execution information. For example, the execution information may include identification data indicating a particular function.

According to an example embodiment, when the execution information is received from the third electronic device 4430 in operation 4613, the first electronic device 4410 may execute a communication function in operation 4615. The first electronic device 4410 may execute the communication function in accordance with the execution information. The first electronic device 4410 may perform a connection with the second electronic device 4420 in operation 4616. For example, the first electronic device 4410 may perform the connection with the second electronic device 4420 through a short-range communication scheme. To this end, the first electronic device 4410 may store second identification information of the second electronic device 4420, and the second electronic device 4420 may store first identification information of the first electronic device 4410. The first electronic device 4410 may transmit the first identification information to the second electronic device 4420 in operation 4617. The first electronic device 4410 may encrypt the first identification information transmit the encrypted first identification information to the second electronic device 4420.

According to an example embodiment, when the first identification information is received in operation 4617, the second electronic device 4420 may determine whether the first identification information has been pre-registered in operation 4619. For example, the second electronic device 4420 may determine whether a right to access the second electronic device 4420 is set in accordance with the first identification information. For example, the second electronic device 4420 may determine whether a right to unlock the second electronic device 4420 is set in accordance with the first electronic device 4410. When the first identification information has not been pre-registered in operation 4619, the second electronic device 4420 may return to operation 4611. When the first identification information has been pre-registered in operation 4619, the second electronic device 4420 may make a request for the second biometric information to the first electronic device 4410 in operation 4621. The second electronic device 4420 may transmit state information to the first electronic device 4410. For example, the state information may indicate that the second electronic device 4420 is in a lock state.

According to an example embodiment, when a request for the second biometric information is made by the second electronic device 4420 in operation 4621, the first electronic device 4410 may notify of an input of the first biometric information to the user in operation 4623. The first electronic device 4410 may acquire the first biometric information of the user in operation 4625. The first electronic device 4410 may generate the second biometric information based on the first biometric information in operation 4627. The first electronic device 4410 may encrypt the first biometric information to generate the second biometric information. The first electronic device 4410 may transmit the second biometric information to the second electronic device 4420 in operation 4629.

According to an example embodiment, when the second biometric information is received from the first electronic device 4410 in operation 4629, the second electronic device 4420 may authenticate the second biometric information in operation 4631. Accordingly, the second electronic device 4420 may release the lock in operation 4633. For example, when the authentication of the second biometric information is successful, the second electronic device 4420 may be unlocked.

According to an example embodiment, the first electronic device 4410 may transmit driving information to the second electronic device 4420 in operation 4635. For example, the driving information may include identification data of a function being executed in the first electronic device 4410. When the driving information is received in operation 4637, the first electronic device 4410 may execute a particular function based on the driving information in operation 4639. For example, the second electronic device 4420 may execute a corresponding function in accordance with the identification data of the driving information.

Figure 47:
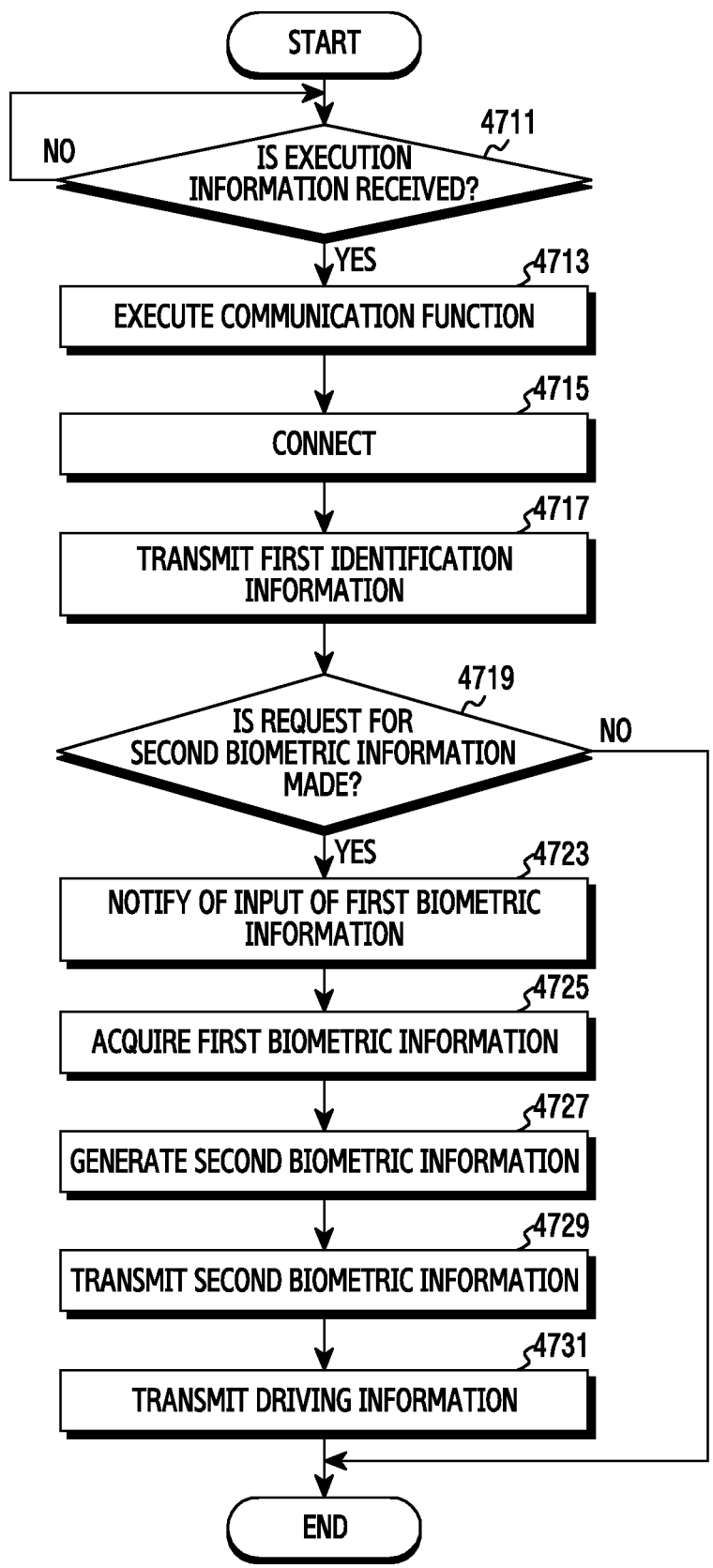
FIG. 47 is a flowchart illustrating an example method of operating the first electronic device according to an example embodiment.

FIG. 47 is a flowchart illustrating an example method of operating the first electronic device 4410 according to an example embodiment.

Referring to FIG. 47, the processor 2116 may receive execution information in operation 4711. For example, when the execution information is received from the third electronic device 4430, the processor 2116 may detect the execution information. The processor 2116 may receive the execution information of the third electronic device 4430 while performing a particular function. The processor 2116 may receive the execution information of the third electronic device 4430 even though the particular function is not performed. For example, in a state where the first electronic device 4410 is unlocked, the processor 2116 may receive the execution information of the third electronic device 4430. To this end, the third electronic device 4430 may periodically broadcast the execution information. When the approach of the first electronic device 4410 is detected, the third electronic device 4430 may transmit the execution information. For example, the execution information may include identification data indicating a particular function.

The processor 2116 may execute a communication function in accordance with the execution information in operation 4713. To this end, the processor 2116 may activate the communication unit 2111. For example, the processor 2116 may activate a short-range communication scheme in the communication unit 2111.

The processor 2116 may perform a connection with the second electronic device 4420 in operation 4715. For example, the processor 2116 may perform the connection with the second electronic device 4420 through a short-range communication scheme. To this end, second identification information of the second electronic device 4420 may be stored in the memory 4415. The processor 2116 may transmit first identification information to the second electronic device 4420 in operation 4717. The processor 2116 may encrypt the first identification information and transmit the encrypted first identification information to the second electronic device 4420.

When a request for the second biometric information is made by the second electronic device 4420, the processor 2116 may detect the request in operation 4719. The processor 2116 may receive state information of the second electronic device 4420. For example, the state information may indicate that the second electronic device 4420 is in a lock state.

The processor 2116 may notify an input of the first biometric information to the user in operation 4723. The processor 2116 may notify of the input of the first biometric information to the user through display data or audio data.

For example, the processor 2116 may output a notification message for inputting the first biometric information through the display unit 413.

The processor 2116 may acquire the first biometric information of the user in operation 4725. To this end, the processor 2116 may temporarily turn on a biometric sensor of the sensor unit 448. For example, the biometric sensor may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. Further, the processor 2116 may acquire the first biometric information through the biometric sensor. According to an example embodiment, the processor 2116 may scan a user's fingerprint to generate a fingerprint image. The processor 2116 may extract at least one feature point from the fingerprint image. Accordingly, the processor 2116 may acquire the fingerprint image or at least one feature point of the fingerprint image as the first biometric information.

The processor 2116 may generate second biometric information based on the first biometric information in operation 4727. For example, the processor 2116 may compare the first biometric information with pre-stored first biometric information. When the first biometric information is the same as the pre-stored first biometric information, the processor 2116 may generate second biometric information. The first electronic device 4410 may encrypt the first biometric information to generate the second biometric information. For example, the first electronic device 4410 may encrypt the fingerprint image or at least one feature point of the fingerprint image. The processor 2116 may transmit the second biometric information to the second electronic device 4420 in operation 4729.

The processor 2116 may transmit driving information to the second electronic device 4420 in operation 4731. For example, the driving information may include identification data of a function being executed in the first electronic device 4410.

Figure 48:
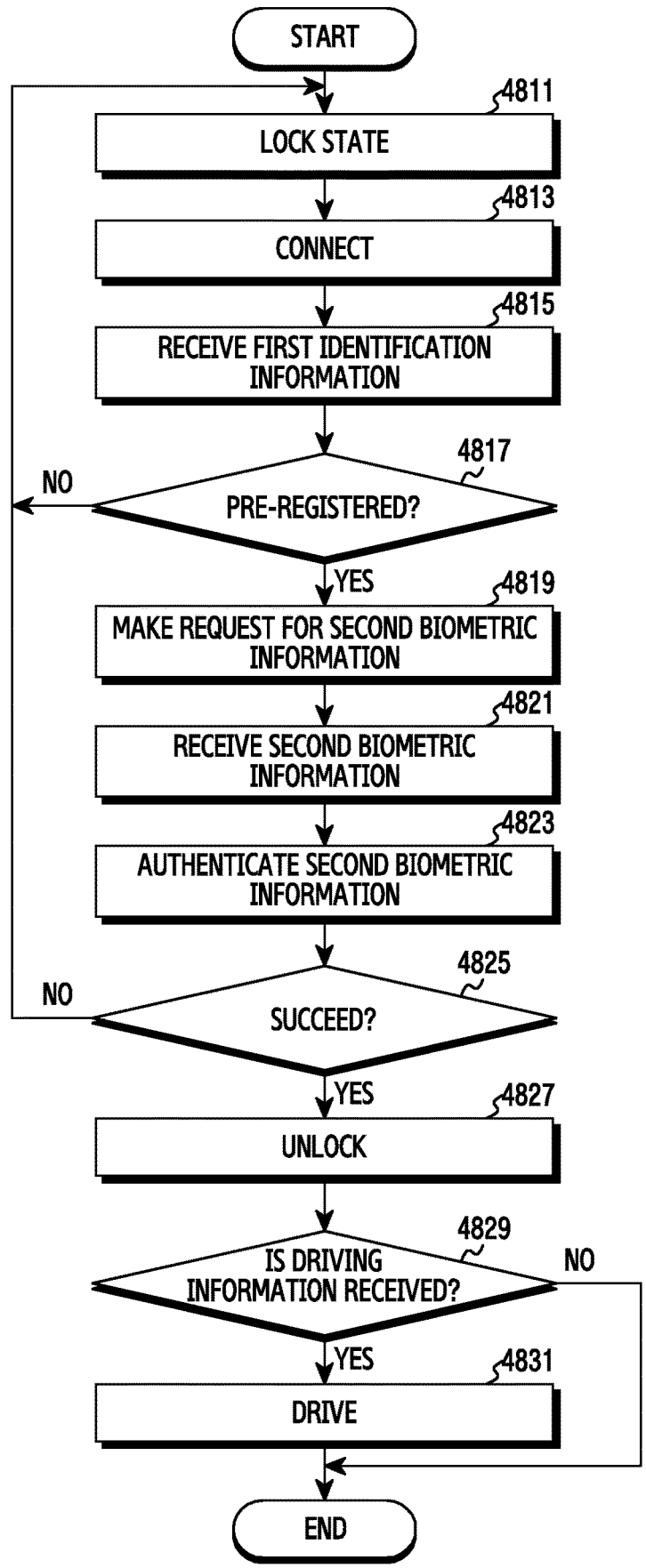
FIG. 48 is a flowchart illustrating an example method of operating the second electronic device according to an example embodiment.

FIG. 48 is a flowchart illustrating an example method of operating the second electronic device 4420 according to an example embodiment.

Referring to FIG. 48, the second electronic device 4420 may be in a lock state in operation 4811. The processor 2125 may perform a connection with the first electronic device 4410 in operation 4813. For example, the processor 2125 may perform the connection with the first electronic device 4410 through a short-range communication scheme. When a request for the connection is received from the first electronic device 4410, the processor 2125 may determine whether to perform the connection with the first electronic device 4410. Further, the processor 2125 may transmit a response to the request for the connection that indicates whether to perform the connection to the first electronic device 4410. Accordingly, when the response to the request for the connection is positive, the processor 2125 may complete the connection with the first electronic device 4410.

The processor 2125 may receive first identification information from the first electronic device 4410 in operation 4815. For example, the first identification information may be encrypted by the first electronic device 4410, and the processor 2125 may decrypt the first identification information. The processor 2125 may determine whether the first identification information has been pre-registered in operation 4817. For example, the processor 2125 may determine whether a right to access the second electronic device 4420 is set in accordance with the first identification information.

For example, the processor 2125 may determine whether a right to unlock the processor 2125 is set in accordance with the first electronic device 4410.

When the first identification information has been pre-registered in operation 4817, the processor 2125 may make a request for second biometric information to the first electronic device 4410 in operation 4819. The processor 2125 may transmit state information to the first electronic device 4410. For example, the state information may indicate that the second electronic device 4420 is in a lock state. The processor 2125 may receive the second biometric information from the first electronic device 4410 in operation 4821.

The processor 2125 may authenticate the second biometric information in operation 4823. For example, the processor 2125 may compare the second biometric information with the pre-stored second biometric information. The processor 2125 may determine whether the authentication of the second biometric information is successful in operation 4825. To this end, the processor 2125 may determine whether the second biometric information is the same as the pre-stored second biometric information. When the second biometric information is the same as the pre-stored second biometric information, the processor 2125 may determine that the authentication of the second biometric information has been successful. When the second biometric information is different from the pre-stored second biometric information, the processor 2125 may determine that the authentication of the second biometric information has failed. When it is determined that the authentication of the second biometric information is successful in operation 4825, the processor 2125 may unlock the second electronic device 4420 in operation 4827.

When driving information is received from the first electronic device 4410, the processor 2125 may detect the driving information in operation 4829. For example, the driving information may include identification data of a function being executed in the first electronic device 4410. The processor 2125 may execute a particular function based on the driving information in operation 4831. For example, the processor 2125 may execute a corresponding function in accordance with identification data of the driving information.

Meanwhile, when it is determined that the first identification information has not been pre-registered in operation 4817, the processor 2125 may return to operation 4811. Meanwhile, when it is determined that the authentication of the second biometric information has failed in operation 4825, the processor 2125 may return to operation 4811. Further, the processor 2125 may repeatedly perform at least some of operations 4811 to 4831.

Figure 49:
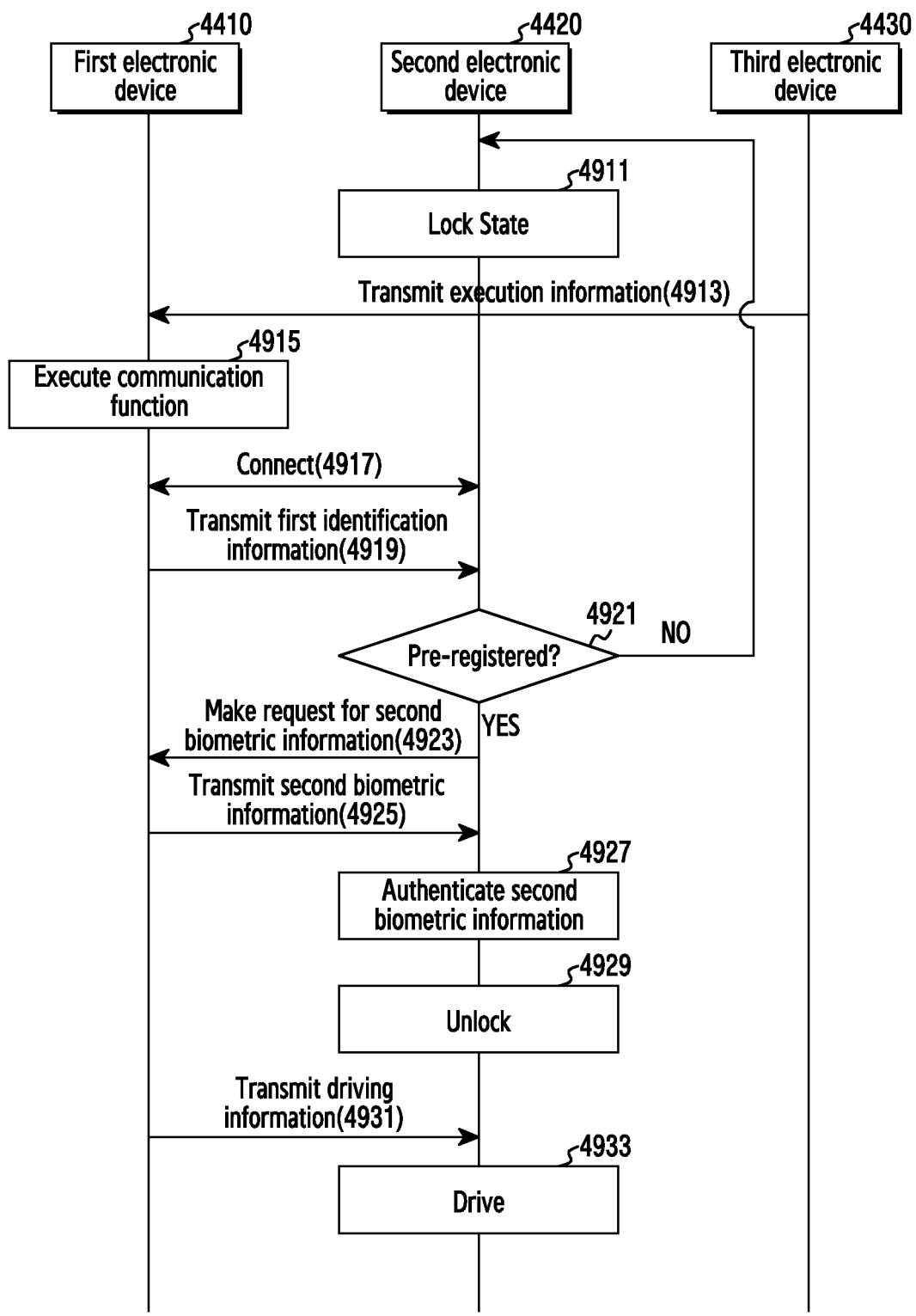
FIG. 49 is a flowchart illustrating an example method of authenticating biometric information in the communication system according to another example embodiment.

FIG. 49 is a flowchart illustrating an example method of authenticating biometric information in the communication system according to another example embodiment.

Referring to FIG. 49, the second electronic device 4420 may be in a lock state in operation 4911. The third electronic device 4430 may transmit execution information in operation 4913. For example, the third electronic device 4430 may periodically broadcast the execution information. Alternatively, when the approach of the first electronic device 4410 is detected, the third electronic device 4430 may transmit the execution information. For example, the execution information may include identification data indicating a particular function.

According to another example embodiment, when the execution information is received from the third electronic device 4430 in operation 4913, the first electronic device

4410 may execute a communication function in operation 4915. The first electronic device 4410 may execute the communication function in accordance with the execution information. The first electronic device 4410 may perform a connection with the second electronic device 4420 in operation 4917. For example, the first electronic device 4410 may perform the connection with the second electronic device 4420 through a short-range communication scheme. To this end, the first electronic device 4410 may store second identification information of the second electronic device 4420, and the second electronic device 4420 may store first identification information of the first electronic device 4410. The first electronic device 4410 may transmit the first identification information to the second electronic device 4420 in operation 4919. The first electronic device 4410 may encrypt the first identification information and transmit the encrypted first identification information to the second electronic device 4420.

According to another example embodiment, when the first identification information is received in operation 4919, the second electronic device 4420 may determine whether the first identification information has been pre-registered in operation 4921. For example, the second electronic device 4420 may determine whether a right to access the second electronic device 4420 is set in accordance with the first identification information. For example, the second electronic device 4420 may determine whether a right to unlock the second electronic device 4420 is set in accordance with the first electronic device 4410. When the first identification information has not been pre-registered in operation 4921, the second electronic device 4420 may return to operation 4911. When the first identification information has been pre-registered in operation 4921, the second electronic device 4420 may make a request for the second biometric information to the first electronic device 4410 in operation 4923. The second electronic device 4420 may transmit state information to the first electronic device 4410. For example, the state information may indicate that the second electronic device 4420 is in a lock state.

According to another example embodiment, when a request for the second biometric information is made by the second electronic device 4420 in operation 4923, the first electronic device 4410 may transmit the second biometric information to the second electronic device 4420 in operation 4925. The first electronic device 4410 may transmit pre-stored second biometric information.

According to another example embodiment, when the second biometric information is received from the first electronic device 4410 in operation 4925, the second electronic device 4420 may authenticate the second biometric information in operation 4927. Accordingly, the second electronic device 4420 may release the lock in operation 4929. For example, when the authentication of the second biometric information is successful, the second electronic device 4420 may be unlocked.

According to another example embodiment, the first electronic device 4410 may transmit driving information to the second electronic device 4420 in operation 4931. For example, the driving information may include identification data of a function being executed in the first electronic device 4410. When the driving information is received in operation 4931, the first electronic device 4410 may execute a particular function based on the driving information in operation 4933. For example, the second electronic device 4420 may execute a corresponding function in accordance with the identification data of the driving information.

Figure 50:
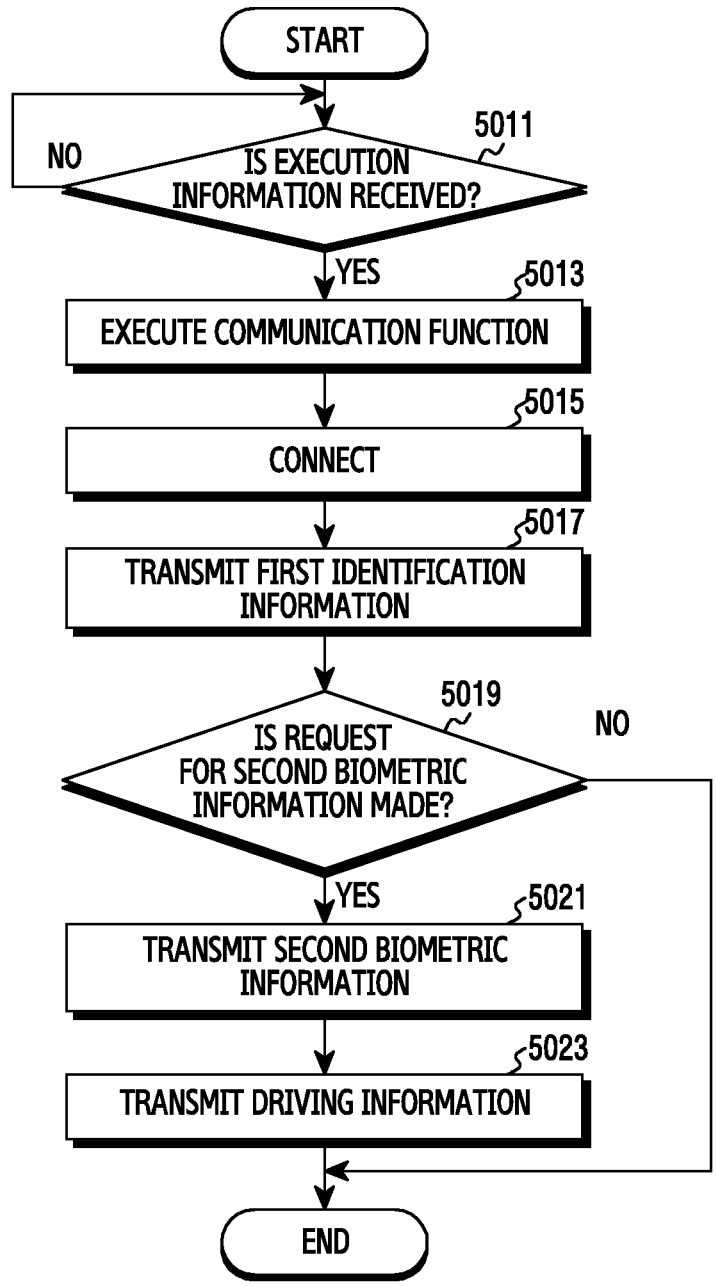
FIG. 50 is a flowchart illustrating an example method of operating the first electronic device according to another example embodiment.

FIG. 50 is a flowchart illustrating an example method of operating the first electronic device according to another example embodiment.

Referring to FIG. 50, the processor 2116 may receive execution information in operation 5011. For example, when the execution information is received from the third electronic device 4430, the processor 2116 may detect the execution information. The processor 2116 may receive the execution information of the third electronic device 4430 while performing a particular function. The processor 2116 may receive the execution information of the third electronic device 4430 even though the particular function is not performed. For example, in a state where the first electronic device 4410 is unlocked, the processor 2116 may receive the execution information of the third electronic device 4430. To this end, the third electronic device 4430 may periodically broadcast the execution information. Alternatively, when the approach of the first electronic device 4410 is detected, the third electronic device 4430 may transmit the execution information. For example, the execution information may include identification data indicating a particular function.

The processor 2116 may execute a communication function in accordance with the execution information in operation 5013. To this end, the processor 2116 may activate the communication unit 2111. For example, the processor 2116 may activate a short-range communication scheme in the communication unit 2111.

The processor 2116 may perform a connection with the second electronic device 4420 in operation 5015. For example, the processor 2116 may perform the connection with the second electronic device 4420 through a short-range communication scheme. To this end, second identification information of the second electronic device 4420 may be stored in the memory 4415. The processor 2116 may transmit first identification information to the second electronic device 4420 in operation 5017. The processor 2116 may encrypt the first identification information and transmit the encrypted first identification information to the second electronic device 4420.

When a request for the second biometric information is made by the second electronic device 4420, the processor 2116 may detect the request in operation 5019. At this time, the processor 2116 may receive state information of the second electronic device 4420. For example, the state information may indicate that the second electronic device 4420 is in a lock state.

The processor 2116 may transmit the second biometric information to the second electronic device 4420 in operation 5021. At this time, the processor 2116 may transmit pre-stored second biometric information.

The processor 2116 may transmit driving information to the second electronic device 4420 in operation 5023. For example, the driving information may include identification data of a function being executed in the first electronic device 4410.

According to another example embodiment, since the method of operating the second electronic device 4420 is similar to FIG. 48, a detailed description thereof will be omitted.

Figure 51:
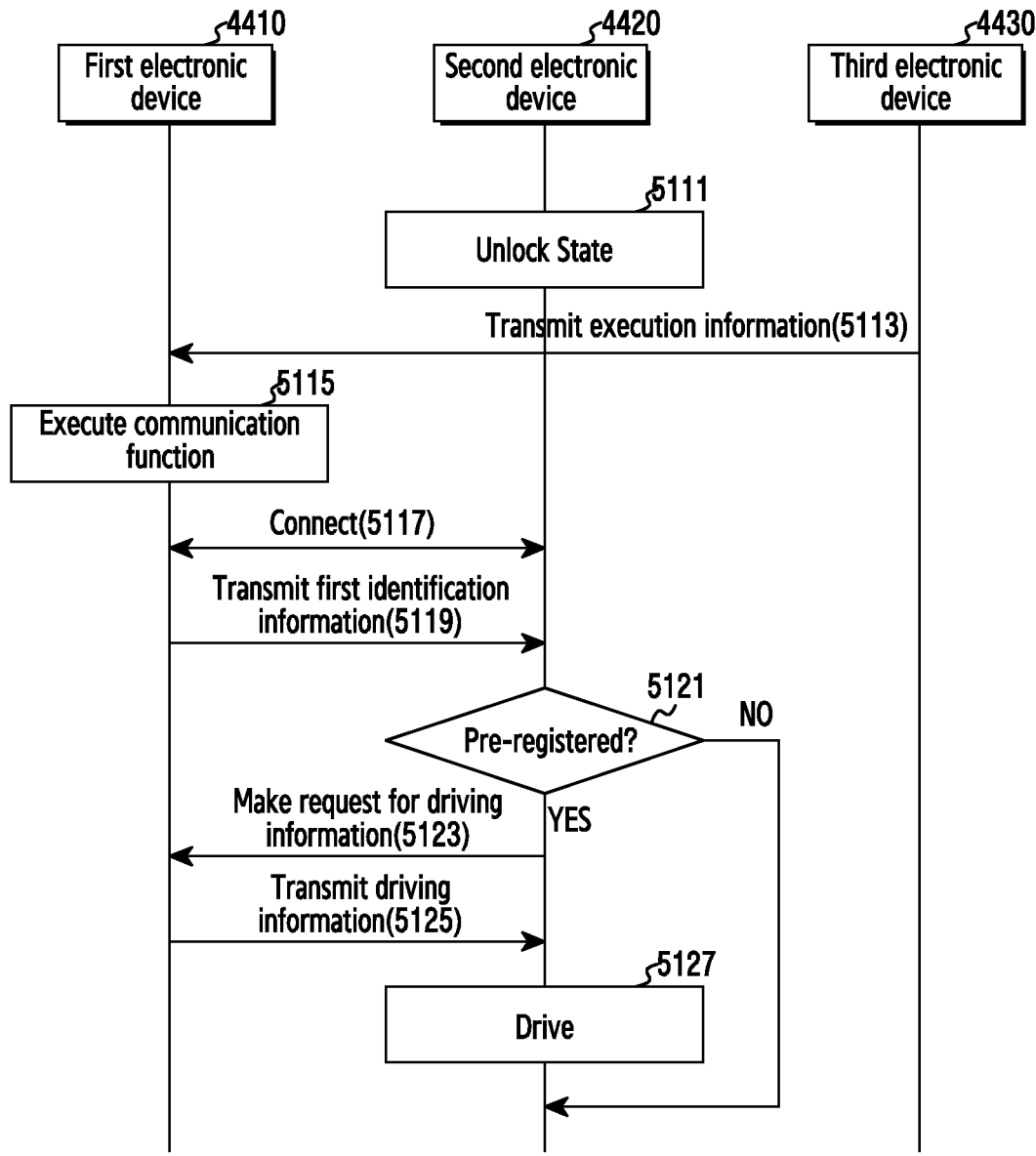
FIG. 51 is a flowchart illustrating an example method of authenticating biometric information in the communication system according to another example embodiment.

FIG. 51 is a flowchart illustrating an example method of authenticating biometric information in the communication system 4400 according to another example embodiment.

Referring to FIG. 51, the second electronic device 4420 may be in a unlock state in operation 5111. The third electronic device 4430 may transmit execution information in operation 5113. For example, the third electronic device 4430 may periodically broadcast the execution information.

When the approach of the first electronic device 4410 is detected, the third electronic device 4430 may transmit the execution information. For example, the execution information may include identification data indicating a particular function.

According to another example embodiment, when the execution information is received from the third electronic device 4430 in operation 5113, the first electronic device 4410 may execute a communication function in operation 5115. The first electronic device 4410 may execute the communication function in accordance with the execution information. The first electronic device 4410 may perform a connection with the second electronic device 4420 in operation 5117. For example, the first electronic device 4410 may perform the connection with the second electronic device 4420 through a short-range communication scheme. To this end, the first electronic device 4410 may store second identification information of the second electronic device 4420, and the second electronic device 4420 may store first identification information of the first electronic device 4410. The first electronic device 4410 may transmit the first identification information to the second electronic device 4420 in operation 5119. The first electronic device 4410 may encrypt the first identification information and transmit the encrypted first identification information to the second electronic device 4420.

According to another example embodiment, when the first identification information is received in operation 5119, the second electronic device 4420 may determine whether the first identification information has been pre-registered in operation 5121. For example, the second electronic device 4420 may determine whether a right to access the second electronic device 4420 is set in accordance with the first identification information. For example, the second electronic device 4420 may determine whether a right to unlock the second electronic device 4420 is set in accordance with the first electronic device 4410. When the first identification information has been pre-registered in operation 5121, the second electronic device 4420 may make a request for driving information to the first electronic device 4410 in operation 5123. The second electronic device 4420 may transmit state information to the first electronic device 4410. For example, the state information may indicate that the second electronic device 4420 is in a lock state.

According to another example embodiment, when a request for the driving information is made by the second electronic device 4420 in operation 5123, the first electronic device 4410 may transmit the driving information to the second electronic device 4420 in operation 5125. For example, the driving information may include identification data of a function being executed in the first electronic device 4410. When the driving information is received in operation 5125, the first electronic device 4410 may execute a particular function based on the driving information in operation 5127. For example, the second electronic device 4420 may execute a corresponding function in accordance with the identification data of the driving information.

Figure 52:
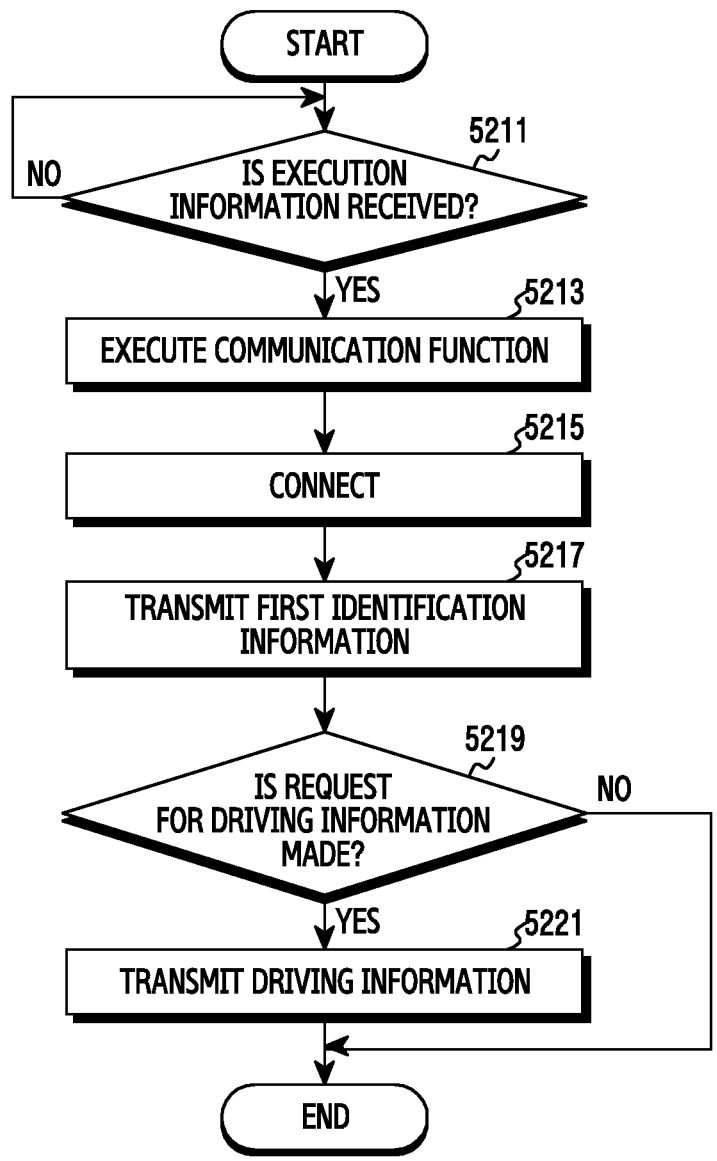
FIG. 52 is a flowchart illustrating an example method of operating the first electronic device according to another example embodiment.

FIG. 52 is a flowchart illustrating an example method of operating the first electronic device 4410 according to another example embodiment.

Referring to FIG. 52, the processor 2116 may receive execution information in operation 5211. For example, when the execution information is received from the third electronic device 4430, the processor 2116 may detect the execution information. The processor 2116 may receive the execution information of the third electronic device 4430 while performing a particular function. The processor 2116 may receive the execution information of the third electronic device 4430 even though the particular function is not performed. For example, in a state where the first electronic device 4410 is unlocked, the processor 2116 may receive the execution information of the third electronic device 4430. To this end, the third electronic device 4430 may periodically broadcast the execution information. Alternatively, when the approach of the first electronic device 4410 is detected, the third electronic device 4430 may transmit the execution information. For example, the execution information may include identification data indicating a particular function.

The processor 2116 may execute a communication function in accordance with the execution information in operation 5213. To this end, the processor 2116 may activate the communication unit 2111. For example, the processor 2116 may activate a short-range communication scheme in the communication unit 2111.

The processor 2116 may perform a connection with the second electronic device 2120 in operation 5215. For example, the processor 2116 may perform the connection with the second electronic device 4420 through a short-range communication scheme. To this end, second identification information of the second electronic device 4420 may be stored in the memory 4415. The processor 2116 may transmit first identification information to the second electronic device 4420 in operation 5217. The processor 2116 may encrypt the first identification information and transmit the encrypted first identification information to the second electronic device 4420.

When a request for driving information is made by the second electronic device 4420, the processor 2116 may detect the request in operation 5219. At this time, the processor 2116 may receive state information of the second electronic device 4420. For example, the state information may indicate that the second electronic device 4420 is in a lock state. The processor 2116 may transmit driving information to the second electronic device 4420 in operation 5221. For example, the driving information may include identification data of a function being executed in the first electronic device 4410.

Figure 53:
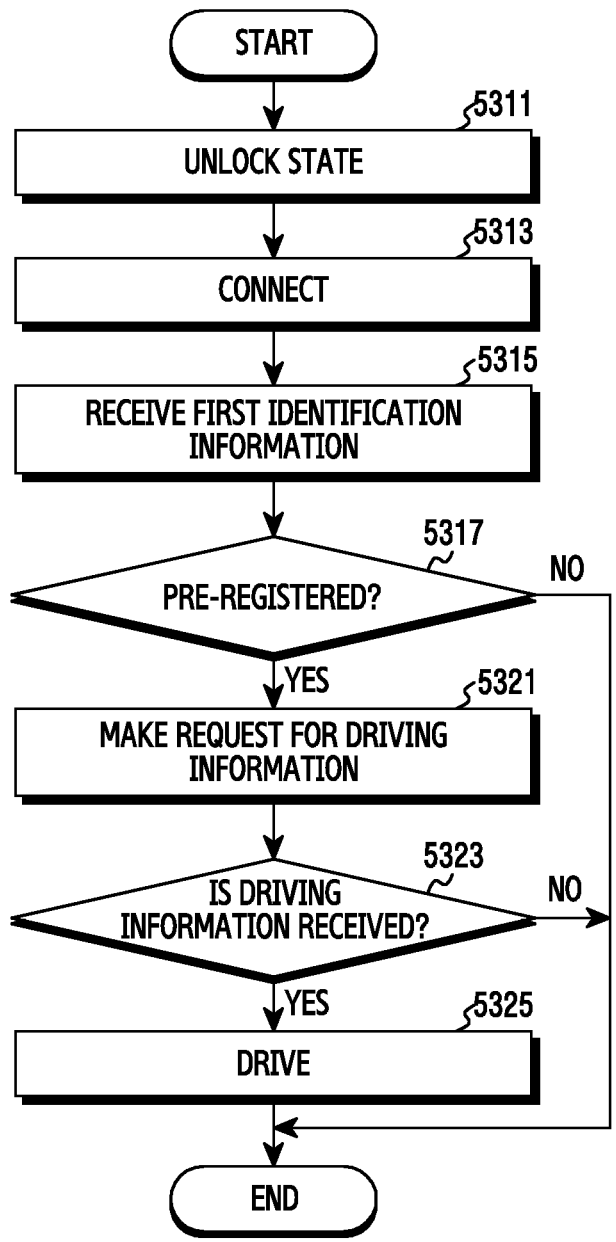
FIG. 53 is a flowchart illustrating an example method of operating the second electronic device according to another example embodiment.

FIG. 53 is a flowchart illustrating an example method of operating the second electronic device 4420 according to another example embodiment.

Referring to FIG. 53, the second electronic device 4420 may be in a unlock state in operation 5311. The processor 2125 may perform a connection with the first electronic device 4410 in operation 5313. For example, the processor 2125 may perform the connection with the first electronic device 4410 through a short-range communication scheme. When a request for the connection is received from the first electronic device 4410, the processor 2125 may determine whether to perform the connection with the first electronic device 4410. Further, the processor 2125 may transmit a response to the request for the connection that indicates whether to perform the connection to the first electronic device 4410. Accordingly, when the response to the request for the connection is positive, the processor 2125 may complete the connection with the first electronic device 4410.

The processor 2125 may receive first identification information from the first electronic device 4410 in operation 5315. For example, the first identification information may be encrypted by the first electronic device 4410, and the processor 2125 may decrypt the first identification information. The processor 2125 may determine whether the first identification information has been pre-registered in operation 5317. For example, the processor 2125 may determine whether a right to access the second electronic device is set in accordance with the first identification information. For example, the processor 2125 may determine whether a right to unlock the processor 2125 is set in accordance with the first electronic device 4410.

When the first identification information has been pre-registered in operation 5317, the processor 2125 may make a request for driving information to the first electronic device 4410 in operation 5321. The processor 2125 may transmit state information to the first electronic device 4410. For example, the state information may indicate that the second electronic device 4420 is in a lock state.

When driving information is received from the first electronic device 4410, the processor 2125 may detect the driving information in operation 5323. For example, the driving information may include identification data of a function being executed in the first electronic device 4410. The processor 2125 may execute a particular function based on the driving information in operation 5325. For example, the processor 2125 may execute a corresponding function in accordance with identification data of the driving information.

A method of operating an electronic device according to various example embodiments may include: an operation of receiving, by the electronic device execution information to be used for authenticating at least one resource of a second external device from a first external device through a communication interface included in the electronic device; an operation of displaying a user interface for acquiring biometric information of a user in response to the reception; an operation of generating virtual biometric information based on the acquired biometric information; and an operation of transmitting the virtual biometric information to the second external device through the communication interface wherein the virtual biometric information is usable for authenticating the at least one resource.

The method of operating the electronic device according to various example embodiments may further include an operation of authenticating the user based on the biometric information; and an operation of generating the virtual biometric information at least based on a result of the authentication.

The method of operating the electronic device according to various example embodiments may further include an operation of receiving an application identifier corresponding to the user interface as at least some of the execution information.

According to various example embodiments, the at least one resource may include an application to be executed in the second external device.

The method of operating the electronic device according to various example embodiments may further include an operation of receiving an application identifier corresponding to the application as at least some of the execution information.

The method of operating the electronic device according to various example embodiments may further include an operation of transmitting the application identifier corresponding to the virtual biometric information to the second external device.

According to various example embodiments, the communication interface may include a first communication interface which can support first short-range communication and a second communication interface which can support second short-range communication.

According to various example embodiments, the operation of receiving the execution information may include receiving the execution information through the first communication interface, and the operation of transmitting the virtual biometric information may include transmitting the virtual biometric information through the second communication interface.

According to various example embodiments, the first communication interface or the second communication interface may include a near-field communication interface.

According to various example embodiments, the first communication interface or the second communication interface may include a wired interface, for example, a USB.

According to various example embodiments, the operation of transmitting the virtual biometric information may include identifying a state of the second external device through the communication interface and, when an authentication of at least one resource of the second external device is required, transmitting the virtual biometric information to the second external device.

According to various example embodiments, the second external electronic device may include a plurality of external electronic devices, and the operation of transmitting the virtual biometric information may include transmitting the virtual biometric information to the plurality of eternal electronic devices through a broadcasting or a multicasting scheme.

A storage medium storing instructions according to various example embodiments is provided. The instructions may be configured to, when executed by at least one processor, cause the processor to perform at least one operation. The at least one operation may include: an operation of receiving execution information to be used for authenticating at least one resource of a second external device from a first external device through a communication interface functionally connected to the electronic device, by the electronic device; an operation of displaying a user interface for acquiring authentication information corresponding to the electronic device in response to the reception; and authenticating the at least one resource at least based on the acquired authentication information through the communication interface.

An electronic device and a method of operating the same according to various example embodiments may provide an authentication function through biometric recognition in different types of electronic devices, thereby acquiring an effect of improving convenience according to a user authentication.

What is claimed is:
1. An electronic device comprising:
a touch screen;
a communication interface comprising communication circuitry; and
a processor operatively connected to the communication circuitry of the communication interface,
wherein the processor is configured to:
receive, through the communication circuitry of the communication interface, execution information comprising at least one identifier indicating at least one resource of a second external device from a first external device coupled to the second external device, wherein the execution information is periodically broadcasted by the first external device, or received by the electronic device from the first external device when the electronic device approaches the first external device,
display a user interface configured to acquire biometric information of a user through the touch screen in response to receiving the execution information, acquire the biometric information of the user through the user interface, generate virtual biometric information based on the acquired biometric information, and transmit the virtual biometric information to the second external device through the communication circuitry of the communication interface, wherein the virtual biometric information is used by the second external device for authenticating the at least one resource and executing the authenticated at least one resource.

2. The electronic device of claim 1, wherein the processor is configured to authenticate the user based on the biometric information, and to generate the virtual biometric information based on a result of the authentication.

3. The electronic device of claim 1, wherein the processor is configured to receive an application identifier corresponding to the user interface as at least some of the execution information.

4. The electronic device of claim 1, wherein the at least one resource includes an application to be executed in the second external device, and the processor is configured to receive an application identifier corresponding to the application as at least some of the execution information.

5. The electronic device of claim 4, wherein the processor is configured to associate the application identifier with the virtual biometric information, and transmit to the second external device.

6. The electronic device of claim 1, wherein the communication interface includes a first communication interface comprising first communication interface circuitry configured to support first short-range communication and a second communication interface comprising second communication interface circuitry configured to support second short-range communication, and the processor is configured to receive the execution information through the first communication circuitry of the first communication interface and to transmit the virtual biometric information through the second communication circuitry of the second communication interface.

7. The electronic device of claim 6, wherein the first communication interface and/or the second communication interface includes a near-field communication interface.

8. The electronic device of claim 1, wherein the processor is configured to identify a state of the second external device through the communication circuitry of the communication interface and, when an authentication of at least one resource of the second external device is required, to transmit the virtual biometric information to the second external device.

9. The electronic device of claim 1, wherein the second external electronic device includes a plurality of external electronic devices, and the processor is configured to transmit the virtual biometric information to the plurality of external electronic devices through a broadcasting and/or a multicasting scheme as a part of an operation of transmitting the virtual biometric information.

10. A method of operating an electronic device, the method comprising:

receiving, by the electronic device, execution information comprising at least one identifier indicating at least one resource of a second external device from a first external device coupled to the second external device through a communication interface included in the electronic device, wherein the execution information is periodically broadcasted by the first external device, or transmitted to the electronic device by the first external device when an approach of the electronic device is detected;

displaying a user interface configured to acquire biometric information of a user in response to receiving the execution information;

acquiring the biometric information of the user through the user interface;

generating virtual biometric information based on the acquired biometric information; and transmitting the virtual biometric information to the second external device through the communication interface, wherein the virtual biometric information is used by the second external device for authenticating the at least one resource and executing the authenticated at least one resource.

11. The method of claim 10, further comprising:

authenticating the user based on the biometric information; and generating the virtual biometric information based on a result of the authentication.

12. The method of claim 10, further comprising receiving an application identifier corresponding to the user interface as at least some of the execution information.

13. The method of claim 10, wherein the at least one resource includes an application to be executed in the second external device, the method further comprising:

receiving an application identifier corresponding to the application as at least some of the execution information; and associating the application identifier with the virtual biometric information, and transmitting to the second external device.

14. The method of claim 10, wherein the communication interface includes a first communication interface which can support first short-range communication and a second communication interface which can support second short-range communication, and the receiving of the execution information comprises receiving the execution information through the first communication interface and the transmitting of the virtual biometric information comprises transmitting the virtual biometric information through the second communication interface.

15. The method of claim 14, wherein the first communication interface and/or the second communication interface includes a near-field communication interface.

16. The method of claim 10, wherein the transmitting of the virtual biometric information comprises identifying a state of the second external device through the communication interface and, when an authentication of at least one resource of the second external device is required, transmitting the virtual biometric information to the second external device.

17. The method of claim 10, wherein the second external electronic device includes a plurality of external electronic devices, and the transmitting of the virtual biometric information comprises transmitting the virtual biometric information to the plurality of eternal electronic devices through a broadcasting and/or a multicasting scheme.

* * * * *